(12) United States Patent
Ni et al.

(10) Patent No.: US 11,537,025 B2
(45) Date of Patent: Dec. 27, 2022

(54) MOLDING FREE-SPACE LIGHT WITH GUIDED-WAVE-DRIVEN METASURFACES

(71) Applicant: The Penn State Research Foundation, University Park, PA (US)

(72) Inventors: Xingjie Ni, State College, PA (US); Xuexue Guo, State College, PA (US); Yimin Ding, State College, PA (US); Yao Duan, State College, PA (US); Xi Chen, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 17/303,741

(22) Filed: Jun. 7, 2021

(65) Prior Publication Data

US 2021/0382371 A1    Dec. 9, 2021

Related U.S. Application Data

(60) Provisional application No. 63/036,084, filed on Jun. 8, 2020.

(51) Int. Cl.
*G02F 1/295* (2006.01)
(52) U.S. Cl.
CPC ........ *G02F 1/2955* (2013.01); *G02F 2202/30* (2013.01)
(58) Field of Classification Search
CPC .......................... G02F 1/2955; G02F 2202/30
See application file for complete search history.

(56) References Cited

U.S. PATENT DOCUMENTS 11,294,207 B2 *   4/2022   Kim .................... H01S 5/18375
11,385,104 B2 *   7/2022   Yao ....................... G02B 5/3083

OTHER PUBLICATIONS

"Single-chip microprocessor that communicates directly using light" by Chen Sun, et al., doi: 10.1038/nature16454, 534 Nature, vol. 528, Dec. 24-31, 2015.
"Integrating photonics with silicon nanoelectronics for the next generation of systems on a chip" by Amir H. Atabaki, et al., https://doi.org/10.1038/s41586-018-0028-z, Apr. 19, 2018/vol. 556/ Nature 349.
"Fiber-chip edge coupler with large mode size for silicon photonic wire waveguides" by Martin Papes, et al., 2016 Optical Society of America, Mar. 7, 2016 | vol. 24, No. 5 | DOI:10.1364/OE.24. 005026 | Optics Express 5026.
"Grating Couplers Fabricated by Electron-Beam Lithography for Coupling Free-Space Light Into Nanophotonic Devices" by Scott A. Masturzo, et al., IEEE Transactions on Nanotechnology, vol. 6, No. 6, Nov. 2007.

(Continued)

*Primary Examiner* — John Bedtelyon
(74) *Attorney, Agent, or Firm* — Buchanan Ingersoll & Rooney PC

(57) ABSTRACT

Embodiments relate to a photonic component having a metasurface. The metasurface includes a substrate with a thin-layer of meta-atoms disposed thereon. The photonic component includes a waveguide having a top surface, wherein the metasurface is disposed on at least a portion of the top surface such that the meta-atoms form an array on the top surface. The photonic component includes a sandwich nano-bar antenna formed in or on the metasurface.

21 Claims, 51 Drawing Sheets
(45 of 51 Drawing Sheet(s) Filed in Color)

(56) References Cited

OTHER PUBLICATIONS

"Off-chip beam steering with a one-dimensional optical phased array on silicon-on-insulator" by Karel Van Acoleyen, et al., May 1, 2009 / vol. 34, No. 9 / Optics Letters; 2009 Optical Society of America.

"One-Dimensional Off-Chip Beam Steering and Shaping Using Optical Phased Arrays on Silicon-on-Insulator" by Karel Van Acoleyen, et al., Journal of Lightwave Technology, vol. 29, No. 23, Dec. 1, 2011.

"Large-scale nanophotonic phased array" by Jie Sun, et al., doi:10.1038/nature11727; Jan. 10, 2013/vol. 493/195.

"Subwavelength integrated photonics" by Pavel Cheben, et al., https://doi.org/10.1038/s41586-018-0421-7; Aug. 30, 2018/vol. 560/ Nature 565.

"Exploiting metamaterials, plasmonics and nanoantennas concepts in silicon photonics" by Francisco J Rodriguez-Fortuño, Francisco J Rodriguez-Fortuño, et al., J. Opt. 18 (2016) 123001 (14pp); doi:10.1088/2040-8978/18/123001.

"Photodetection with Active Optical Antennas" by Mark W. Knight, et al., May 6, 2011 vol. 332 Science, www.Sciencemag.org.

"High-speed plasmonic phase modulators" by A. Melikyan, et al., Nature Photonics/ vol. 8 / Mar. 2014/ www.nature.com/naturephotonics 229.

"High-bit rate ultra-compact light routing with mode-selective on-chip nanoantennas" by Rui Guo, et al., Science Advances/ Research Article; Sci. Adv. 2017;3: e1700007 Jul. 19, 2017.

"Light Propagation with Phase Discontinuities: Generalized Laws of Reflection and Refraction" by Nanfang Yu, et al., Science 334, 333 (2011); DOI: 10.1126/science.1210713.

"Broadband Light Bending with Plasmonic Nanoantennas" by Xingjie Ni, et al., www.sciencemag.org, Science vol. 335, Jan. 27, 2012.

"Ultra-thin, planar, Babinet-inverted plasmonic metalenses" by Xingjie Ni, et al., Light: Science & Applications (2013) 2, e72; doi:10.1038/lsa.2013.28, www.nature.com/lsa.

"Metasurface holograms for visible light" by Xingjie Ni, et al., Accepted Oct. 23, 2013 | Published Nov. 15, 2013; Nature Communications.

"Wavefront shaping of infrared light through a subwavelength hole" by Yu-Hui Chen, et al., Light: Science & Applications (2012); www.nature.com/lsa.

"Converting surface plasmon to spatial Airy beam by graded grating on metal surface" by X. M. Tang, et al. May 15, 2013 / vol. 38, No. 10 / Optics Letters; 2013 Optical Society of America.

"Plasmonic polarization generator in well-routed beaming" by Lin Li, et al., Light: Science & Applications (2015); www.nature.com/lsa.

"Multiplexed Holograms by Surface Plasmon Propagation and Polarized Scattering" Ji Chen, et al., 2017 American Chemical Society; pubs.acs.org/NanoLett.

"Controlling propagation and coupling of waveguide modes using phase-gradient metasurfaces" by Zhaoyi Li, et al., Nature Nanotechnology | vol. 12 | Jul. 2017 | www.nature.com/naturenanotechnology.

"Metasurface-assisted phase-matching-free second harmonic generation in lithium niobate waveguides" by Cheng Wang, Nature Communications | 8: 2098; http://www.ieee.org/publications_standards/publications/rights/index.html.

"Leaky-Wave Theory, Techniques, and Applications: From Microwaves to Visible Frequencies" by Francesco Monticone and Andrea Alu, 2015 IEEE.

"Analysis of a Waveguide-Fed Metasurface Antenna" by David R. Smith, et al. Physical Review Applied 8, 054048; 2017 American Physical Society.

"Coherent solid-state LIDAR with silicon photonic optical phased arrays" by Christopher V. Poulton, et al., vol. 42, No. 20 / Oct. 15, 2017 / Optics Letters; 2017 Optical Society of America.

"Attojoule Optoelectronics for Low-Energy Information Processing and Communications" by David A. B. Miller; Journal of Lightwave Technology, vol. 35, No. 3, Feb. 1, 2017.

"Oullilling Next Generation Displays with Optical Metasurfaces" by Inki Kim, et al., ACS Photonics 2018, 5, 3876; 2018 American Chemical Society.

"Optical Metasurfaces: Progress and Applications" by Shengyuan Chang, et al., Annu. Rev. Mater. Res. 2018. 48:279-302, https://doi.org/10.1146/annurev-matsci-070616-124220.

"Continuously apodized fiber-to-chip surface grating coupler with refractive index engineered subwavelength structure" by R. Halir, et al., Oct. 1, 2010/vol. 35, No. 19/ Optics Letters; 2010 Optical Society of America.

"An apodized SOI waveguide-to-fiber surface grating coupler for single lithography silicon photonics" by Mikael Antelius, et al., 2011 Optical Society of America, Feb. 14, 2011 / vol. 19, No. 4 / Optics Express 3592.

"CMOS-compatible high efficiency double-etched apodized waveguide grating coupler" by Chao Li, et al., 2013 Optical Society of America; Apr. 8, 2013 / vol. 21, No. 7 / Optics Express 7868.

"Orbital angular momentum: origins, behavior and applications" by Alison M. Yao and Miles J. Padgett, Advances in Optics and Photonics 3,161-204 (2011) doi:10.1364/AOP.3.000161.

"Terabit-Scale Orbital Angular Momentum Mode Division Multiplexing in Fibers" by Nenad Bozinovic, et al., www.sciencemag.org Science vol. 340 Jun. 28, 2013.

"High-capacity millimetre-wave communications with orbital angular momentum multiplexing" by Yan Yan, et al., Nature Communications | 5:4876 | DOI: 10.1038/ncomms5876 |www.nature.com/naturecommunications.

"Twisted photons" by Gabriel Molina-Terriza, et al., nature physics | vol. 3 | May 2007 | www.nature.com/naturephysics.

"Entanglement of the orbital angular momentum states of photons" by Alois Mair, et al., Nature |vol. 412 | Jul. 19, 2001 |www.nature.com.

"Structure of Optical Vortices" by Jennifer E. Curtis and David G. Grier, Physical Review Letters, vol. 90, No. 13, Apr. 4, 2003; 2003 The American Physical Society.

"Generation of optical phase singularities by computer-generated holograms" by N. R. Heckenberg, R. McDuff, C. P. Smith, and A. G. White, Feb. 1, 1992 / vol. 17, No. 3 / Optics Letters; 1992 Optical Society of America.

"Helical-wavefront laser beams produced with a spiral phaseplate" by M.W. Beijersbergen, et al., Optics Communications, Dec. 1, 1994; 1994 Elsevier Science B.V.

"Efficient generation and sorting of orbital angular momentum eigenmodes of light by thermally tuned-plates" by Ebrahim Karimi, et al., Appl. Phys. Lett. 94, 231124 (2009); https://doi.org/10.1063/1.3154549; 2009 American Institute of Physics.

"Dispersionless Phase Discontinuities for Controlling Light Propagation" Lingling Huang, et al., 2012 American Chemical Society, dx.doi.org/10.1021/nl303031j.

"Topological defect lasers" by Sebastian Knitter, et al., J. Opt. 18 (2016) 014005 (5pp), doi:10.1088/2040-8978/18/1/014005, 2016 IOP Publishing Ltd.

"Orbital angular momentum microlaser" by Pei Miao, et al., Jul. 29, 2016 • vol. 353 Issue 6298, sciencemag.org.

"Gate-Tunable Conducting Oxide Metasurfaces" by Yao-Wei Huang, et al., 2016 American Chemical Society, Nano Lett. 2016, 16, 5319-5325.

"Spatiotemporal light control with active metasurfaces" by Amr M. Shaltout, et al., Shaltout et al., Science 364, 648 (2019) May 17, 2019.

\* cited by examiner

MOLDING FREE-SPACE LIGHT WITH GUIDED-WAVE-DRIVEN METASURFACES

CROSS-REFERENCE TO RELATED APPLICATIONS

This application is related to and claims the benefit of U.S. Provisional Application 63/036,084, filed on Jun. 8, 2020, the entire contents of which is incorporated herein by reference.

STATEMENT REGARDING FEDERALLY SPONSORED RESEARCH OR DEVELOPMENT

This invention was made with government support under Grant No. DMR1420620 awarded by the National Science Foundation, under Grant No. N00014-18-1-2371 awarded by the United States Navy/ONR and under 80NSSC17K0528 awarded by the National Aeronautics & Space Administration. The Government has certain rights in the invention.

FIELD OF THE INVENTION

Embodiments relate to a photonic component having a metasurface disposed on at least a portion of a top surface of a waveguide, wherein nano-bar antennas are formed in or on the waveguide. The photonic component allows light waves being guided by the waveguide to be extracted into free-space and molded into desired light fields.

BACKGROUND OF THE INVENTION

To fully exploit the benefits of photonic integrated circuits (PICs) in free-space applications, it is desirable to have an interface that can flexibly control light when it converts between guided and free-space modes. Conventional systems tend to rely on edge couplers and surface gratings for such purposes, but these have limited functionalities and do not provide complete control over light. Metasurfaces are known to provide controllability to the free-space light propagation; however, conventional systems drive metasurfaces by free-space light (e.g., edge couplers, surface gratings, etc.) to generate different free-space functions (e.g., orbital angular momentum beams, light focusing, holograms, etc.). This makes it difficult to integrate light sources on a chip.

BRIEF SUMMARY OF THE INVENTION

Embodiments disclosed herein relate to a photonic component that can be used as a structure for PICs or other photonic devices. The photonic component is a hybrid structure using integrated photonics and metasurfaces that facilitates metasurface drivers based on guided waves—i.e., the photonic component is a guided-wave driven metasurface structure. This is achieved by placing subwavelength-sized meta-atoms on top of photonic integrated components (e.g., waveguides). The subwavelength spacing of the meta-atoms eliminates high-order diffraction loss and allows for a denser on-chip integration. This hybrid structure allows the integrated metasurface to bridge guided light waves inside the waveguide with free-space light waves. Thus, light being guided through the waveguide can be tapered into free space and then molded into desired light fields for free-space functions.

In an exemplary embodiment, a photonic component can include a metasurface having a substrate with a thin-layer of meta-atoms disposed thereon. The photonic component can include a waveguide having a top surface, wherein the metasurface is disposed on at least a portion of the top surface. The meta-atoms can form an array on the top surface. The photonic component can include an array of nano-bar antennas formed in or on the metasurface.

In some embodiments, the photonic component can include a plurality of metasurfaces disposed on the top surface of the waveguide.

In some embodiments, a first metasurface can differ from a second metasurface.

In some embodiments, the array of meta-atoms can include a uniform distribution of meta-atoms across the metasurface.

In some embodiments, the photonic component can include a plurality of sandwich nano-bar antennas.

In some embodiments, the sandwich nano-bar antenna can be a metal-dielectric-metal neon-bar antenna.

In some embodiments, the metasurface can include a supercell, the supercell including a periodic arrangement of meta-atoms. Each meta-atom within the periodic arrangement can impose a predetermined phase shift on a light wave being guided through the waveguide.

In some embodiments, the photonic component includes a plurality of supercells.

In some embodiments, a first supercell can differ from a second supercell.

In some embodiments, as light wave is guided through the waveguide, the metal-dielectric-metal nano-bar antenna induces a total phase shift via phase accumulation from the propagation of the guided light wave, and each meta-atom induces an abrupt and spatially variant phase shift.

In some embodiments, an evanescent tail of the guided light wave can induce a first electric dipole via bottom cuboids in the sandwich nano-bar antenna. The evanescent tail of the guided light wave can induce a second electric dipole via top cuboids in the sandwich nano-bar antenna. The second electric dipole is antiparallel to the first electric dipole. The first and second dipoles generate a magnetic dipolar resonance. The first and second dipoles and the magnetic dipolar resonance generate a directional radiation. The light wave being guided through the waveguide is deflected via the directional radiation so that the guided light wave is extracted into free-space. The directional radiation causes an abrupt phase shift range of $2\pi$ to the extracted light wave.

In an exemplary embodiment, a metalens can include a metasurface having a substrate with a thin-layer of meta-atoms disposed thereon. The metalens can include a waveguide having a top surface, wherein the metasurface is disposed on at least a portion of the top surface. The meta-atoms can form a spatial arrangement on the top surface of the waveguide. The photonic component can include a sandwich nano-bar antenna formed in or on the metasurface. The spatial arrangement of meta-atoms can provide a focal length for the metalens.

In an exemplary embodiment, an optical ring resonator can include an optical ring having a plurality of waveguides. The optical ring resonator can include a guided-wave driven metasurface structure disposed on at least one waveguide of the optical ring. The guided-wave driven metasurface structure can include a metasurface having a substrate with a thin-layer of meta-atoms disposed thereon, wherein the metasurface is disposed on at least a portion of a top surface of the at least one waveguide. The meta-atoms can form an array on the top surface of the waveguide. The optical ring resonator can include a sandwich nano-bar antenna formed in or on the metasurface.

In some embodiments, the at least one waveguide has a center. Each meta-atom of the metasurface can be positioned away from the center.

In some embodiments, the metasurface includes a supercell, the supercell including a periodic arrangement of meta-atoms. Each meta-atom within the periodic arrangement can impose a predetermined phase shift on a light wave being guided through the at least one waveguide.

In some embodiments, the optical ring resonator can include a plurality of supercells.

In some embodiments, a first supercell can differ from a second supercell.

In some embodiments, the plurality of supercells can generate a well-defined topological charge when a light wave is guided through the at least one waveguide.

In some embodiments, the optical ring resonator is configured as a multi-quantum-well micro-ring resonator.

In an exemplary embodiment, an orbital angular momentum laser can include a light source coupled to an embodiment of the optical ring resonator disclosed herein.

In an exemplary embodiment, a photonic component includes a metasurface comprising a substrate with a thin-layer of meta-atoms disposed thereon. The component includes a waveguide having a top surface, wherein the metasurface is disposed on at least a portion of the top surface, wherein the meta-atoms form an array on the top surface, wherein the meta-atoms form sandwich nano-bar antennas. The metasurface comprises an array of meta-atoms.

In an exemplary embodiment, a metalens includes a metasurface comprising a substrate with a thin-layer of meta-atoms disposed thereon. The metalens includes a waveguide having a top surface, wherein the metasurface is disposed on at least a portion of the top surface, wherein the meta-atoms form a spatial arrangement on the top surface. The metal lens includes a sandwich nano-bar antenna formed in or on the metasurface. The spatial arrangement of meta-atoms provide a focal length for the metalens.

In an exemplary embodiment, a metasurface-dressed optical ring resonator includes an optical ring comprising a plurality of waveguides. The resonator includes a guided-wave driven metasurface structure disposed on at least one waveguide of the optical ring. The guided-wave driven metasurface structure comprises a metasurface comprising a substrate with a thin-layer of meta-atoms disposed thereon, wherein the metasurface is disposed on at least a portion of a top surface of the at least one waveguide, wherein the meta-atoms form an array on the top surface. The guided-wave driven metasurface structure comprises a sandwich nano-bar antenna formed in or on the metasurface.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

The above and other objects, aspects, features, advantages, and possible applications of the present invention will be more apparent from the following more particular description thereof, presented in conjunction with the following drawings. It should be understood that like reference numbers used in the drawings may identify like components.

DETAILED DESCRIPTION OF THE INVENTION

Figure 1A:
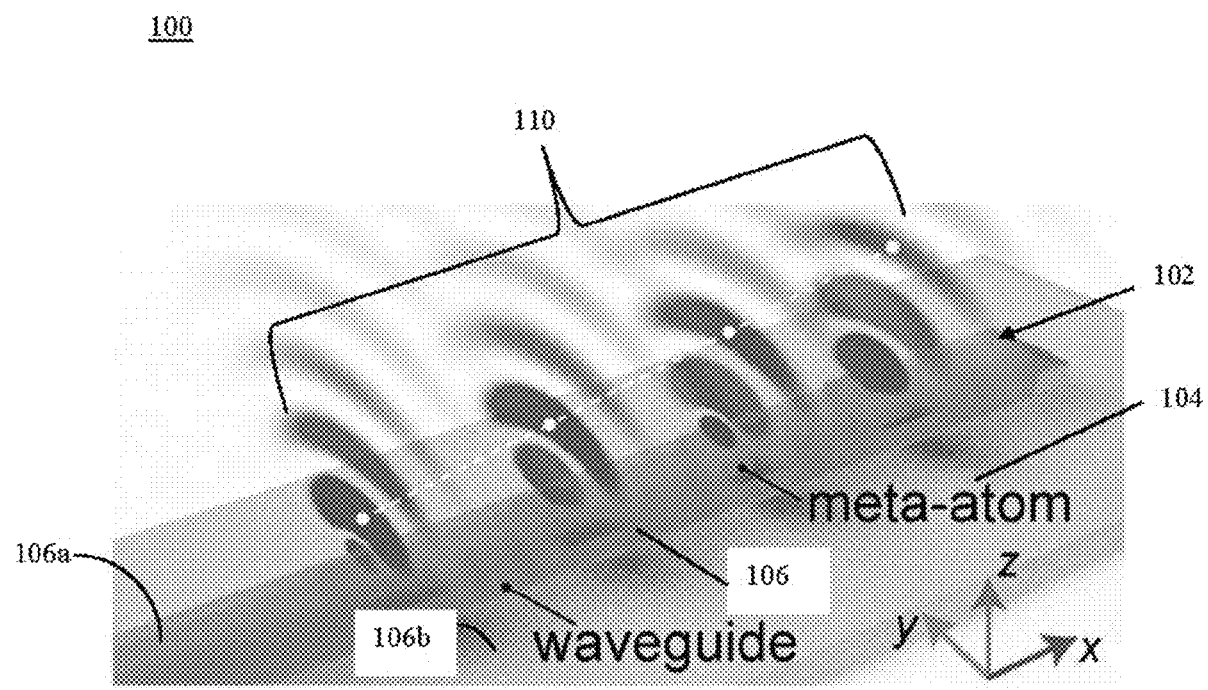
FIG. 1A shows a schematic of a guided-wave-driven metasurface.

The following description is of an embodiment presently contemplated for carrying out the present invention. This description is not to be taken in a limiting sense but is made merely for the purpose of describing the general principles and features of the present invention. The scope of the present invention should be determined with reference to the claims.

Referring to FIGS. 1-4, embodiments relate to a photonic component 100. The photonic component 100 can include a metasurface 102 composed of an array of meta-atoms 104 and a waveguide 106. The metasurface 102 is made from a metamaterial. The metamaterial can be a thin-layer composed of individual meta-atoms 104 that provide an artificial structure configured to manipulate light by locally imposing abrupt changes to optical properties. The thin-layer of individual elements is configured to have sub-wavelength thickness. The metamaterial forming the metasurfaces 102 can be structured, unstructured, or both. The metamaterial can include subwavelength-scaled patterns formed therein. The metamaterial's material properties are dictated by structural units of its internal microstructure, rather than its chemical composition. The artificially designed and fabricated structural units (e.g., the artificial "atoms" and "molecules" of the metamaterial) can be tailored in shape and size. This can allow for tuning properties such as the lattice constant and interatomic interaction, for example. This can also facilitate introduction and placement of defects to achieve the desired properties and functionalities.

The photonic component 100 can include a waveguide 106 having a top surface 106a and a bottom surface 106b. The waveguide 106 can be an optical waveguide 106. The waveguide 106 can be an optical fiber, a dielectric waveguide, a slab waveguide, a strip waveguide, a rib waveguide, segmented waveguide, photonic crystal waveguide, laser inscribed waveguide, etc. Any one of the top surface 106a or the bottom surface 106b can have the metasurface 102 disposed thereon. It is contemplated for the metasurface 102 to be disposed on the top surface 106a. The metasurface 102 can be disposed on a portion of the top surface 106a or the entire top surface 106a. The metasurface 102 can be structured such that the meta-atoms 104 form an array on the top surface 106a. The array can be a 2-dimensional array and/or a 3-dimensional array.

The photonic component 100 can include meta-atoms formed in or on the waveguide 106. The meta-atom 108 can be a sandwich nano-bar antenna 108 or an all-dielectric antenna, for example. The meta-atom 108 can be used to extract a light wave being guided through the waveguide 106 into free-space. It is contemplated for the sandwich nano-bar antenna 108 to be a metal-dielectric-metal nanoantenna. As will be explained in more detail herein, it is desirable to have a $2\pi$ phase shift range induced by the meta-atoms 104 to achieve complete control of the wavefront of the light wave being guided through the waveguide 106. The sandwich nano-bar antenna 108, being a metal-dielectric-metal antenna, supports two resonant modes. The sandwich nano-bar antenna 108 can be evanescently coupled with the light wave being guided through the waveguide 106. The transverse electric mode in the waveguide 106 is used to excite resonant modes of the meta-atoms 108. The field distribution of the meta-atoms 108 has good spatial overlap with the electric dipolar mode in the nano-bar antenna 108. The dimensions of the nano-bar antenna 108 are selected such that the evanescent tail of the guided light wave induces an electric dipole via bottom cuboids in the nano-bar antenna 108. The evanescent tail of the guided light wave also induces an antiparallel electric dipole via the top cuboids in the nano-bar antenna 108. These dipoles generate a magnetic dipolar resonance. Further, these antiparallel electric dipoles pair do not completely cancel out, resulting in a net electric dipolar resonance. The combined magnetic and electric dipolar resonances generate an abrupt phase shift. The phase shift can cover range of a when the dimensions of the meta-atoms 108 are changed. Thus, as a light wave is guided through the waveguide 106, the metal-dielectric-metal sandwich nano-bar antenna 108 induces a total phase shift via phase accumulation from the propagation of the guided light wave, and each meta-atom 104 induces an abrupt and spatially variant phase shift.

It should be noted that the photonic component 100 can include a plurality of sandwich nano-bar antennas 108. For instance, the photonic component 100 can have a first sandwich nano-bar antenna 108, a second sandwich nano-bar antenna 108, a third sandwich nano-bar antenna 108, a fourth sandwich nano-bar antenna 108, etc. Any one or combination of sandwich nano-bar antennas 108 can be the same or different from another sandwich nano-bar antenna 108. This can include each metasurface 102 (if a plurality of metasurfaces 102 are used) having the same or different sandwich nano-bar antenna 108 as each other metasurface 102.

The metasurface-waveguide hybrid structure of the photonic component 100 can be used with a PIC or other photonic device. With the metasurface-waveguide hybrid structure, the subwavelength spacing of the meta-atoms eliminates high-order diffraction loss and allows for a denser on-chip integration. Conventional free-space metasurfaces rely on the meta-atoms to provide the spatial phase profile. With embodiments of the photonic component 100 disclosed herein, a total phase shift is provide by: 1) phase accumulation from the propagation of the guided light wave; and 2) an abrupt and spatially variant phase shift induced at each meta-atom 104. The metasurface-waveguide hybrid structure of the photonic component 100 allows light waves being guided by the waveguide 106 to be extracted into free-space and molded into desired light fields. The metasurface-waveguide hybrid structure of the photonic component 100 also provides for a spatially varying optical response, which extracts and molds guided waves into any desired free space optical mode.

The photonic component 100 can include a plurality of metasurfaces 102 disposed on the top surface 106*a* of the waveguide 106. For instance, the top surface 106*a* can have a first metasurface 102, a second metasurface 102, a third metasurface 102, a fourth metasurface 102, etc. Any one or combination of metasurfaces 102 can be the same or different from another metasurface 102. This can include being the same or different in regards to material used, subwavelength-scaled patterns used, size and shape of structural units, spacing between meta-atoms, 2-dimensional array and/or a 3-dimensional arrays of meta-atoms, periodicity of meta-atom arrangements, etc. It is contemplated for the array of meta-atoms 104 to be configured so as to be uniformly distributed across their metasurface 102. This can include each metasurface 102 (if a plurality of metasurfaces 102 are used) having the same uniform distribution of meta-atoms 104 as each other metasurface 102. This can be done so that phase accumulation via propagation only acts as a uniform bias. Thus, even though phase accumulation may have an effect on the targeted or desired phase function, the effect will be uniform.

Any one or combination of the metasurfaces 102 can include a supercell 110. The supercell 110 can include a periodic arrangement of meta-atoms 104 such that meta-atom 104 within the periodic arrangement imposes a predetermined phase shift on a light wave being guided through the waveguide 106. The photonic component 100 can include a plurality of supercells 110. For instance, the metasurface 102 can have a first supercell 110, a second supercell 110, a third supercell 110, a fourth supercell 110, etc. Any one or combination of supercells 110 can be the same or different from another supercell 110. This can include each metasurface 102 (if a plurality of metasurfaces 102 are used) having the same or different supercell 110 as each other metasurface 102.

An exemplary use of the photonic component 100 can be the formation of a metalens 112. The metalens 112 can include a metasurface 102 having a thin-layer of meta-atoms 104 disposed thereon, which may include a metasurface 102 consisting of a thin-layer of meta-atoms 104. The metalens 112 can include a waveguide 106 having a top surface 106*a* and/or a bottom substrate 106*b*. The metasurface 102 can be disposed on at least a portion of the top surface 106*a*. The meta-atoms 104 can form a spatial arrangement on the top surface of the waveguide 106. The photonic component can include a sandwich nano-bar antenna 108 formed in or on the metasurface 102. The spatial arrangement of meta-atoms can provide a focal length for the metalens 112. The focal length can be such that it breaks the diffraction limit, and therefore the theoretical resolution limit of the material used to fabricate the lens.

Another exemplary use of the photonic component 100 can be the formation of an optical ring resonator laser 114 that can directly emit light carrying orbital angular momentum (OAM). The optical ring resonator 114 can be a multi-quantum-well micro-ring resonator, for example. The optical ring resonator 114 can include an optical ring 116 as a close-looped form of the waveguide 106. The optical ring resonator laser 114 can include a guided-wave driven metasurface structure disposed on the optical ring 116. The guided-wave driven metasurface structure can include a metasurface 102 having meta-atoms 104, which may include a metasurface 102 consisting of meta-atoms 104. The metasurface 102 can be disposed on at least a portion of a top surface 106*a*. The meta-atoms 104 can form an array on the top surface 106*a*. The guided-wave-driven metasurface can be placed on the optical ring 116 so that it induces a phase gradient. Again, any of the metasurfaces 102 on the optical ring 116 can include supercell 110, the supercell 110 including a periodic arrangement of meta-atoms 104. Each meta-atom 104 within the periodic arrangement can impose a predetermined phase shift on a light wave being guided through the at least one waveguide 106. The waveguides 106 of the optical ring resonator 114 can generate the guided light waves that will be extracted into free-space via the guided-wave-driven metasurface structure. The free-space light waves can be directed out from the optical ring resonator 114.

Some embodiments can include a plurality of supercells 110. The plurality of supercells 110 can generate a well-defined topological charge when a light wave is guided through the at least one waveguide 106.

Examples

Metasurfaces 102 with unparalleled controllability of light have shown great potential to revolutionize conventional optics. However, they mainly work with free-space light input, which makes it difficult to fully integrate them on-chip together with light sources. On the other hand, integrated photonics enables packing optical components densely on a chip, but it only provides limited free-space light controllability. The disclosure herein provides for a new type of metasurface 102 that is driven directly by guided waves. By dressing those metasurfaces 102 on top of waveguides 106, the guided waves can be molded into any desired free-space modes to achieve complex free-space functions, such as out-of-plane beam deflection and focusing on a photonic integrated chip. The metasurface 102 can also break the degeneracy of the clockwise- and counterclockwise-propagating whispering gallery modes in an active micro-ring resonator 114, facilitating the realization of direct orbital angular momentum (OAM) lasing on a chip. Results discussed herein show a viable route towards complete control of light across integrated photonics and free-space platforms, and paves a new exciting way for creating multifunctional photonic integrated devices with agile access to free space which could enable a plethora of applications in communications, remote sensing, displays, and etc.

With the fast-growing demands for big data, electronic chips and interconnects with insufficient bandwidth can hardly meet the requirements on data transmission speed and energy efficiency of future computing and storage systems. Wiring light on a chip like electronic circuits, integrated photonics provides a promising long-term solution (1, 2). A photonic integrated circuit (PIC) combines many light-controlling components into a single chip, with the ultimate aim of creating miniature optical circuits similar to CMOS (complementary metal oxide semiconductor) chips that have revolutionized the electronics industry. It offers great advantages in terms of speed, bandwidth, reliability, scalability, power consumption, etc. In order to fully exploit the benefits of PICs in free-space applications, it is desirable to have an interface that can flexibly control light when it converts between guided and free-space modes. However, two conventional coupling techniques—edge couplers (3) and surface gratings (4)—have limited functionalities and lack complete control over light. Although arrays of gratings can achieve more advanced functions, such as off-chip beam steering (5), focusing (6), and holographic image construction (7), they have large footprints and suffer from loss due to the existence of high-order diffractions. Subwavelength gratings (8) have compact footprints but they mainly works by controlling the guided waves rather than the manipulation of light across PICs and free space. Recently, optical nanoantennas have been integrated on top of waveguides (9), which provides a new way for interfacing guided and free-space optical modes and adds more functionalities to PICs. Nevertheless, most of them rely on a singular property of nanoantennas to achieve a specific purpose, such as photo-detection (10) or modulation (11) based on plasmonic field enhancement and directional routing from spin-orbit coupling (12). A unified approach leveraging the collective free-space functions of nanoantennas on PICs has not been demonstrated.

On the other hand, newly emerging metasurfaces (13, 14)—an ultrathin artificial surface which manipulates light by locally imposing abrupt changes to optical properties through engineered sub-wavelength structures also known as meta-atoms—provides unparalleled controllability to the free-space light propagation. However, most of the metasurfaces are driven by free-space light to realize functions, such as beam deflection (13,14), generating orbital angular momentum beams (14), light focusing (15), and holograms (16), which makes it difficult for further on-chip integration (e.g. integrating with light sources on the same chip). Besides, plasmonic metasurfaces have been used to route surface plasmon polariton (SPP) waves to arbitrary free-space radiation (17-20), and their design principles can be leveraged to bridge the gap between guided waves and free-space waves.

Figure 1B:
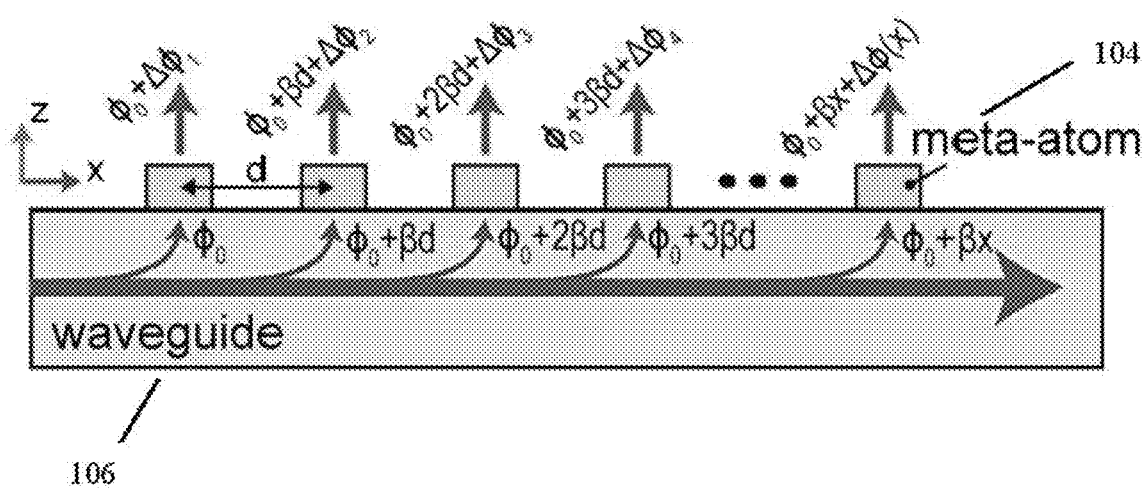
FIG. 1B is an illustration of the wave front formation of the extracted wave.

The techniques disclosed herein combine synergistically two powerful, complimentary technologies: integrated photonics and metasurfaces 102 to develop a hybrid architecture where metasurfaces 102 are directly driven by guided waves to realize complex free-space functions. Subwavelength-sized meta-atoms 104 are placed on top of photonic integrated components (see FIG. 1A). FIG. 1A shows a schematic of a guided-wave-driven metasurface. The phase of the extracted light from a guided wave by each meta-atom 104 can be tuned individually. An array of meta-atoms 104 on the waveguide 106 work collaboratively to form certain wave fronts and fulfill different functions, such as beam deflection and focusing. FIG. 1B is an illustration of the wave front formation of the extracted wave. The total phase shift of the extracted wave at coordinate x is contributed from two parts: the phase accumulation fix from the guided wave propagation and the abrupt phase change $\Delta\phi(x)$ induced by the meta-atom. As a result, the phase of the extracted wave can be expressed as $\phi_0+\beta x+\Delta\phi(x)$, where $\phi_0$ is the initial phase of the incidence.

In contrast to existing metasurfaces that operate with both input and output light in free space, the integrated metasurface 102 disclosed herein bridges guided waves inside a waveguide 106 with free-space ones. Through it the guided light is tapered into free space and molded into desired light fields. The subwavelength spacing of the meta-atoms 104 eliminates diffraction loss and also allows denser on-chip integration. Meanwhile, multiple metasurfaces 102 can be connected via waveguides 106 to achieve different free-space functions simultaneously. Although phase-gradient plasmonic metasurfaces have been used for guided mode conversion (21, 22), their limited phase controllability (~π) makes it inadequate for wavefront shaping. The metasurface 102 structure disclosed herein, however, overcomes this limitation by utilizing metal-dielectric-metal nanoantennas 108 to expand the phase tuning range to over 2π. Such guided-wave-driven metasurfaces 102 go beyond the existing technology of leaky-wave antennas made of periodic structures (23) and extend the functionalities of microwave waveguide-fed metasurface (24) to new spectral regions.

The metasurface 102 structure can be a huge step towards full control of light across integrated photonics and free-space platforms, and will pave new exciting ways for building multifunctional PIC devices with flexible access to free space as well as guided-wave-driven metasurfaces 102 with full on-chip integration capability. It could enable a plethora of applications in optical communications, optical remote sensing (e.g. light detection and ranging (LiDAR) (25)), free-space optical interconnects (FSOIs) (26), and displays (27). In addition, a library of those functional hybrid components can be established for reusing and creating consistency across various devices or systems.

In contrast to the free-space metasurfaces where the spatial phase profile is solely provided by the meta-atoms, the total phase shift of the extracted wave from the guided-wave-driven metasurface 102 is contributed from two parts: (i) the phase accumulation from the propagation of the guided wave βx (where β is the propagation constant of the guided mode and it is assumed that the waveguide lays straight along the x direction) and (ii) the abrupt and spatially variant phase shift Δϕ(x) induced by each meta-atom 104 at coordinate x (see FIG. 1B). The essence of such metasurfaces 102 is to use subwavelength-sized meta-atoms 104 to form spatially varying optical response, which extracts and molds guided waves into any desired free space optical modes. This distinguishes such metasurfaces 102 from leaky-wave antennas which typically do not have spatial-variant electromagnetic responses. (23) As a result, the phase distribution of the extracted wave along the x direction can be expressed as $$\phi(x)=\beta x+\Delta\phi(x) \quad (1)$$

Although the propagation accumulated phase contributes to the targeted phase function, it only acts as a uniform bias since meta-atoms are uniformly distributed on top of the waveguide. To achieve complete control of the wavefront, at least 2π phase shift range induced by meta-atoms 104 is required. Placing the meta-atoms 104 on the waveguide X, it is challenging to use a mirror resonance or a geometrical phase in order to achieve 2π phase shift. (28) Therefore, a metal-dielectric-metal sandwiched nano-bar antenna 108 (see FIG. 2A) is used—which supports two resonant modes and is evanescently coupled with the guided waves inside the waveguide—as the meta-atom.

Figure 2A:
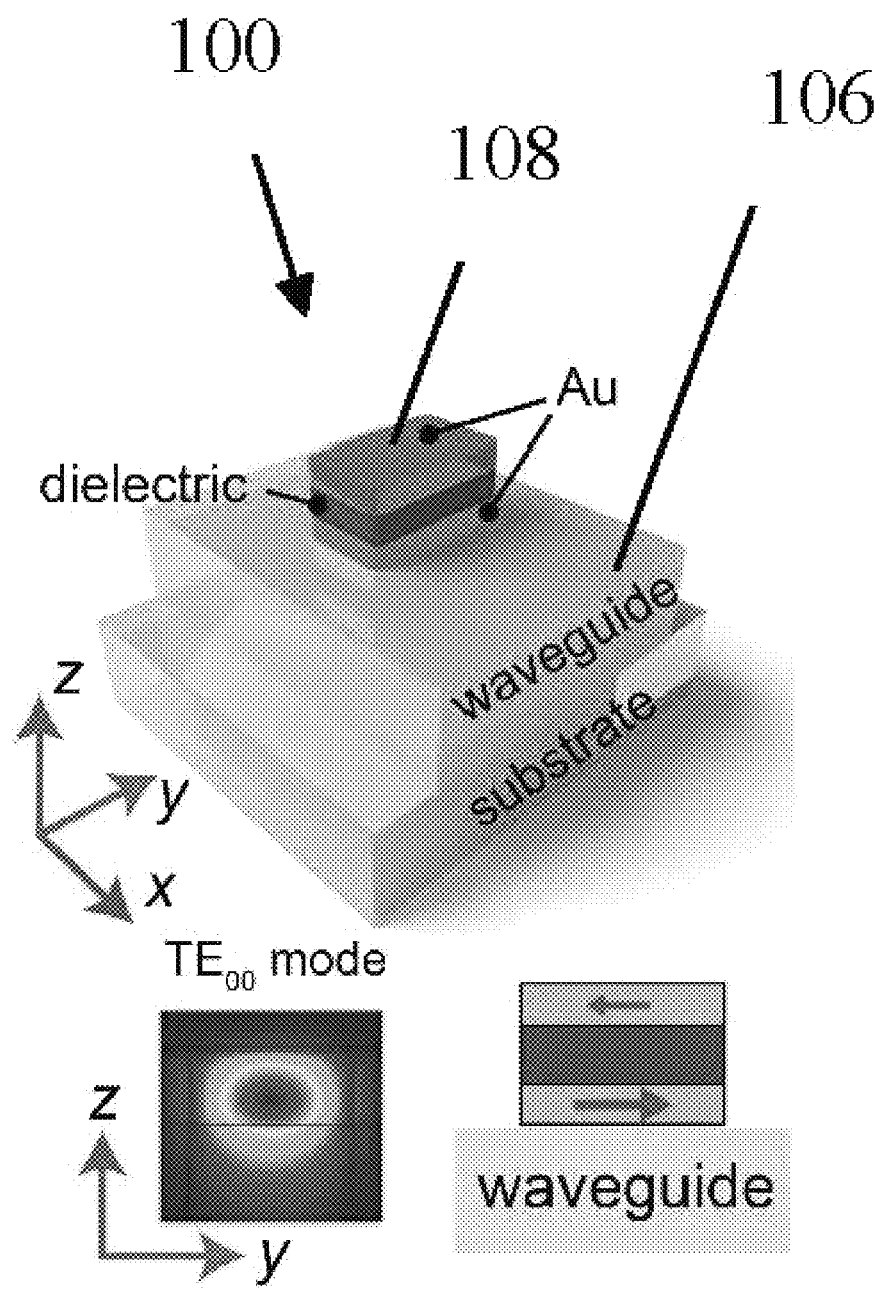
FIG. 2A is a schematic of a metal/dielectric/metal sandwich-structured meta-atom on top of a photonic integrated waveguide.
Figure 2B:
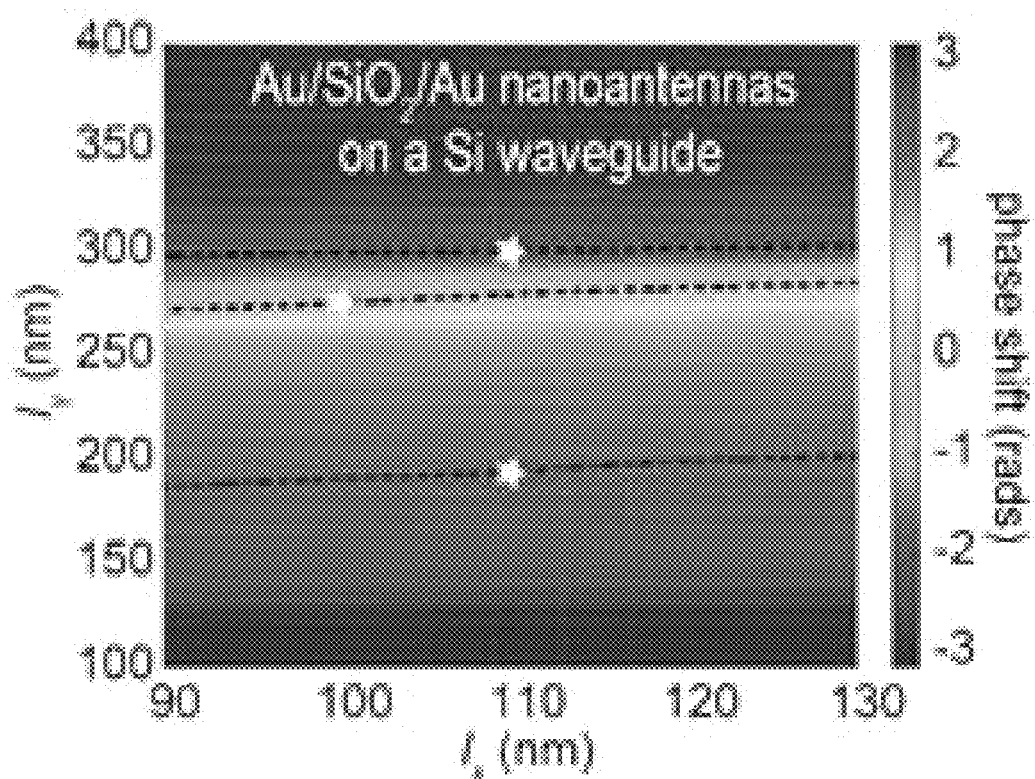
FIG. 2B is a pseudo-color map of the simulated abrupt phase shifts in a parameter space spanned by the meta-atom width ($l_x$) and length ($l_y$).
Figure 2C:
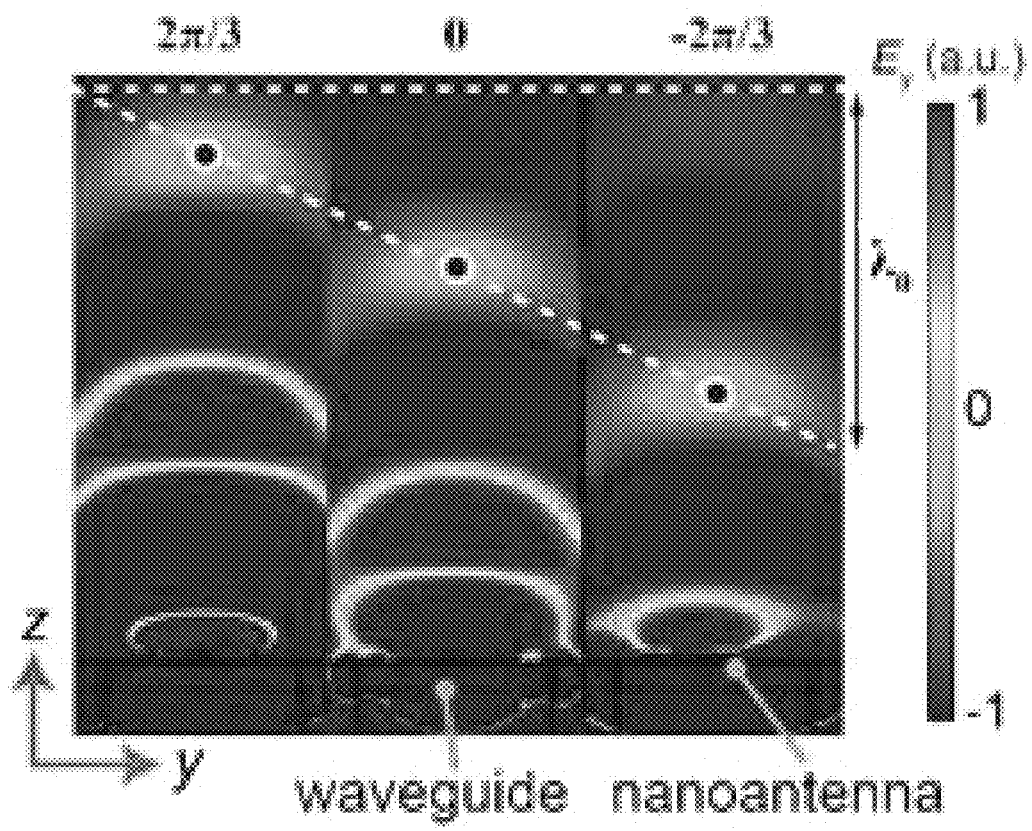
FIG. 2C shows a simulated electric field distribution ($E_y$) of the extracted waves from the three selected meta-atoms, showing abrupt phase shifts of $2\pi/3$, 0, and $-2\pi/3$, respectively.
Figure 2D:
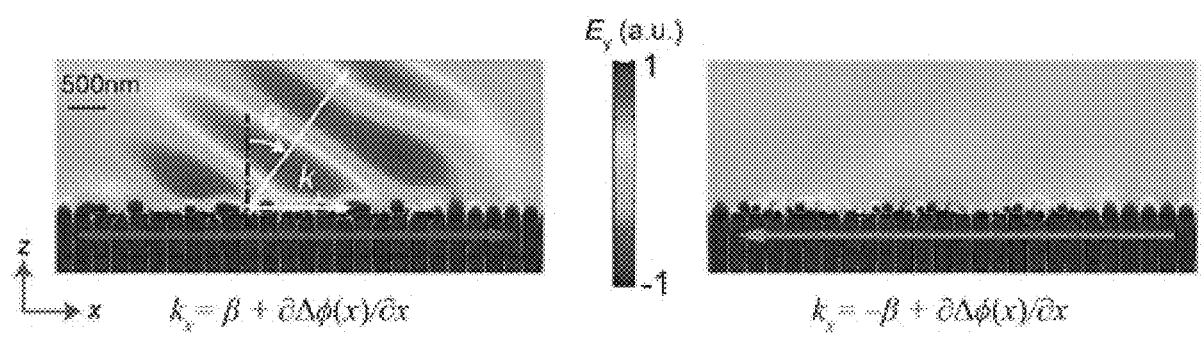
FIG. 2D shows an electric field distribution of the extracted light from a phase-gradient metasurface driven by forward-(left panel) and backward-(right panel) propagating guided waves.
Figure 3:
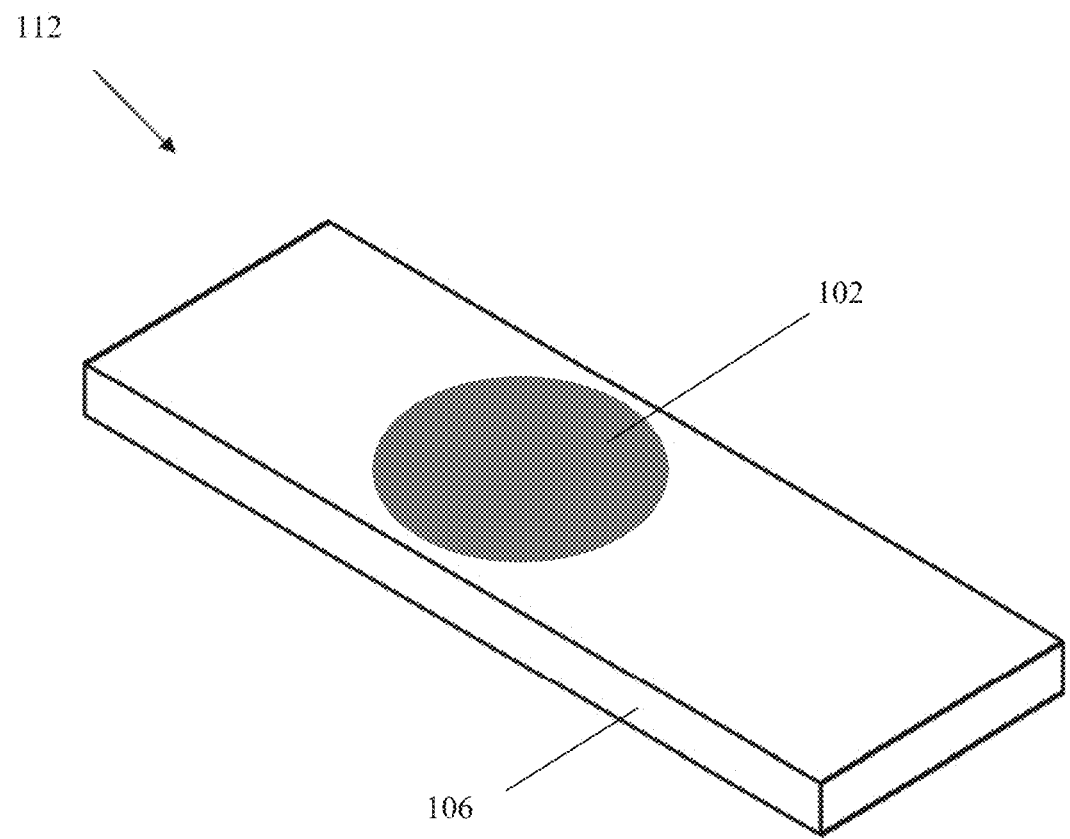
FIG. 3 shows an exemplary schematic of a metalens.
Figure 4:
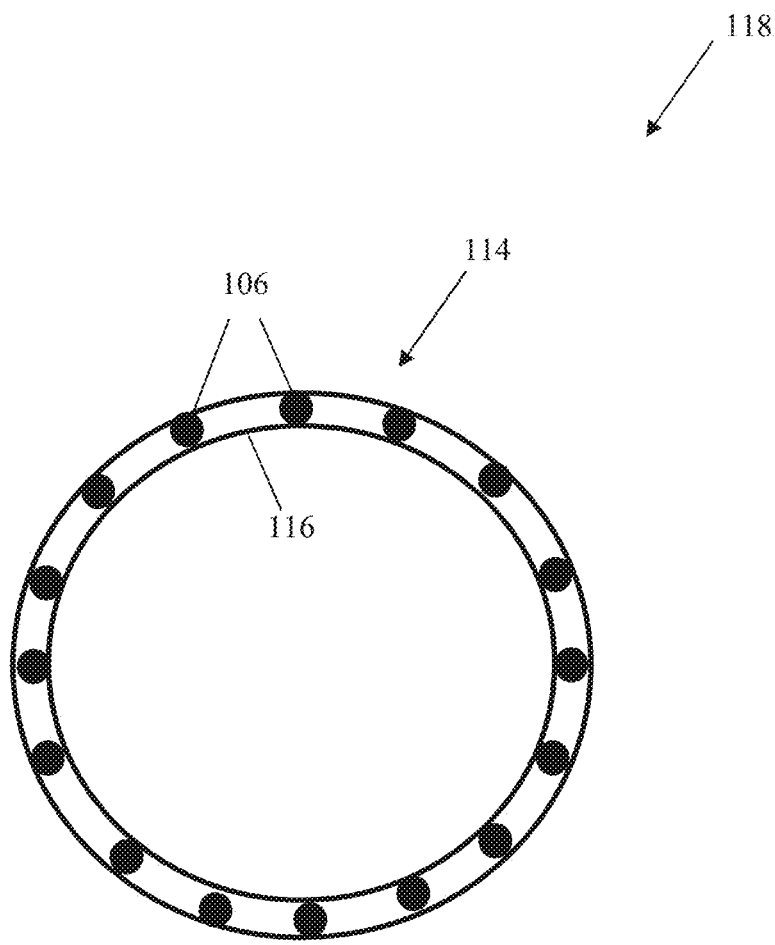
FIG. 4 shows an exemplary schematic of an orbital angular momentum laser.
Figure 5A:
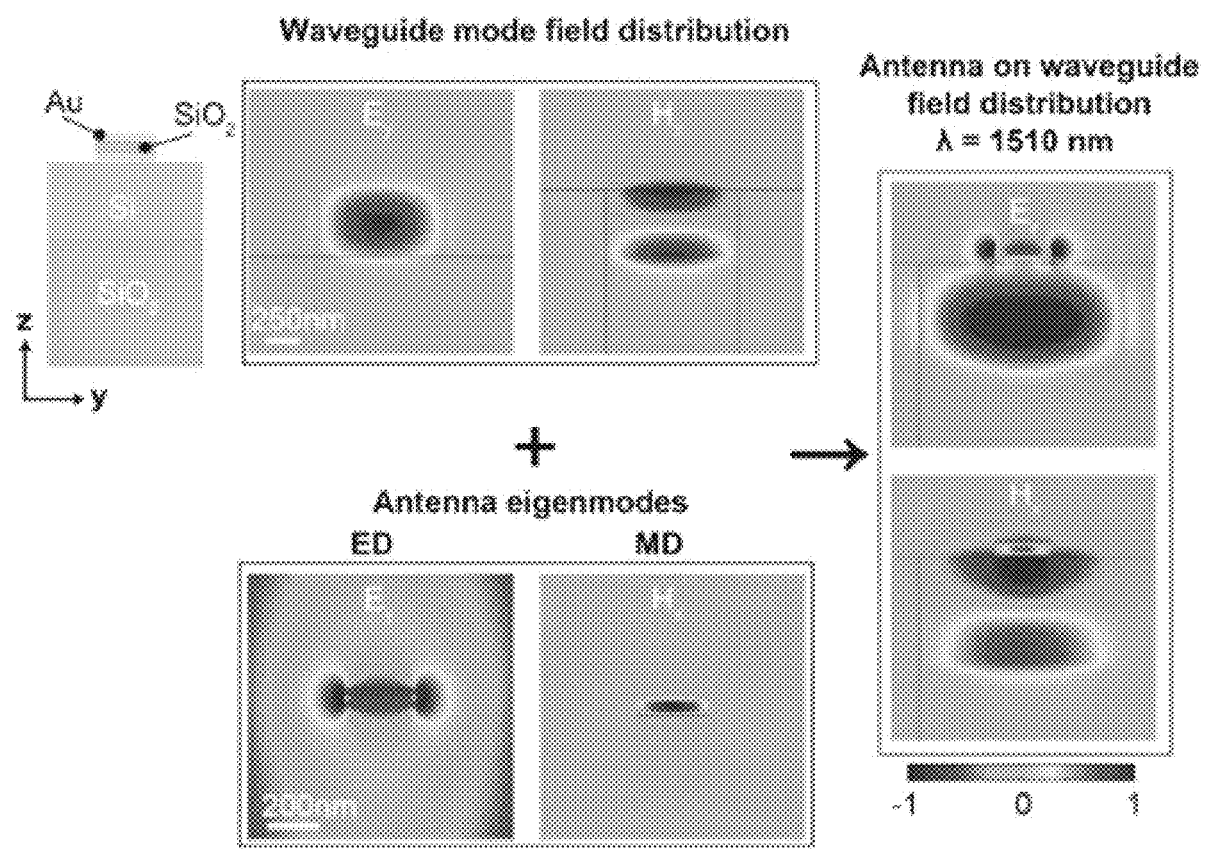
FIG. 5A shows the simulated field distribution of a silicon waveguide, Au/SiO2/Au sandwiched nanoantennas (lx=150 nm, ly=280 nm), and the integrated systems.
Figure 5B:
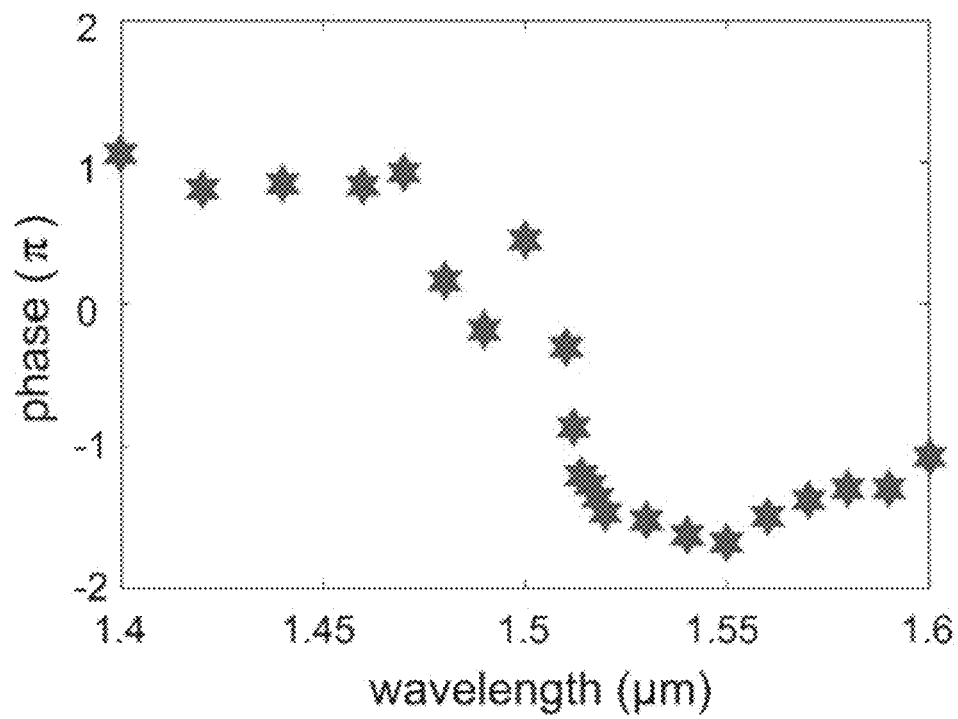
FIG. 5B shows the calculated scattering phase induced by Au/SiO2/Au sandwiched nanoantennas (lx=150 nm, ly=280 nm) at different wavelengths, showing a phase shift range greater than $2\pi$.

FIG. 2A is a schematic of a metal/dielectric/metal sandwich-structured meta-atom on top of a photonic integrated waveguide 106. The bottom left inset shows the simulated electric field distribution of the TE$_{00}$ guided mode propagating inside the waveguide 106. The bottom right inset is the simulated magnetic field distribution of the sandwich-structured nanoantenna 108, which indicates an effective magnetic dipole. FIG. 2B is a pseudo-color map of the simulated abrupt phase shifts in a parameter space spanned by the meta-atom 104 width ($l_x$) and length ($l_y$). A thickness of 30 nm was used for each layer. The meta-atom 104 was placed on top of a silicon ridge waveguide (height 220 nm). The three white stars indicate the meta-atom 104 designs covering 2π phase range with an even interval. It was ensured that the extracted waves from the chosen meta-atoms 104 have roughly the same amplitude of 1.5×10$^5$ V/m. FIG. 2C shows a simulated electric field distribution ($E_y$) of the extracted waves from the three selected meta-atoms 104, showing abrupt phase shifts of 2π/3, 0, and −2π/3, respectively. FIG. 2D shows an electric field distribution of the extracted light from a phase-gradient metasurface 102 driven by forward-(left panel) and backward-(right panel) propagating guided waves. The metasurface 102 includes an array of meta-atoms 104 that form a phase gradient ∂Δϕ(x)/∂x (which is along the −x direction in this example). The extracted light from a forward-propagating guided wave carries a transverse wavevector $k_x=\beta+\partial\Delta\phi(x)/\partial x$, where β is the propagation constant of the guided wave. It is launched into free space with a well-defined angle $\theta=\sin^{-1}(k_x/k_0)$. In contrast, light extracted from the backward-propagating wave gains a transverse wavevector so large that it exceeds the maximum supportable wavenumber in free space, and therefore it bounds to the metasurface 102 and eventually dies out due to ohmic loss from the materials The fundamental transverse electric mode (TE$_{00}$) in a dielectric rectangular waveguide (see FIG. 2A left inset) was used to excite resonant modes of meta-atoms 104 as its field distribution has a good spatial overlap with the electric dipolar mode in a nano-bar antenna 108. The thickness, width, and length of the sandwiched nanoantennas 108 were carefully chosen so that when the bottom gold cuboid is excited by the evanescent tail of a guided wave and induced an electric dipole, an antiparallel one can be induced in the top cuboids, therefore, an effective magnetic dipolar resonance is excited (See FIG. 5A). FIG. 5A shows the simulated field distribution of a silicon waveguide 106, Au/SiO2/Au sandwiched nanoantennas 108 (lx=150 nm, ly=280 nm), and the integrated systems. The antenna 108 exhibits electric dipole (ED) and magnetic dipole (MD) eigenmodes at 1400 nm and 1820 nm, respectively. At 1510 nm, the integrated system exhibits electric field and magnetic field distributions characteristic of the ED and MD, validating that the overlap of two resonances create the phase shift range over 2π. FIG. 5B shows the calculated scattering phase induced by Au/SiO2/Au sandwiched nanoantennas 108 (lx=150 nm, ly=280 nm) at different wavelengths, showing a phase shift range greater than 2π.

Figure 6A:
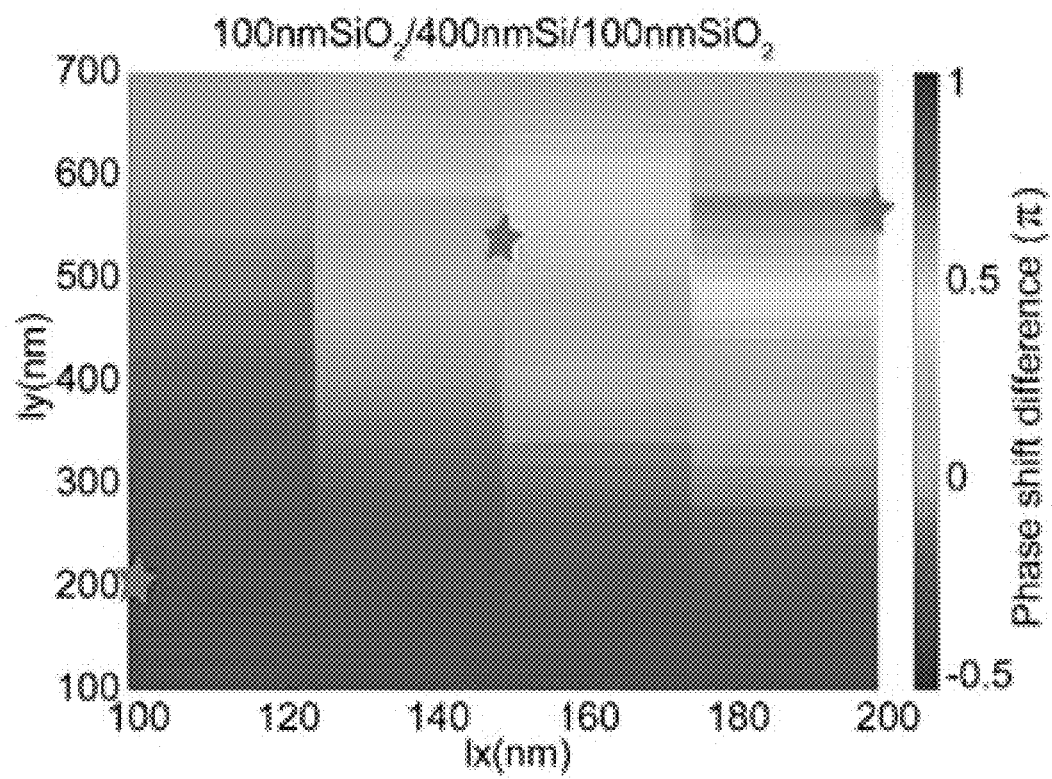
FIG. 6A shows a pseudo-color map of the simulated phase shifts generated by $SiO_2/Si/SiO_2$ nanoantennas with different lengths ($l_x$) and widths ($l_y$).
Figure 6B:
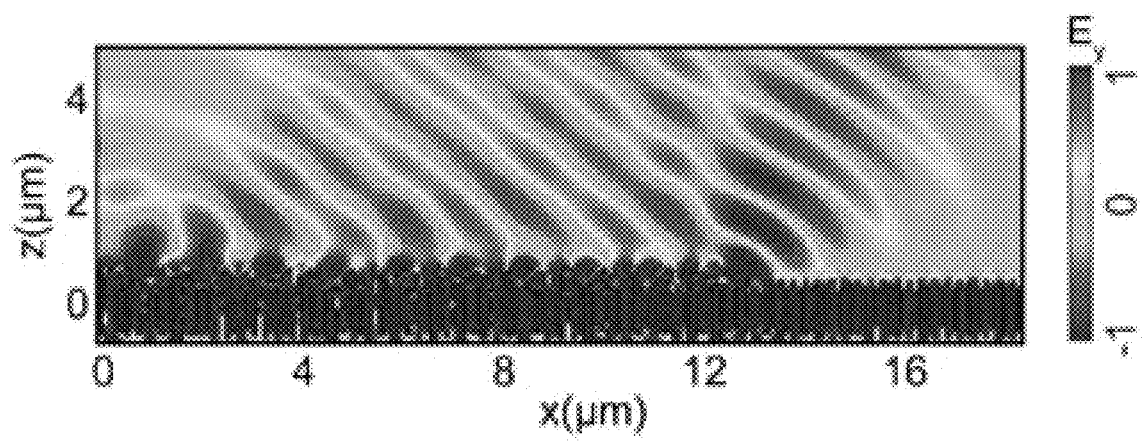
FIG. 6B shows a simulated electric field ($E_y$) distribution of the guided-wave-driven metasurface beam deflector using designs of (20 sets of supercells, $\Lambda$=680 nm).
Figure 6C:
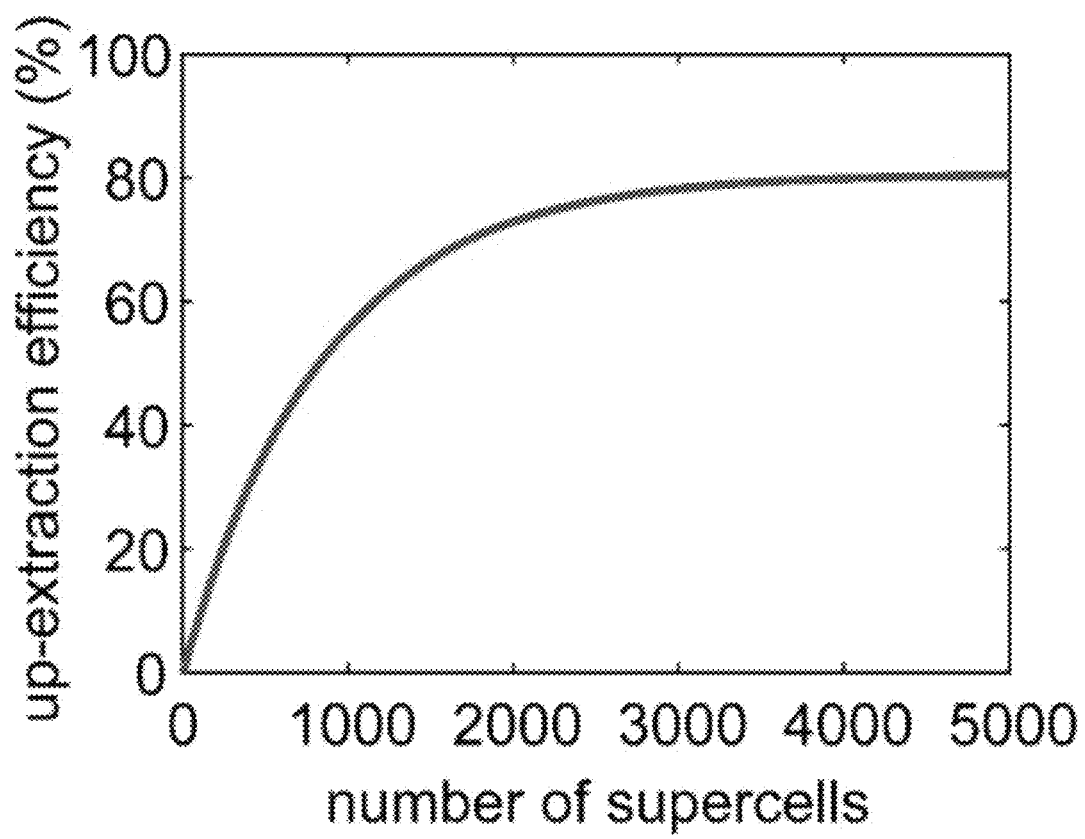
FIG. 6C shows calculated up-extraction efficiency.

Simultaneously, the electric dipoles induced in the top and bottom gold cuboids do not completely cancel out, resulting in a net electric dipolar resonance. The magnetic resonance combined with the electric one creates a directional radiation that extracts the guided wave to free space, and it also provides an abrupt phase shift range ~2π to the extracted wave (See FIGS. 6A-6C). FIG. 6A shows a pseudo-color map of the simulated phase shifts generated by SiO$_2$/Si/SiO$_2$ nanoantennas 108 with different lengths ($l_x$) and widths ($l_y$). Three meta-atom designs (marked by the red stars) with a constant phase shift difference of 2π/3 were selected to construct the supercell 110 used in simulation of beam deflector shown in FIG. 6B. FIG. 6B shows a simulated electric field ($E_y$) distribution of the guided-wave-driven metasurface beam deflector using designs of (20 sets of supercells, Λ=680 nm). FIG. 6C shows calculated up-extraction efficiency. The up extraction plateaued around 80%.

This abrupt phase shift can be tuned by varying the geometrical parameters of the meta-atoms 104. In addition, by controlling the amount of spatial mode overlap between the antenna mode and the guided mode, amplitude of the extracted wave can be flexibly adjusted. With the light extraction and control capabilities of meta-atoms 104, various free-space optical functions can be realized by distributing them strategically along the waveguide 106. In order to show the capability of the guided-wave-driven metasurfaces 102, off-chip beam deflection and light focusing were numerically and experimentally demonstrated directly from a photonic integrated waveguide 106. Additionally, by spatially arranging meta-atoms 104 on PICs with optical gain materials, a micrometer-sized photonic integrated microring laser 118 was created that directly emits vector optical vortices carrying well-defined, quantized orbital angular momentum (OAM).

According to Eq. (1), the linear momentum of extracted light along x direction is $k_x=\beta+\partial\Delta\phi(x)/\partial x$. If ∂Δϕ(x)/∂x is a constant, the extracted beam has a well-defined angle θ given by $\theta=\sin^{-1}(k_x/k_0)$, where $k_0$ is the free-space wave number. In contrast to grating couplers on PICs, the disclosed metasurface 102 approach introduces abrupt and large phase shifts with a subwavelength spacing, which eliminates high-order diffractions and offers a much large beam deflection angle range.

An Au/SiO$_2$/Au sandwich-structured nanoantenna 108 were used as the meta-atoms 104 for beam deflection. The meta-atoms 104 were periodically distributed on a silicon waveguide to provide a phase gradient ∂Δϕ(x)/∂x=−2π/Λ, where Λ is the length of a supercell which consists of three meta-atoms with abrupt phase shifts $-2\pi/3$, $0$, and $-2\pi/3$. Therefore, the output angle of the extracted beam is $$\theta = \sin^{-1}\frac{1}{k_o}\left(\beta - \frac{2\pi}{\Lambda}\right)$$

(see FIG. 2D). The radiation phase shift with respect to the guided wave right underneath the meta-atom was simulated using full-wave finite element method (FEM). Meta-atom designs were chosen that have a uniform amplitude of the extracted wave while having phase shifts that cover entire $2\pi$ phase range, as indicated by the white stars in FIG. 2B. The simulated electrical field distribution for the three selected meta-atoms 104 on the waveguide 106 validates that the extracted waves have uniformly distributed abrupt phase shifts spaced by $2\pi/3$ (see FIG. 2C). The asymmetric coupling effect can be observed by reversing the propagation direction of the guided wave. The resulting momentum along the x direction becomes $k_x=-\beta-2\pi/\Lambda$ which is too large to be supported in free space (see FIG. 2D, left panel). In this case, the extracted wave bounds to the metasurface 102 and eventually dies out due to ohmic loss from the materials. It is worth noting that reciprocity of the system is preserved as the transmitted power in the waveguide for the forward- and backward-propagating waves is equal.

Figure 7A:
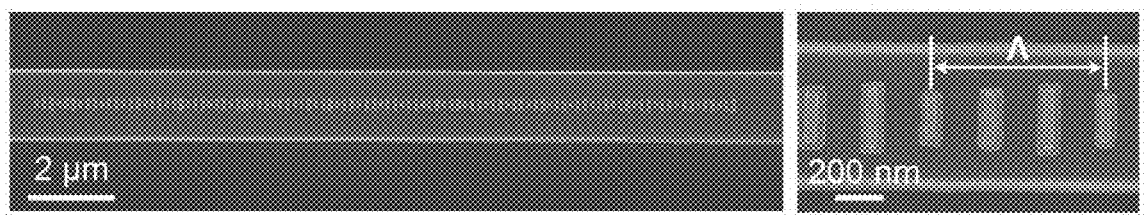
FIG. 7A shows field emission scanning electron microscope (FESEM) images of a guided-wave-driven metasurface on a silicon waveguide (220 nm thick and 600 nm wide).
Figure 7B:
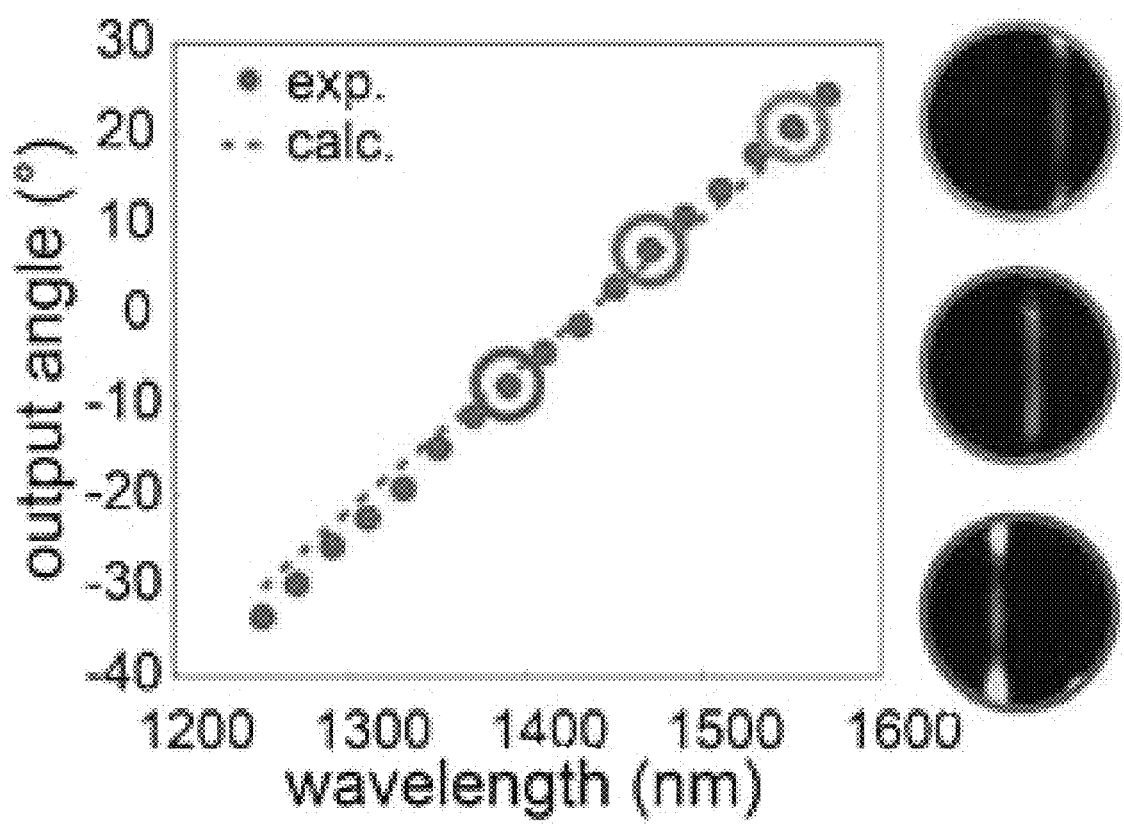
FIG. 7B shows output beam angle versus the incident guided wave wavelength with supercell size $\Lambda$=575 nm measured by our Fourier-space imaging system.
Figure 7C:
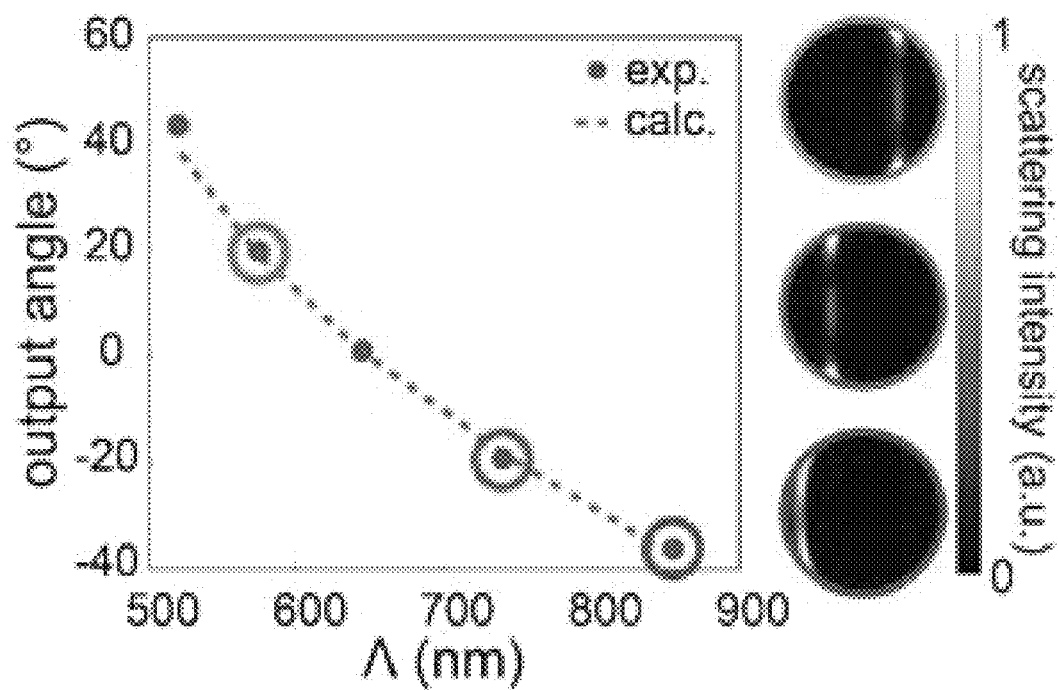
FIG. 7C shows output beam angle versus the supercell 110 size at 1550 nm wavelength.

The beam deflection samples were fabricated using two electron beam lithography steps with precise alignment to define the silicon waveguide 106 and the meta-atoms 104 (see FIG. 7A). FIG. 7A shows field emission scanning electron microscope (FESEM) images of a guided-wave-driven metasurface 102 on a silicon waveguide 106 (220 nm thick and 600 nm wide). Each supercell 110 comprises three meta-atoms 104 as depicted in FIG. 2B. FIG. 7B shows output beam angle versus the incident guided wave wavelength with supercell 110 size $\Lambda=575$ nm measured by our Fourier-space imaging system (see FIG. 8). The blue dots and the red dashed line depicts the experimentally measured and the simulated data, respectively. Three typical Fourier-space images of the extracted free-space light corresponding to the circled data points are shown on the right. The horizontal and vertical axes represent $k_x$ and $k_y$ respectively. An objective with numerical aperture (NA) of 0.95 was used in the measurements. FIG. 7C shows output beam angle versus the supercell 110 size at 1550 nm wavelength. The blue dots and the red dashed line depict the experimentally measured and the simulated data, respectively. Three typical Fourier-space images are shown on the right.

Figure 8:
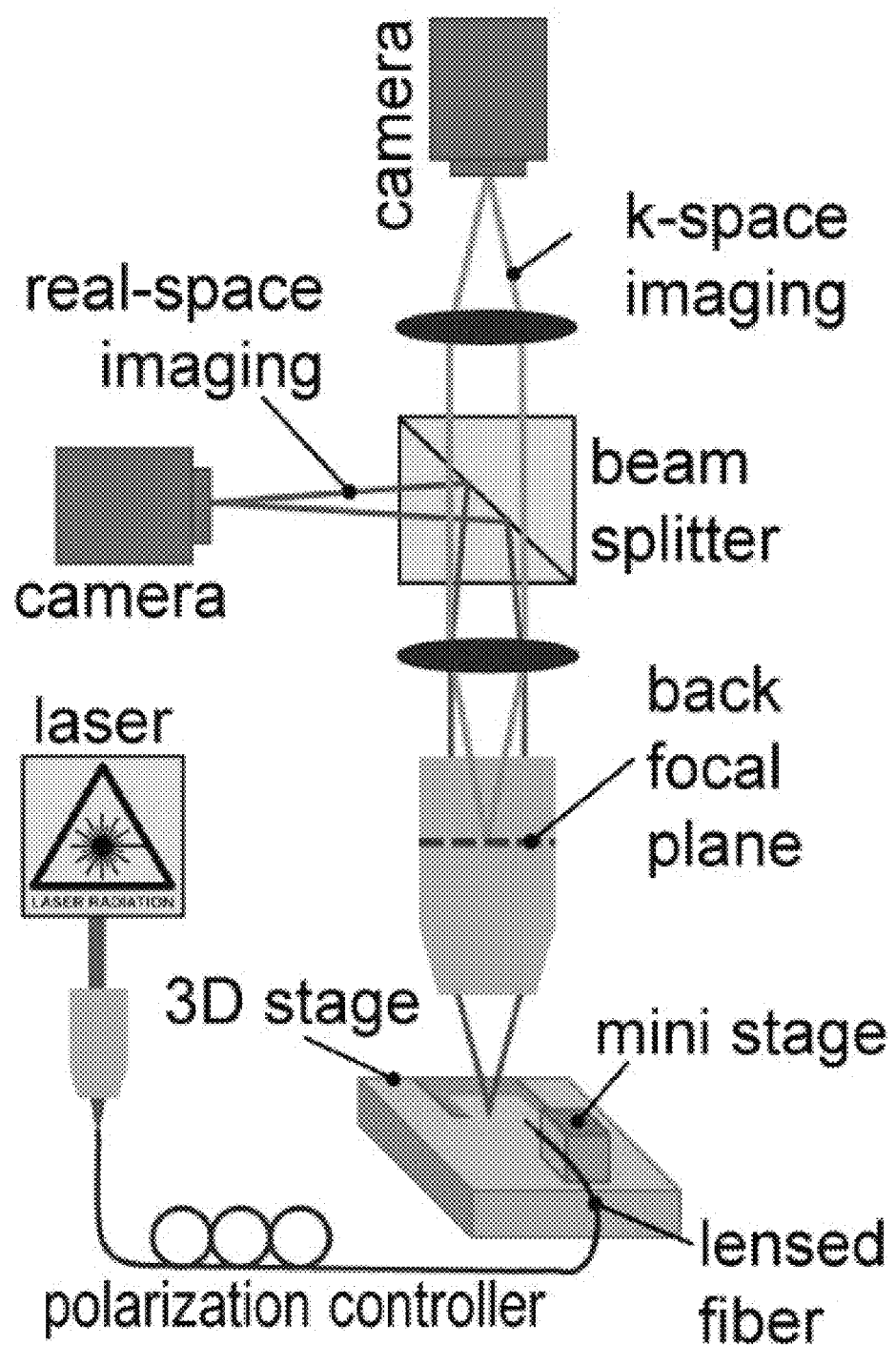
FIG. 8 shows an experimental setup for the off-chip beam steering and focusing measurements.

FIG. 8 shows an experimental setup for the off-chip beam steering and focusing measurements. A free-space laser beam emitted from a Ti:Sapphire laser pumped OPO was coupled into a tapered lensed single-mode fiber and then to the input port of the sample. The extracted light in free space was collected by an objective (NA=0.95) and then transmitted through a tube lens. The light was partially reflected by a non-polarizing beam splitter for real-space imaging. The rest light was transmitted through the beam splitter and was focused by a Bertrand lens to form Fourier-space images.

Figure 9A:
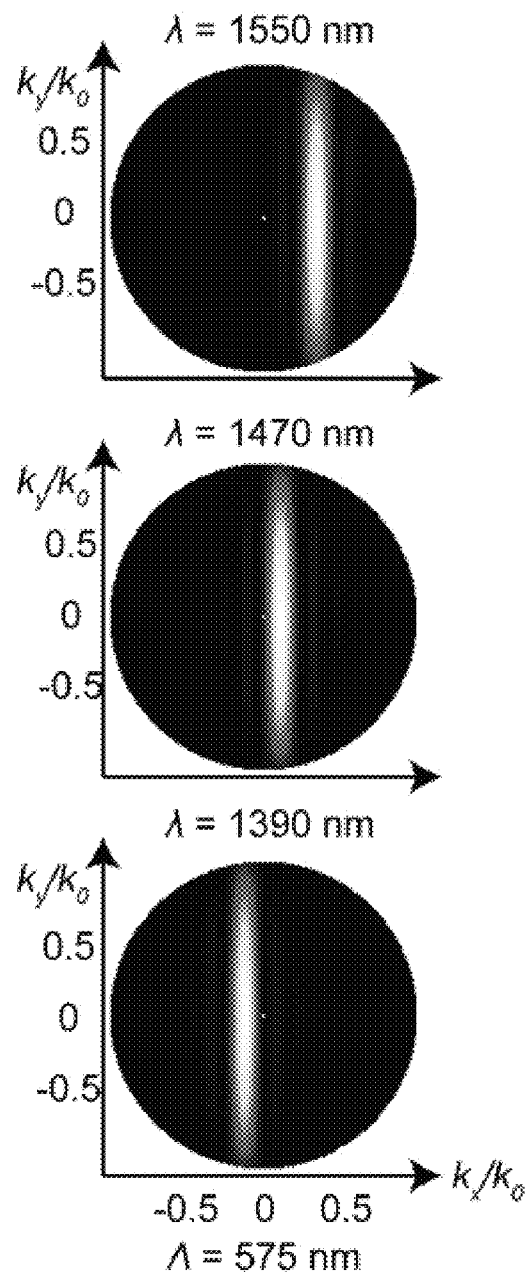
FIG. 9A shows simulated Fourier-space images of the extracted light at different wavelengths from a metasurface with supercell size of 575 nm.
Figure 9B:
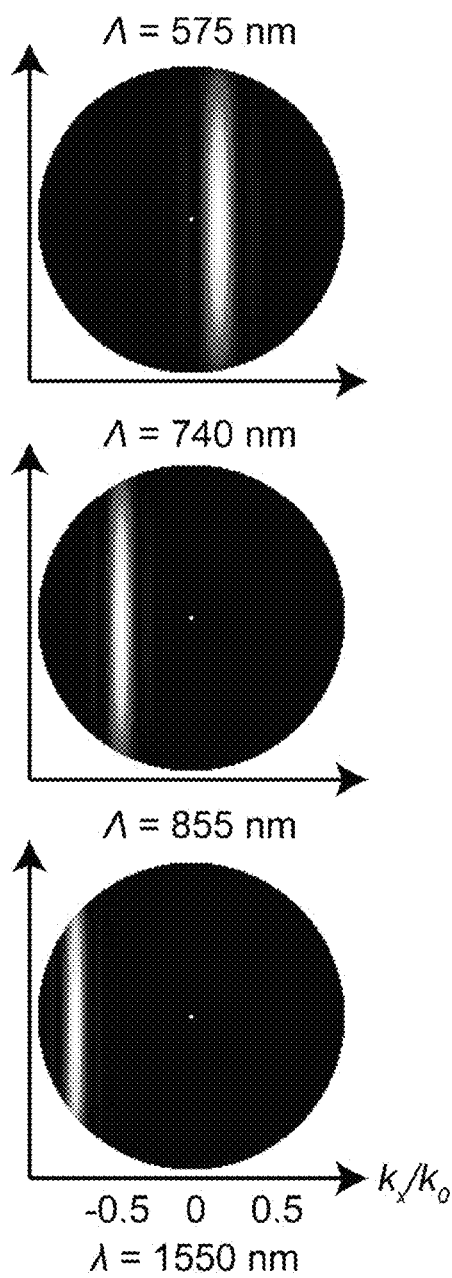
FIG. 9B shows simulated Fourier-space images of the extracted light from metasurfaces with different supercell sizes at 1550 nm wavelength.

Different lengths of supercells 110 were chosen to demonstrate flexible control of the beam deflection angles. The propagation constant $\beta$ was numerically calculated for the fundamental TE modes at different wavelengths. Fourier-space imaging system was employed to measure the scattering angles. The output angles with different wavelengths and supercell 110 periods, respectively, were experimentally measured and the results agree well with those from our theoretical calculations (see FIGS. 7B and 7C). The slight discrepancy originates from fabrication error. The line-shaped intensity profile in Fourier space reveals the in-plane wavevector of the extracted light, where $k_x$ is determined by the metasurface and $k_y$ spans the whole Fourier plane because no phase modulation is applied in y direction. The divergence of the steering angle, which is depicted by the width of the line, is inversely related to the length of the metasurface 102 region. The bright ends of the lines (near the cut-off lines in Fourier space images limited by the numerical aperture (NA=0.95) of the objective) are originated from the internal reflection in the objective. The Fourier space images were also validated by theoretical calculations (see FIG. 9). FIG. 9A shows simulated Fourier-space images of the extracted light at different wavelengths from a metasurface 102 with supercell 110 size of 575 nm. FIG. 9B shows simulated Fourier-space images of the extracted light from metasurfaces 102 with different supercell 110 sizes at 1550 nm wavelength.

The efficiency of the device was estimated using full-wave numerical simulations, which shows a theoretical limitation of 9% due to the existence of large absorption loss from the metallic components. However, this can be alleviated by using pure dielectric $SiO_2/Si/SiO_2$ sandwiched nano-antennas 108 which have no material loss in telecommunication wavelengths range. The efficiency can be controlled by the number of supercells 110 integrated on the waveguides 106, and a maximum value as high as 80% can be expected with enough numbers of supercells 110. Although the current demonstration used a single set of meta-atoms 104 that were uniformly placed on the waveguide 106, inspired by the designs of apodized gratines (29-31), the meta-atom densities can be varied or multiple sets of meta-atoms 104 with different scattering efficiencies can be used to balance the extraction efficiency everywhere with the propagation/extraction loss of the waveguide mode. In either case, spatial-variant scattering efficiencies along the waveguide 106 can be achieve, and hence uniform-intensity extraction can be done. Alternatively, arbitrary extraction intensity profiles, e.g. a Gaussian beam profile, can be constructed.

In addition, by spatially arranging the meta-atoms 104 along a waveguide 106 to fulfill a lens phase function $\phi(x)=-k_0\sqrt{x^2+f^2}$, the wave can be focused in free space with a designated focal length f. Therefore, considering Eq. (1) the abrupt phase shifts provided by the meta-atoms 104 should be:

$$\Delta\phi(x)=-k_0\sqrt{x^2+f^2}-\beta x. \qquad (2)$$

Figure 10A:
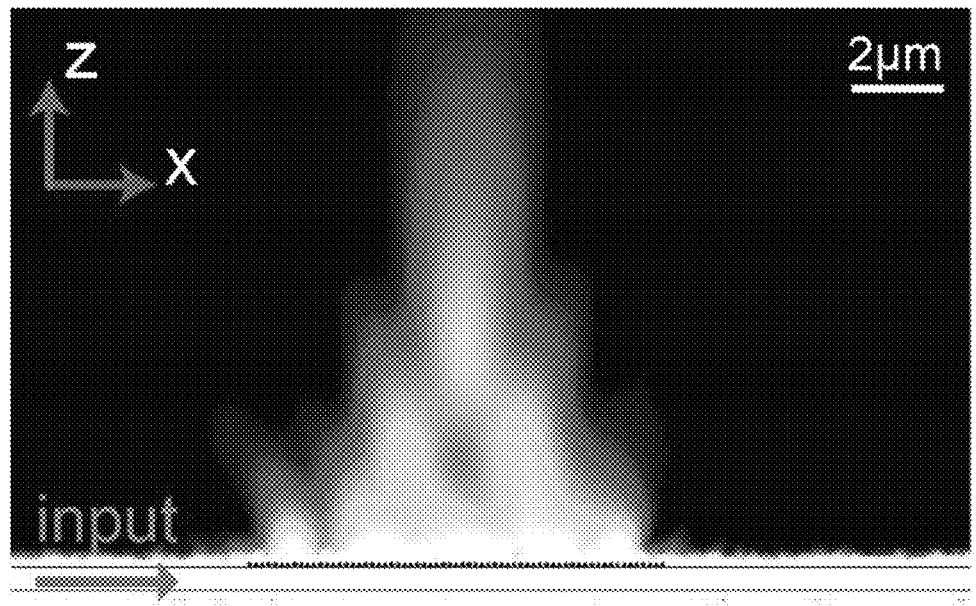
FIG. 10A shows a simulated electric field distribution above a guided-wave-driven metalens on a silicon waveguide (500 nm thick and 1.5 μm wide).
Figure 10B:
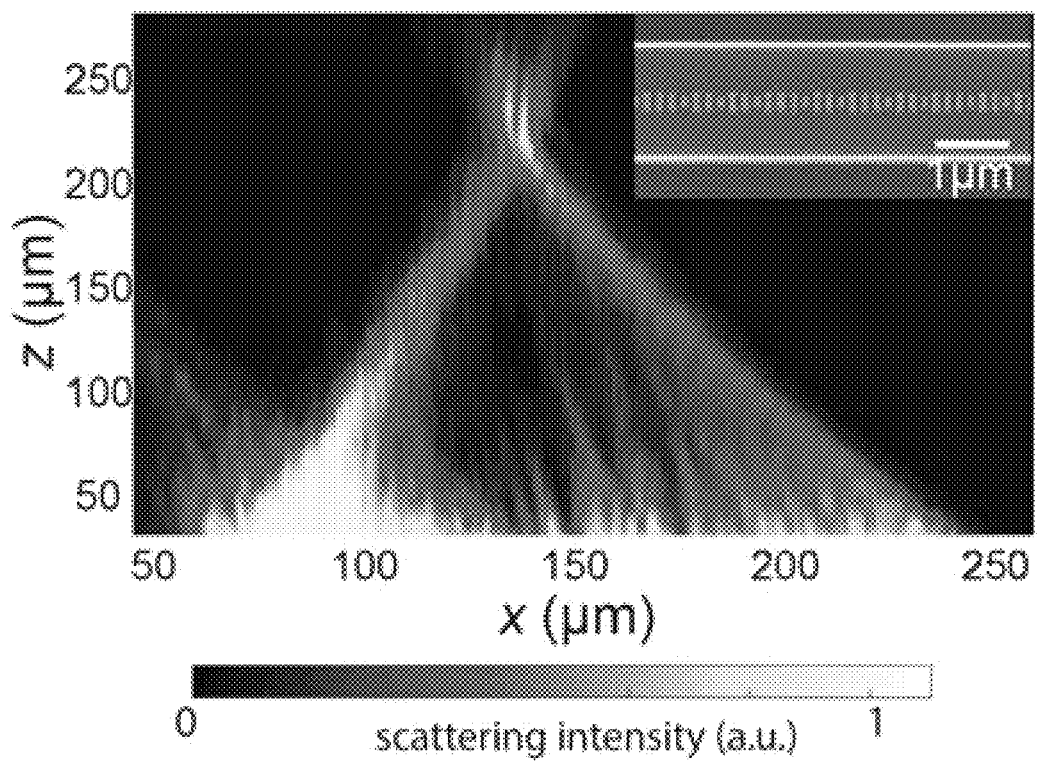
FIG. 10B is an experimentally measured intensity profile of the focusing effect of a fabricated device.

As a proof of concept, a metalens 112 on a silicon waveguide 106 with a focal length f=5 µm was simulated (we chose a short focal length in order to reduce the demand for computational resources) at 1550 nm (see FIG. 10A). FIG. 10A shows a simulated electric field distribution above a guided-wave-driven metalens 112 on a silicon waveguide 106 (500 nm thick and 1.5 µm wide). The extracted light converged at the designed focal point (5 µm above the waveguide) at 1550 nm wavelength. FIG. 10B is an experimentally measured intensity profile of the focusing effect of a fabricated device. The inset shows an FESEM image of the metasurface region. The designed focal length is 225 µm.

Evidently, light is extracted and focused into free space by the metalens 112. A larger guided-wave-driven metalens 112 was fabricated with a focal length of 225 µm. The intensity distribution at different heights above the waveguide 106 was measured and reconstructed in the xz plane (see FIG.

Figure 11A:
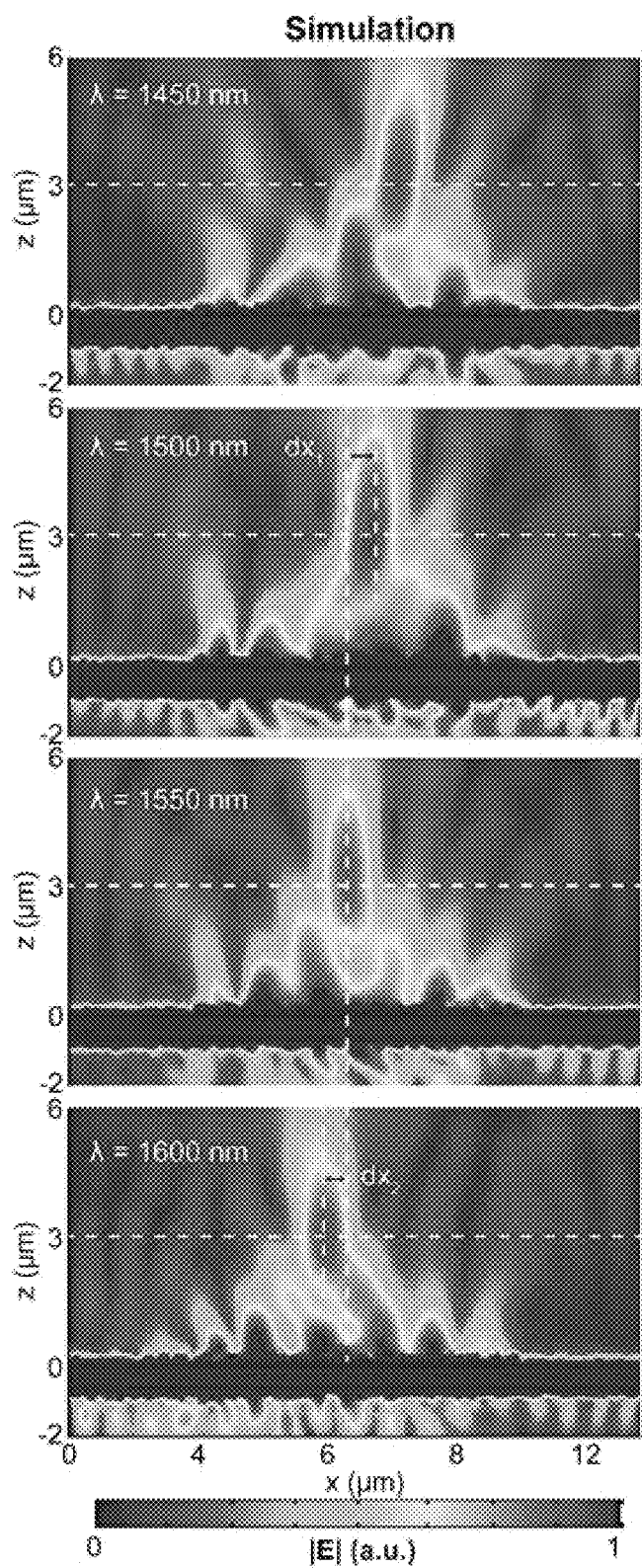
FIG. 11A shows simulated guided-wave-driven off-chip focusing at different wavelengths.
Figure 11B:
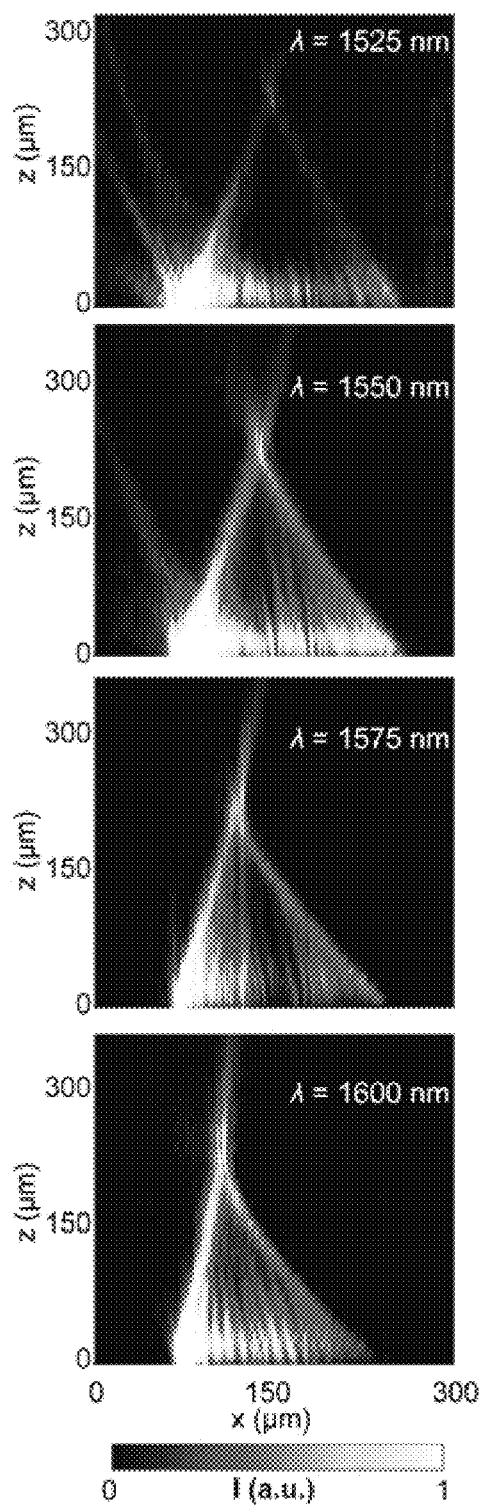
FIG. 11B shows experimentally measured guided-wave-driven off-chip focusing at different wavelengths.

10B), which shows clear focusing effect matching the simulation results. In addition, the light focusing effect was also observed at different wavelengths both by simulations and experiments (see FIG. 11). FIG. 11A shows simulated guided-wave-driven off-chip focusing at different wavelengths. FIG. 11B shows experimentally measured guided-wave-driven off-chip focusing at different wavelengths. The focal distance of simulated device is 3 µm, and the focal distance of the sample is 225 µm.

Figure 12A:
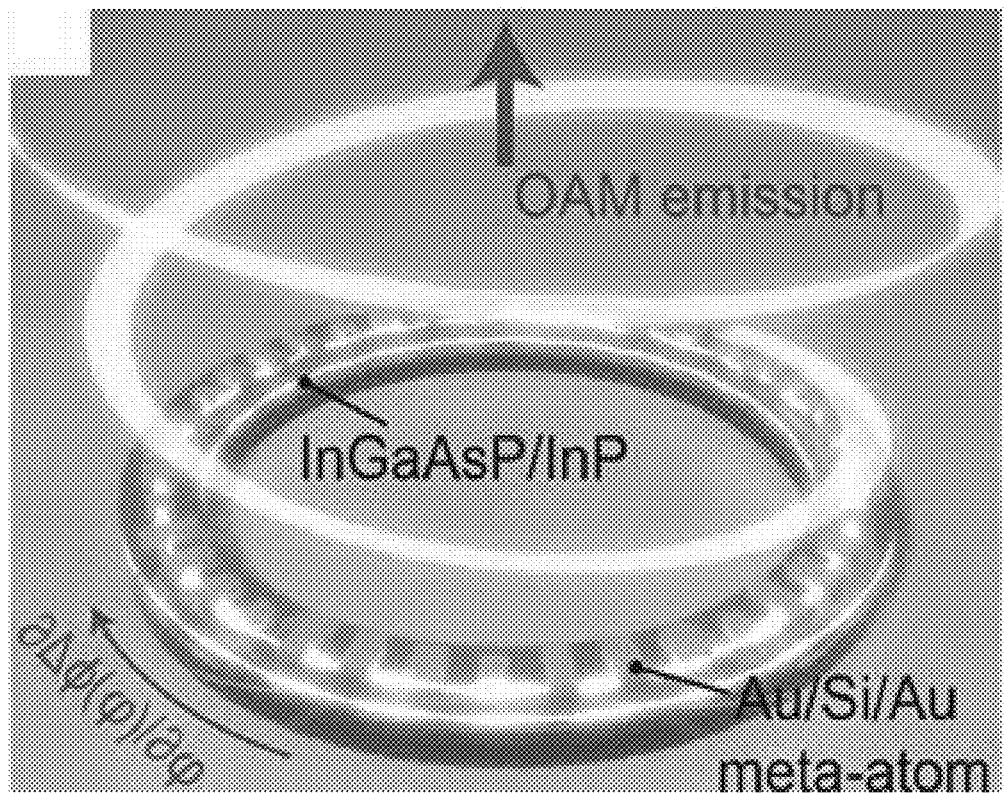
FIG. 12A shows a schematic of a micro-ring OAM laser enabled by the guided-wave-driven metasurface.
Figure 12B:
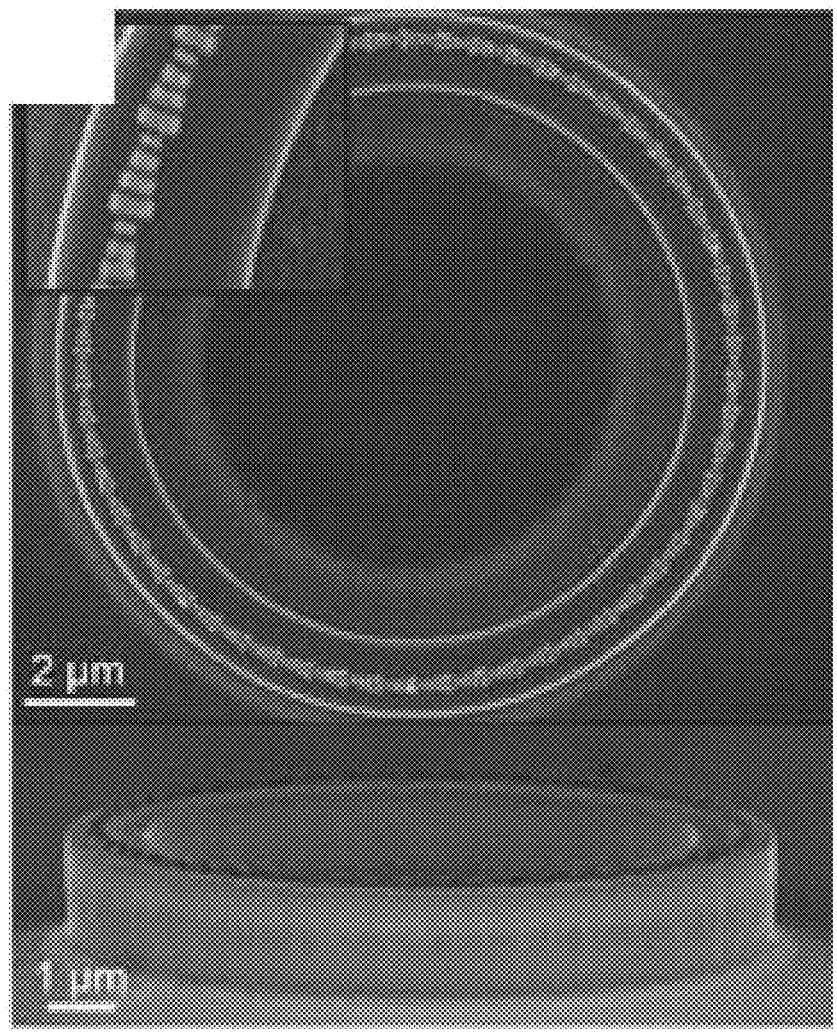
FIG. 12B shows FESEM images of a fabricated device.
Figure 12C:
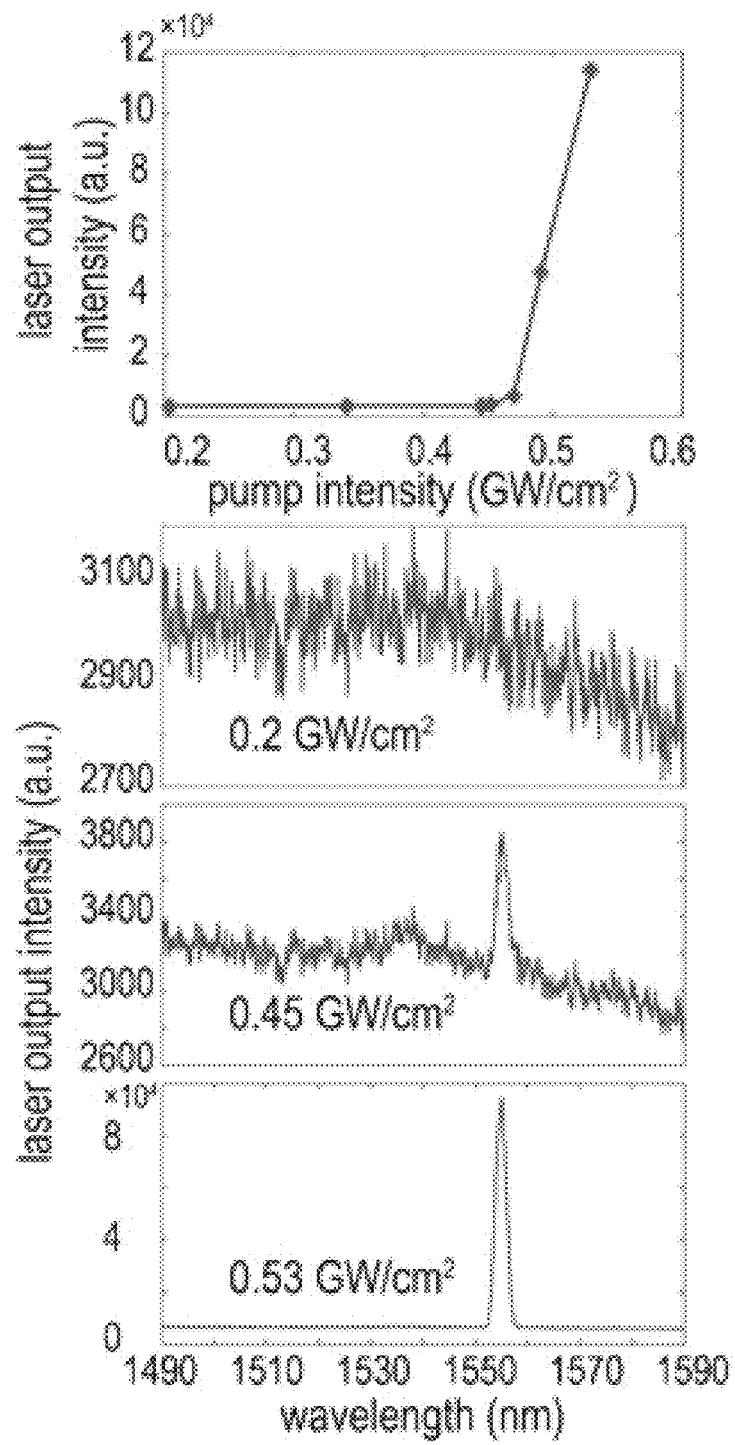
FIG. 12C shows a light-light curve of the micro-ring laser (top row), which shows a lasing threshold of about 0.47 $GW/cm^2$ at 1555 nm wavelength.
Figure 12D:
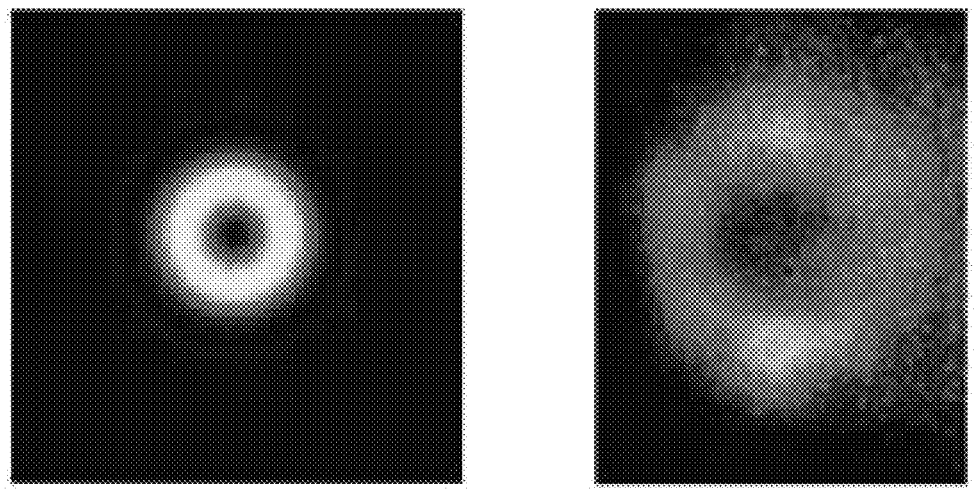
FIG. 12D shows a far-field intensity distribution of the OAM laser radiation captured by an infrared camera (right panel), which matches well with the simulated one (left panel).
Figure 12E:
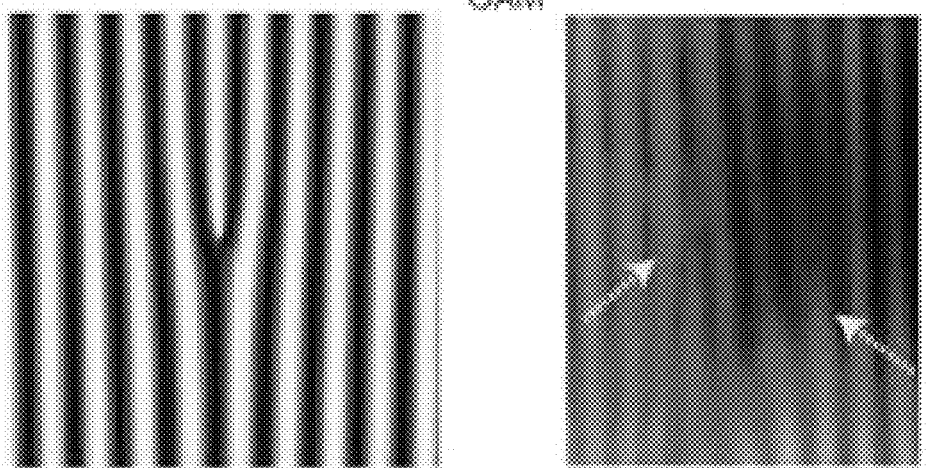
FIGS. 12E and 12F show calculated (left panels) and measured (right panels) self-interference patterns of OAM laser radiation.
Figure 12F:
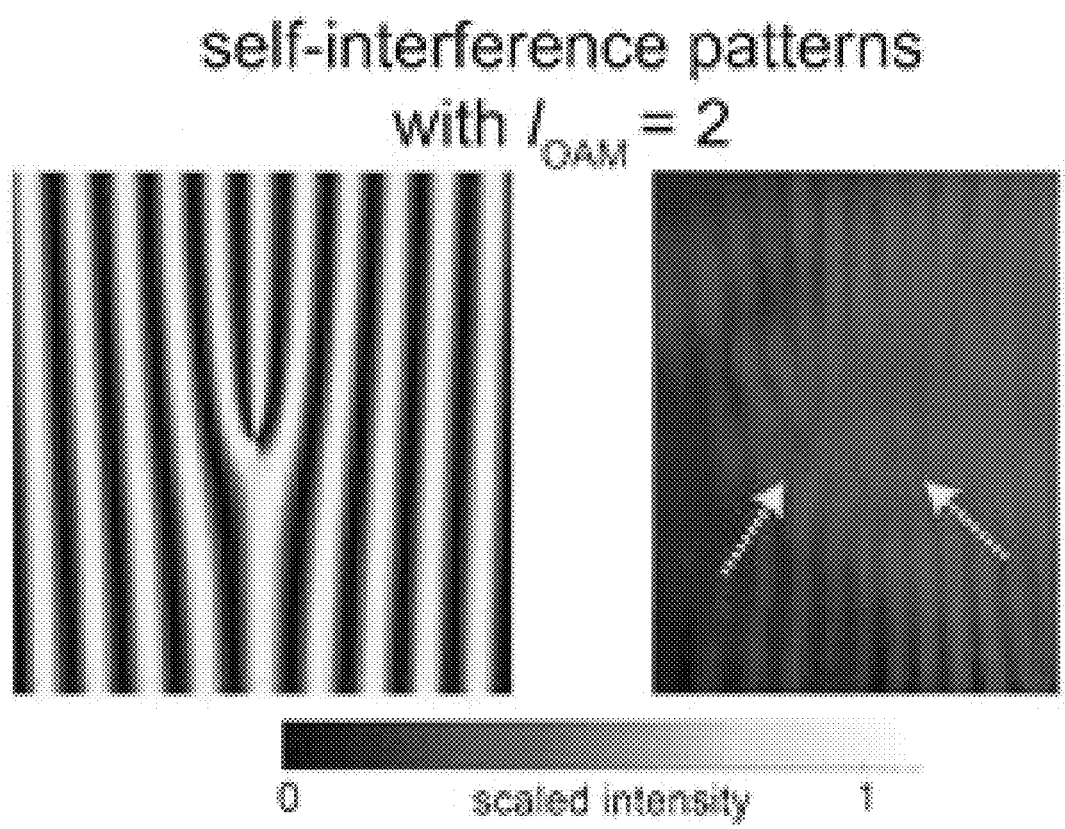

Leveraging the asymmetric coupling induced by the guided-wave-driven metasurface 102, a photonic integrated micro-ring OAM laser 118 (see FIG. 12A) can be created. FIG. 12A shows a schematic of a micro-ring OAM laser 118 enabled by the guided-wave-driven metasurface 102. Unidirectional phase modulation provided by the metasurface 102 breaks the degeneracy of the CCW and CW WGMs inside the micro-ring resonator, leading to a selective OAM radiation. FIG. 12B shows FESEM images of a fabricated device. The diameter of the micro-ring XX is 9 µm and the width is 1.1 µm, and it comprises a 500-nm InGaAsP MQW layer and a 1-µm InP layer. A supercell 110 of the metasurface 102 comprises four Au/Si/Au meta-atoms 104, which provides the extracted wave with abrupt phase shifts from 0 to 2π. The total number of supercells 110 on the micro-ring XX is N=58. FIG. 12C shows a light-light curve of the micro-ring laser 118 (top row), which shows a lasing threshold of about 0.47 GW/cm² at 1555 nm wavelength. Three emission spectra corresponding to different stages—photoluminescence, amplified spontaneous emission, and lasing—of the laser are shown from $2^{nd}$ to the last row. FIG. 12D shows a far-field intensity distribution of the OAM laser radiation captured by an infrared camera (right panel), which matches well with the simulated one (left panel). Both figures show an annular shape. FIGS. 12E and 12F show calculated (left panels) and measured (right panels) self-interference patterns of OAM laser 118 radiation. The calculation only took into account the interference between a plane wave and an OAM beam; therefore, it shows one set of fork in the interference pattern. The double-fork (F) and triple-fork (G) in the fringe patterns confirmed that the resulting OAM emission has a topological charge of +1 (F) and +2 (G), respectively.

Light beams with an azimuthal phase profile of the form exp(ilφ) carry an OAM of lh (32), where l is an integer known as the topological charge, and φ is the azimuthal angle with respect to the propagation direction. Light can have infinite number of orthogonal OAM states essentially. This unique property makes it an excellent candidate for encoding information in both classical (33, 34) and quantum (55, 36) optical communications as well as many other applications (37). A conventional system for generating OAM light usually has two separate parts—a light source and an optical component for spatial phase modulation, e.g. spatial light modulator (38), phase plates (39, 40), and metasurfaces (41), which makes it bulky, poor in scalability, and difficult for on-chip integration. A compact, integratable, and scalable source directly emits OAM light (42, 43) is highly desirable.

The micro-ring resonator 114 intrinsically supports two degenerate whispering gallery modes (WGMs)—a clockwise (CW) and a counter-clockwise (CCW) mode. These modes by themselves carry high-order OAM. But due to the inversion symmetry of the micro-ring, the OAMs of the CW and CCW modes have opposite signs and the net OAM is zero (43). In order to obtain controllable OAM emission, the metasurface 102 accomplishes three functions: (1) Extract light from the micro-ring XX without destroying the guided modes; (2) Break the degeneracy of the two WGM modes to get non-zero net OAM emission; (3) Control the topological charge of the OAM.

Due to the asymmetric coupling effect of the guided-wave-driven metasurface 102, only one of the two counter-propagating WGMs can couple to the free-space emission, and therefore it is possible to break the degeneracy of the WGMs and achieve a controllable OAM emission. As the degenerate WGMs interact with the metasurface on a micro-ring that introduces a unidirectional phase gradient ∂φ/∂φ (φ is the azimuth angle), the radiated light of CW and CCW mode will gain additional but opposite momenta. One radiation mode will gain too large k to propagate in free space, while the other one can be successfully launched into free space with a well-defined OAM order.

Let us suppose we want the CCW mode to be extracted and form OAM emission in free space. The propagation constant of the $M^{th}$-order CCW WGM is given by $\beta_{CCW}=2\pi n_m/\lambda=M/R$, where $n_m$ is the modal index and R is the micro-ring radius. The guided-wave-driven metasurface 102 is placed on the micro-ring so that it induces a phase gradient that is equivalent to a wave number $k_{ms}=-2\pi/\Lambda$, where the phase shifts provided by the meta-atoms decreases linearly along the CCW direction. The azimuthal phase dependence of OAM emission can be expressed as $\phi_{OAM}(\varphi)=l\varphi$. Due to momentum conservation, the following condition should be satisfied:

$$l\varphi = \phi_{OAM} = \phi_{CCW} + \phi_{ms} = \beta_{CCW}R\varphi - \frac{2\pi}{\Lambda}R\varphi. \quad (3)$$

Assuming the total number of metasurface supercells 110 on the micro-ring is $$N = \frac{2\pi R}{\Lambda},$$

a well-defined topological charge can be obtained from Eq. (3):

$$l=M-N \quad (4)$$

which can be easily engineered either by tuning the order of the WGM mode or by placing different numbers of supercells on the micro-ring XX.

An OAM laser 118 was designed based on an InGaAsP/InP multi-quantum-well (MQW) micro-ring resonator 114. Four Au/Si/Au sandwich-structured meta-atoms 104 covering 2π abrupt phase shift range (see FIG. 13A) were used to construct one metasurface supercell 110 and patterned periodically on top of the micro-ring XX.

Figure 13A:
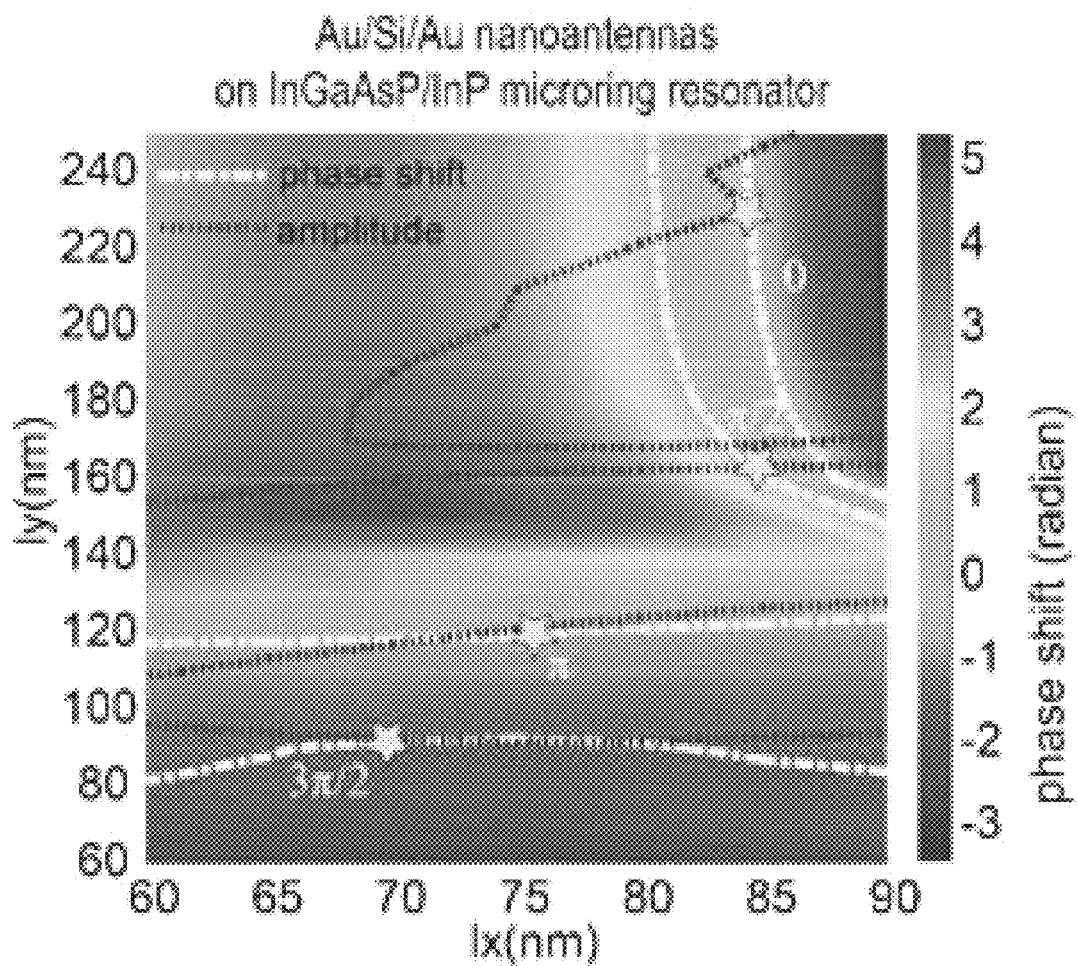
FIG. 13A shows a pseudo-color map of the simulated abrupt phase shifts overlaid with amplitude contours generated by the Au/Si/Au meta-atoms with different lengths ($l_x$) and widths ($l_y$).
Figure 13B:
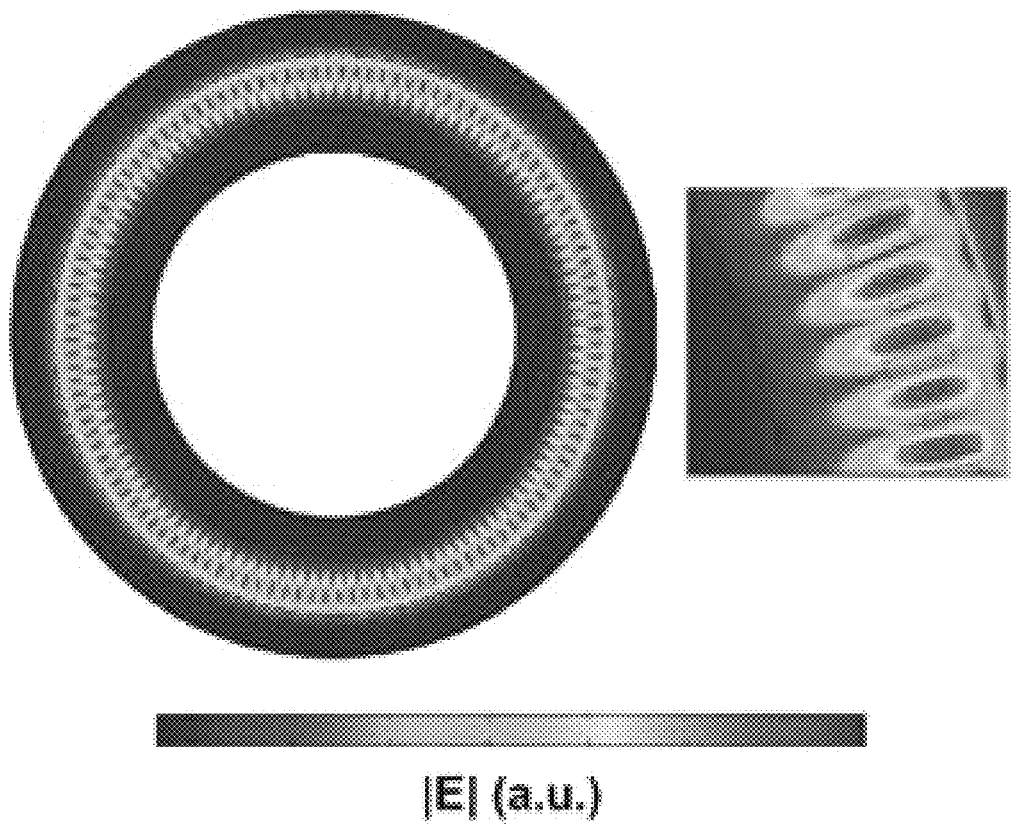
FIG. 13B shows the simulated electric field distribution of the micro-ring resonator (diameter=9 μm, width=1.1 μm and height=1.5 μm) with WGM order M=59.
Figure 13C:
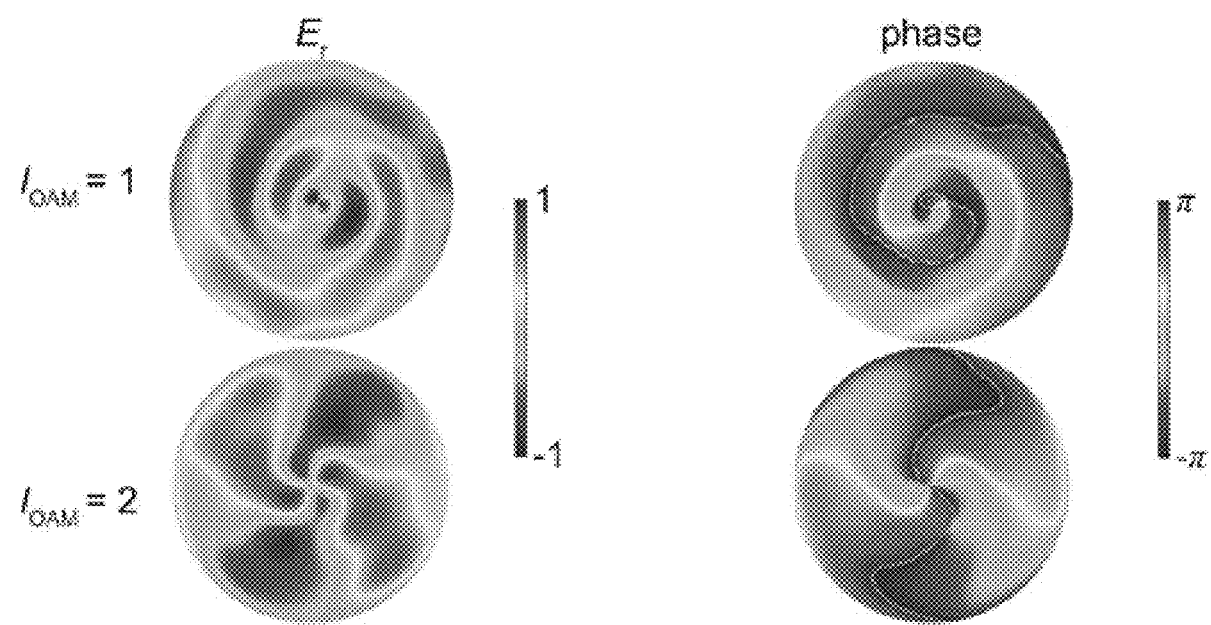
FIG. 13C shows simulated electric field (radial component) and phase distribution of emitted wave with different numbers of metasurface supercells N.

FIG. 13A shows a pseudo-color map of the simulated abrupt phase shifts overlaid with amplitude contours generated by the Au/Si/Au meta-atoms with different lengths ($l_x$) and widths ($l_y$). Four meta-atom designs (marked by the yellow stars) with a constant phase shift difference of π/2 were selected to construct the metasurface supercell 110. The black dashed line is the contour of the extracted electric field amplitude of 2×10⁵ V/m. FIG. 13B shows the simulated electric field distribution of the micro-ring resonator 114 (diameter=9 µm, width=1.1 µm and height=1.5 µm) with WGM order M=59. A close-up view of one segment of the micro-ring XX shows a good spatial overlap between the waveguide mode and the meta-atoms. FIG. 13C shows simulated electric field (radial component) and phase distribution of emitted wave with different numbers of metasurface supercells N. The azimuthal order of the WGM is M=59 at the resonant wavelength of 1550 nm, and the number of supercells is N=58 (top row) and N=57 (bottom row). The resulting topological charge of the OAM radiation can be seen by the number of 2π phase evolution along the circumference, which is +1 (top row) and +2 (bottom row), respectively.

The meta-atoms 104 were positioned away from the center of the waveguide 106 by 140 nm to ensure an optimum spatial overlap with the WGM (see FIG. 12A). Using full-wave FEM eigen-mode simulations, it is shown that the emitted light is radially polarized and exhibits the characteristics of OAM emission. With M=59 and N=58, the electric field $E_r$ forms a spiral pattern, and its phase changes by 2π upon one full circle around the center of the vortex, indicating l=1 (see FIG. 13C, left panel). The simulation results of l=2 with M=59 and N=57 are also shown in FIG. 13C, right panel). The phase profile depicts a 4π winding around the center of the vortex.

Figure 14:
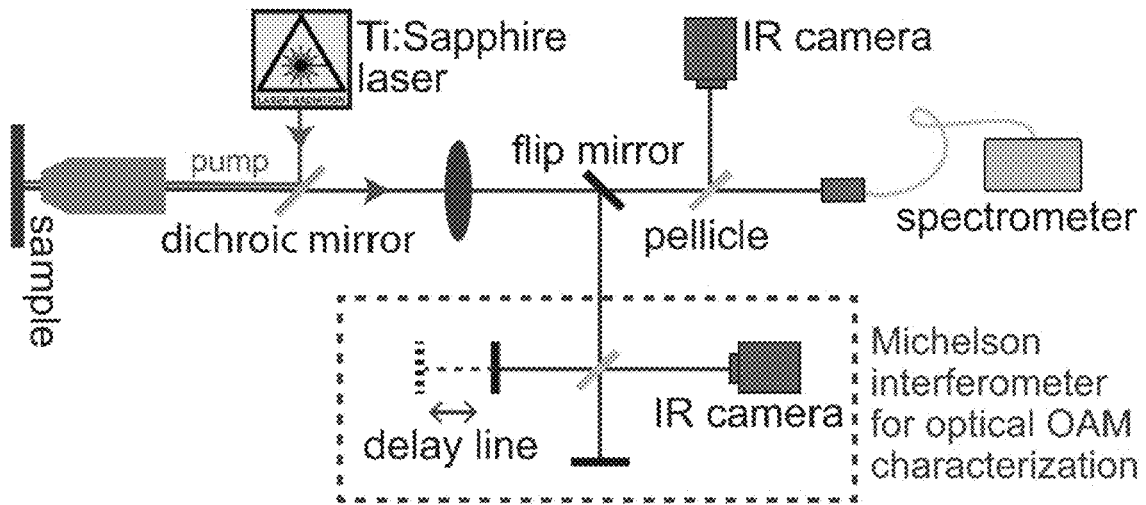
FIG. 14 shows an experimental setup for characterizing the OAM laser emission.

A micro-ring OAM laser 118 was fabricated (see FIG. 12B). Its lasing properties were characterized. The micro-ring XX was pumped by 900-nm femtosecond pulses (~140 fs) from a Ti:Sapphire laser, and the radiation from the micro-ring XX was collected and analyzed by a spectrometer (see FIG. 14). FIG. 14 shows an experimental setup for characterizing the OAM laser emission. A femtosecond pulsed pump laser (~140 fs, repetition rate 80 MHz) at 900 nm wavelength was reflected by a dichroic mirror and then focused by a Newport 20× objective (NA=0.40) onto the micro-ring resonator 114. The lasing emission was collected by the same objective and then transmitted through the dichroic mirror to be detected by a spectrometer, a far-field imaging system and a Michelson interferometry setup. A flip mirror was used to switch the paths.

The spectra gradually transitioned from spontaneous emission (SE) to amplified spontaneous emission (ASE) and finally to lasing as the pump intensity increased (see FIG. 12C). The OAM characteristics were characterized by analyzing both the spatial intensity profile of the emission using a near-infrared camera and its self-interference pattern using Michelson interferometry (see FIG. 14). The intensity of lasing emission was observed to be spatially distributed in a doughnut shape with a dark core in the center (see FIG. 12D), which is due to the phase singularity at the beam axis where the phase becomes discontinuous. The presence of the OAM was also validated by the self-interference patterns (see FIGS. 12E and 12F). The beam emitted was split equally from the micro-ring XX into the two arms of a homebuilt Michelson interferometer. Because in an OAM beam, the phase varies drastically (helical) close to the central singularity, whereas it is relatively uniform (quasi-planar) at the outer rim, a horizontal offset between the two split OAM beams at the observation plane was intentionally created, so that the dark center of one beam overlapped with the bright outer rim of the other, and vice versa. Because the quasi-planar and the helical phase fronts were reversed at the center of each OAM beam, the interference revealed two inverted forks in the resulting fringes (see FIG. 12E). In each fork, a single fringe split into two, which evidently confirmed that the emission from the laser carries OAM with topological charge l=1. Similarly, OAM laser emission with topological charge of 2 was also observed experimentally in another design (see FIG. 12F), which matches perfectly with the theories presented herein.

The guided-wave-driven metasurface 102, comprising subwavelength-spaced meta-atoms 104, provides a highly versatile and compact platform for bridging the gap between guided waves in PICs and free-space waves. The developed technology not only empowers the photonic integrated devices with agile free-space light controllability in the subwavelength scale, but also enables metasurfaces 102 to be directly driven by guided waves which makes possible a denser and higher level of on-chip integration.

Off-chip beam deflection and focusing on silicon waveguides 106 have been demonstrated using the guided-wave-driven metasurfaces 102. In addition, two-dimensional (2D) manipulation of free-space light can be realized by placing a 2D array of meta-atoms 104 on a slab waveguide 106. This technology can enable a wide spectrum of applications ranging from optical communications to LiDAR, as well as miniaturized display technology for virtual reality (VR) and augmented reality (AR) devices. Taking advantage of the intrinsic asymmetric coupling originated from unidirectional phase distribution provided by the metasurface 102, on-chip micro-ring OAM laser 118 can be created which directly emits beam that carries OAM with a designable order. This technique holds great promise for achieving compact on-chip OAM light sources (or detectors) for large-scale photonic integration. Especially, it can be used for free-space optical communications with an additional degree of freedom provided by the OAM states. Based on the demonstrated design principles, more complex functionalities can be achieved, such as guided-wave-driven holograms, photonic integrated spectrometers and so on. In addition, due to reciprocity, free-space modes can be selectively coupled into the metasurface-dressed waveguides 106. The metasurface 102 region can be engineered to couple light with a tilted or even distorted wave front into a waveguide 106, which is especially useful for optical sensing and detections. Moreover, dynamic control of the coupling between guided modes and free-space ones can be realized by incorporating tunable elements (44, 45), which further empowers the PICs with the capability of tuning the optical functionalities dynamically.

Some samples were fabricated on a commercially available silicon-on-insulator wafer with 220-nm-thick (for beam deflection experiments) and 500-nm-thick (for light focusing experiments) Si device layer and 3-μm buried silicon dioxide. Alignment marker was defined by electron beam lithography followed by evaporation of 50 nm Au with a 5-nm-thick Ti adhesion layer and lift-off process. Then, negative resist Fox-16 (Dow Corning Corp.) was used to define the waveguide pattern and then developed in CD-26 developer (MicroChem) for 25 minutes. Chlorine-based inductively coupled reactive ion etching (ICP-RIE) was used to etch crystalline Si with FOX-16 resist as mask. Then, the sample was immersed in buffered oxide etchant for 20 seconds followed by water rinse to remove the remaining mask. A second-step electron beam lithography was conducted on ZEP 520A (Zeon) resist to define the metasurface 102 on top of the waveguide 106 with precise alignment. The exposed sample was developed in N-amyl-acetate for 3 minutes followed by MIBK:IPA immersion for 1 minute. Au/SiO2/Au films were subsequently deposited using an electron beam evaporation system. The pattern was then lifted off in 1165 remover (MicroChem) at 85° C. in water bath for 2 hours. The sample was finally diced along the input port of waveguide 106 for measurement.

Some samples were fabricated on a commercially available silicon-on-insulator wafer with 220-nm-thick (for beam steering experiments) and 500-nm-thick (for light focusing experiments) Si device layer and 3-μm buried silicon dioxide. The wafer was cleaned by sonication in acetone and IPA for 3 minutes, respectively. Alignment marker was defined by electron beam lithography with 100 kV beam (Vistec EBPG5200) followed by evaporation of 50 nm Au with a 5-nm-thick Ti adhesion layer (Kurt J. Lesker Lab-18) and lift-off. Then, negative resist Fox-16 (Dow Corning Corp.) was spin-coated and prebaked at 100° C. for 4 minutes. The waveguide pattern was written followed by development in CD-26 developer (MicroChem) for 25 minutes to reduce proximity effect. Chlorine-based inductively coupled reactive ion etching (ICP-RIE) was used to etch crystalline Si with FOX-16 resist as mask (Plasma-Therm Versalock 700). The sample was immersed in buffered oxide etchant for 20 seconds followed by water rinse to remove the remaining mask. ZEP 520A (Zeon) was spin-coated on the sample and soft-baked at 180° C. for 3 minutes. A second-step electron beam lithography was conducted to define the metasurface layer on top of the waveguide with precise alignment. The exposed sample was developed in N-amyl-acetate for 3 minutes followed by MIBK:IPA immersion for 1 minute. Au/SiO2/Au films were subsequently deposited using an electron beam evaporation system (Semicore). The pattern was then lifted off in 1165 remover (MicroChem) at 85° C. in water bath for 2 hours. The sample was finally diced along the input port of waveguide for measurement.

The OAM micro-ring laser 118 was fabricated on InGaAsP (500 nm, multi-quantum-well layer)/InP substrate. First the micro-ring resonator 114 was defined by electron beam lithography with FOX-16 negative resist. The resist acted as an etch mask in the BC13 based ICP-RIE process. Then, the sample was immersed in buffered oxide etchant to remove the mask. A second-step electron beam lithography using ZEP 520A resist was performed with precise alignment to define the metasurface 102 on top of the micro-ring resonator 114. A sequential electron beam evaporation was done to deposit Au/Si/Au films, followed by a standard lift-off process in 1165 remover at 85° C. in water bath for 2 hours.

Numerical simulations were carried out using a commercially available finite element method (FEM) solver package—COMSOL Multiphysics. Third-order finite elements and at least 10 mesh steps per wavelength were used to ensure the accuracy of the calculated results. Individual Au/SiO$_2$/Au meta-atoms 104 were simulated first. An eigenmode solver was used to find the TE$_{00}$ mode of the silicon waveguide 106 as well as its modal index at 1550 nm wavelength. Then this modal index was used in the model to further calculate the phase and amplitude of the extracted light by monitoring the field at a few wavelengths over the waveguide 106. The geometrical parameters of the meta-atoms 104 were swept to get the phase and amplitude maps/contours (see FIG. 2B). The trapezoidal shape of meta-atoms resulted from the nanofabrication was also considered in the model to get accurate design parameters.

In order to simulate the beam deflection, a full device model that comprised an array of meta-atoms 104 placed on top of Si waveguide 106 was established. The meta-atoms 104 were distributed along the waveguide 106 so that they formed a linear phase gradient (see FIG. 2D). In a similar fashion, an array of meta-atoms fulfilling the spatial phase distribution of a lens were placed on top of Si waveguide 106 to simulate the light focusing effect (see FIG. 10A).

A similar method to calculate the phase and amplitude of the extracted light from Au/Si/Au meta-atoms 104 on top of InGaAsP/InP waveguide 106 was used (see FIG. 13A). A device-level model of metasurface 102 incorporated micro-ring resonator 114 was constructed to simulate the OAM radiation. Four Au/Si/Au meta-atoms 104 selected from calculated phase and amplitude maps/contours (see FIG. 13A) were used to construct a supercell 110. 58 supercells (N=58) were placed on top of the resonator 114. Using the WGM with M=59, OAM radiation with topological charge of +1 according to Eq. (4) was achieved. FIG. 13B illustrates the electric field distribution of TE$_{00}$ mode which shows the typical standing wave pattern formed by the two counter-propagating (CW and CCW) WGMs. The extracted light in free space carries OAM as shown in FIG. 13C.

The guided-wave-driven metasurfaces 102 were characterized with beam deflection and focusing functions using the optical setup shown in FIG. 8. A free-space laser beam output from a Ti:Sapphire laser pumped optical parametric oscillator (OPO) was coupled into a commercially available tapered lensed single-mode fiber. The focused laser beam from the tapered fiber was coupled into the input port of the fabricated ridge waveguide sample in end-fire manner by using a three dimensional (3D) translational stage. The coupled-in light propagated through a triangle taper linking the input port and the single-mode waveguide, during which the high-order modes vanished, and only fundamental transverse electrical mode survived. The light scattered into free space by metasurfaces 102 on top of the single-mode waveguide 106 was collected by an objective (N.A.=0.95) and then transmitted through a tube lens. Part of the light was reflected by a beamsplitter for real-space imaging. the light transmitted through the beamsplitter was focused by a Bertrand lens to form Fourier-space image. In off-chip beam-steering measurement, the laser wavelength was tuned using the OPO to acquire wavelength-dependent beam deflection angles. In addition, Fourier-space images were taken by coupling 1550 nm laser beam into samples with different supercell periods. After that, the scattering angles were extracted from the Fourier-space images calibrated by a ruled reflective grating (grooves density of 600/mm). In off-chip focusing measurement, the samples were mounted on a 3D translational stage with a high-resolution piezo-controlled actuator in z-direction. By moving the z stage, the real-space images were taken at different distance from the waveguide plane and a 3D intensity distribution was reconstructed.

To observe the lasing spectra and to confirm the OAM properties of the laser radiation, the set-up shown in FIG. 14 was used. A femtosecond pulsed laser (~140 fs, repetition rate 80 MHz) at 900 nm wavelength was reflected by a dichroic mirror and then focused by a Newport 20× objective (NA=0.40) onto the micro-ring resonator 114. The pump power was controlled by a circular variable neutral density filter and monitored by a power meter. The lasing emission was collected by the same objective and then transmitted through the dichroic mirror and detected by a spectrometer (Horiba), a far-field imaging system and a Michelson interferometry setup. With a flip mirror to switch the paths, the laser emission was either sent into the spectrometer/imaging system or the interferometry setup. In the interferometry setup, the laser emission was split into two beams by a pellicle beam splitter, and then recombined with an off-center beam overlap to form an interference pattern recorded by an infrared camera. A delay line was used in order to balance the optical path lengths of the two arms.

Two different antenna 108 designs were used in this work: (i) Au/SiO$_2$/Au sandwiched nano-bar antennas 108 on Si waveguide 106 (see FIG. 2B); and (ii) Au/Si/Au sandwiched nano-bar antennas 108 on InGaAsP waveguide 106 (see FIG. 13A). To explore the origin of large phase shift range (over 2π) of the sandwiched nanoantenna design, a parametric sweep of the wavelength on Au/SiO$_2$/Au antenna 108

($l_x$=150 nm, $l_y$=280 nm) was performed. The scattering phase induced by the nanoantenna 108 was calculated by subtracting the phase obtained from simulations with nanoantenna 108 to that without nanoantenna 108. As shown in FIG. 5B, the phase shift of nanoantenna changes by 2.6π from 1440 nm to 1550 nm. In addition, the eigenmodes of the Au/SiO$_2$/Au antenna 108 ($l_x$=150 nm, $l_y$=280 nm) in air were simulated, and an electric dipole resonance (ED) at 1400 nm and a magnetic dipole (MD) resonance at 1800 nm (see FIG. 5A, middle panel) was observed. Placing the nanoantenna 108 on the waveguide 106, its field distribution was simulated at 1510 nm (see FIG. 5A, right panel) where a large phase shift happened in FIG. 5B. Clearly, the TE$_{00}$ waveguide mode excites the eigenmodes (ED and MD) of the nanoantenna 108. The electric field and magnetic field distributions show characteristics of the ED and MD resonances, validating that the overlap of two resonances create the phase shift range over 2π.

Figure 15A:
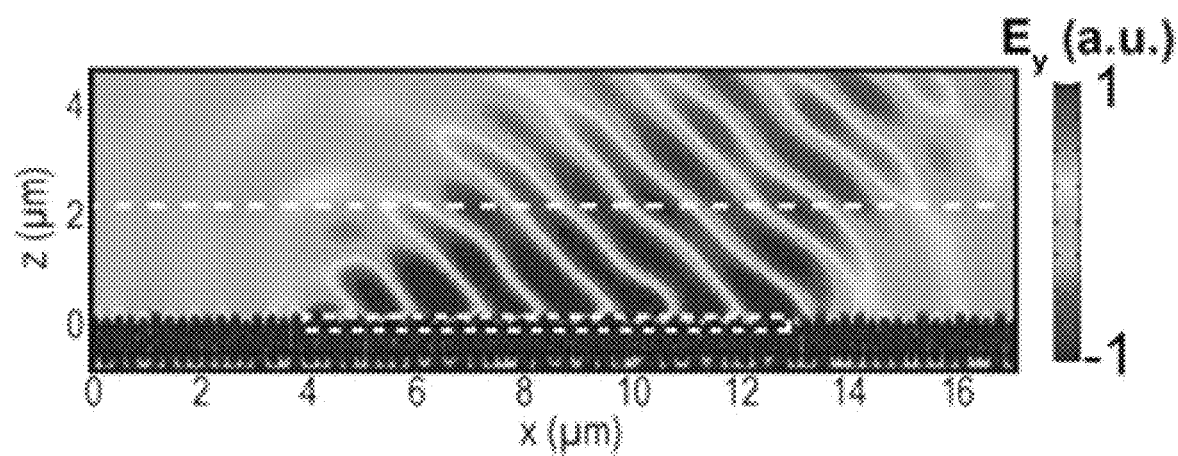
FIG. 15A shows simulated electric field (Ey) distribution of the guided-wave-driven metasurface (20 sets of supercells, 60 nanoantennas) for beam deflection.
Figure 15B:
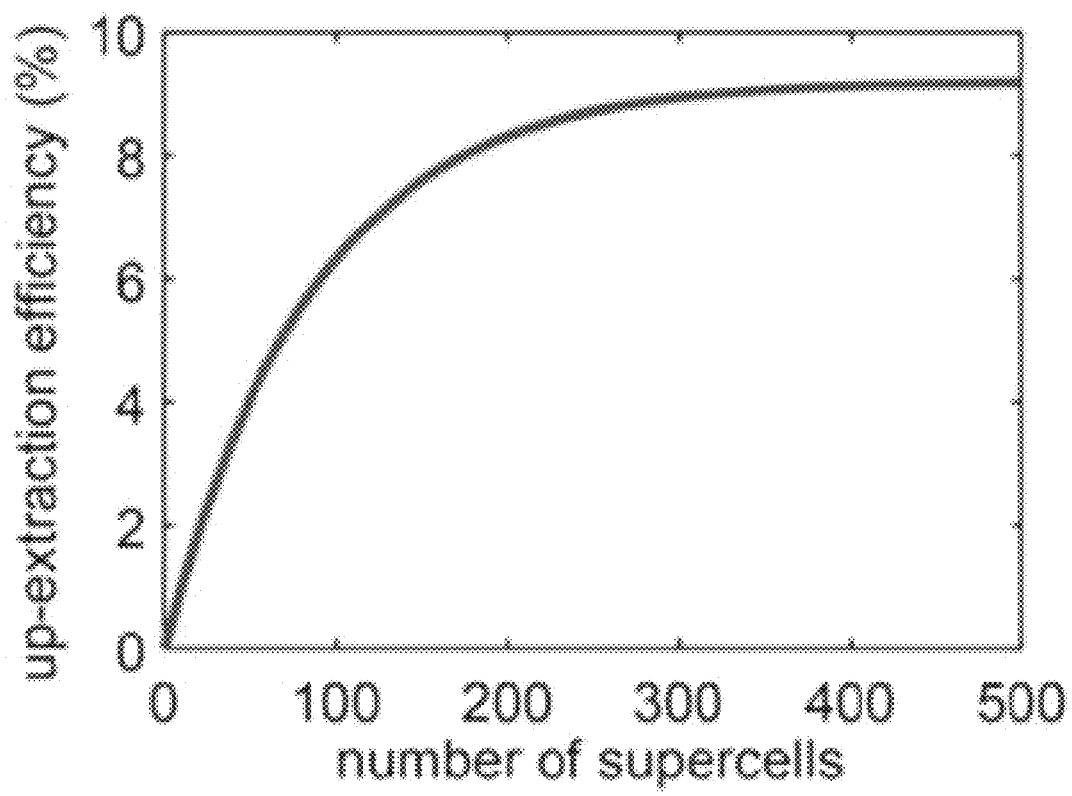
FIG. 15B shows calculated up-extraction efficiency.
Figure 15C:
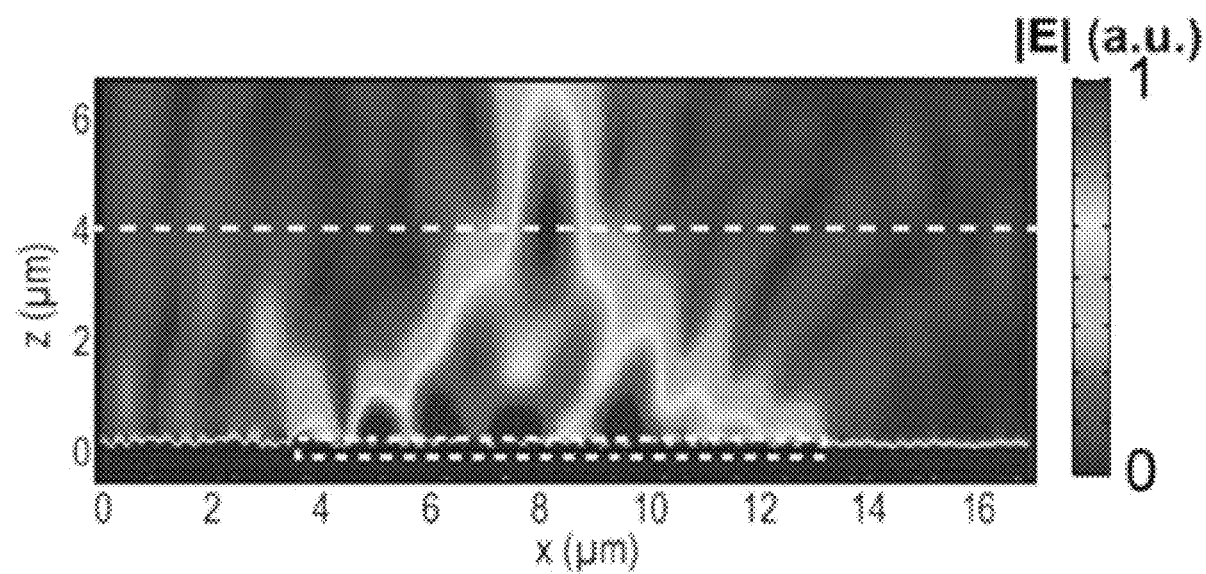
FIG. 15C shows simulated normalized electric field (|E|) distribution of the guided-wave-192 driven metasurface (65 nanoantennas) for focusing. The dashed line 193 indicates the surface that the Poynting vector was integrated, and the dashed white 194 rectangle marks the metasurface region.
Figure 16A:
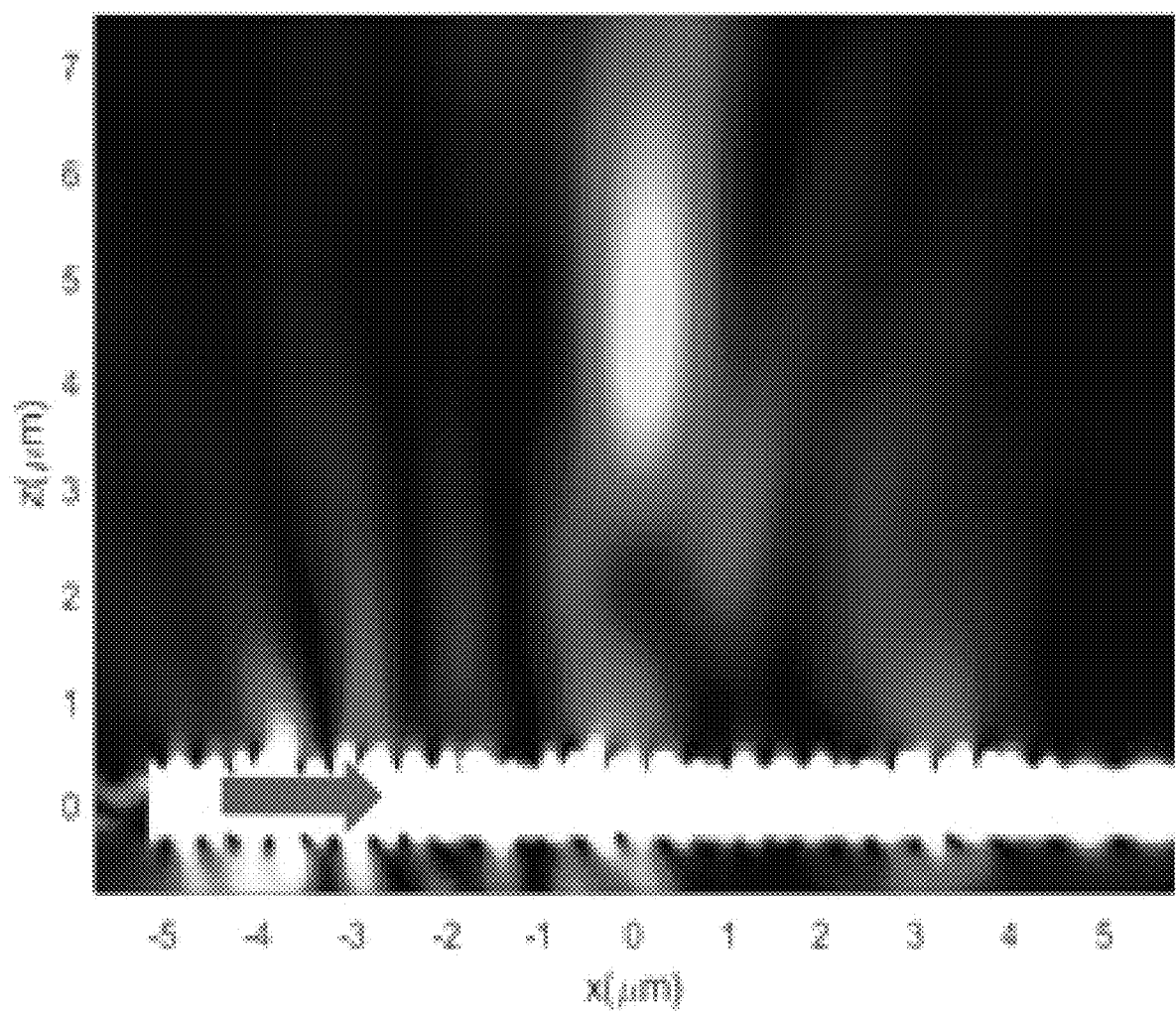
FIG. 16A shows a numerical simulation of 2D guided-wave-fed metalens, wherein scattered light intensity distribution at a cross section of the X-Z plane.
Figure 16B:
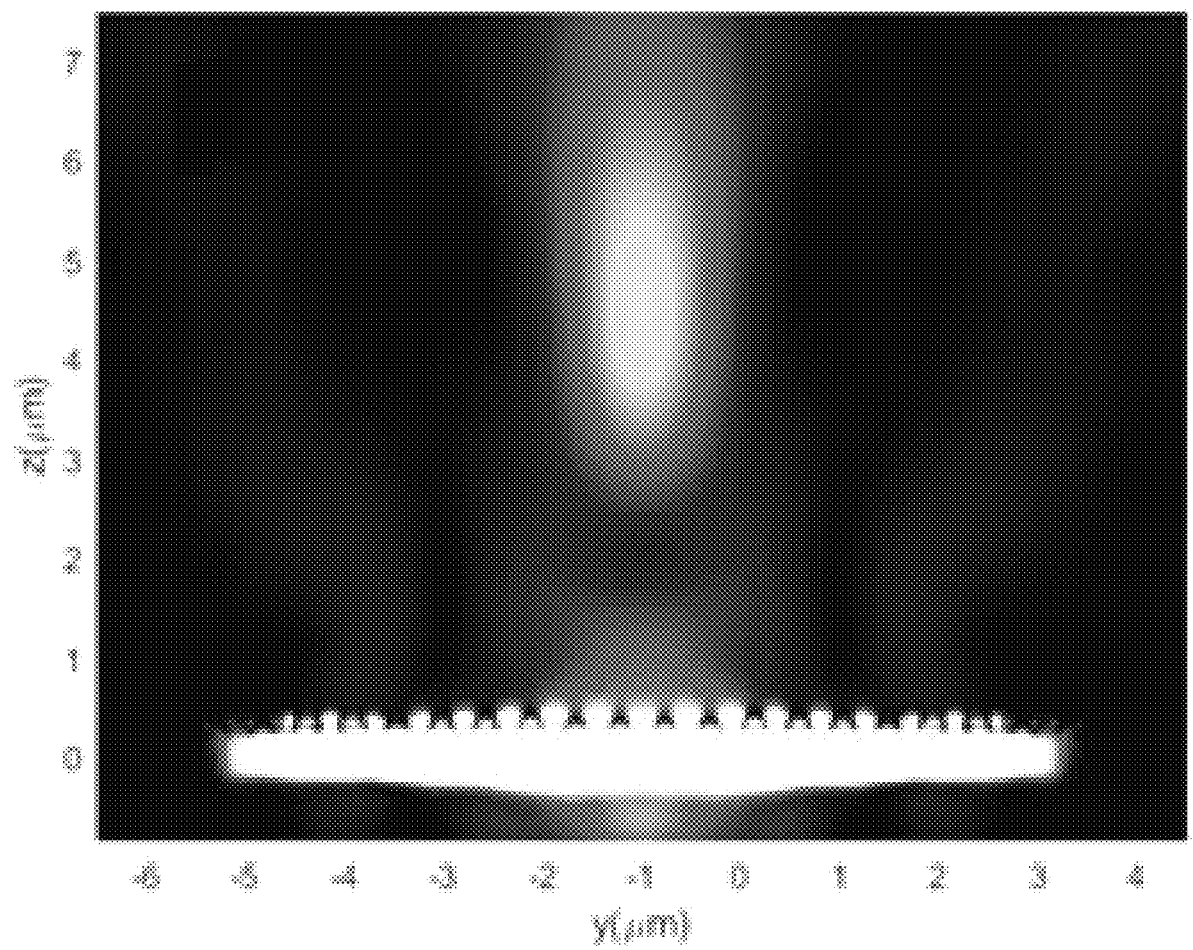
FIG. 16B shows scattered light intensity distribution at a cross section the Y-Z plane.
Figure 16C:
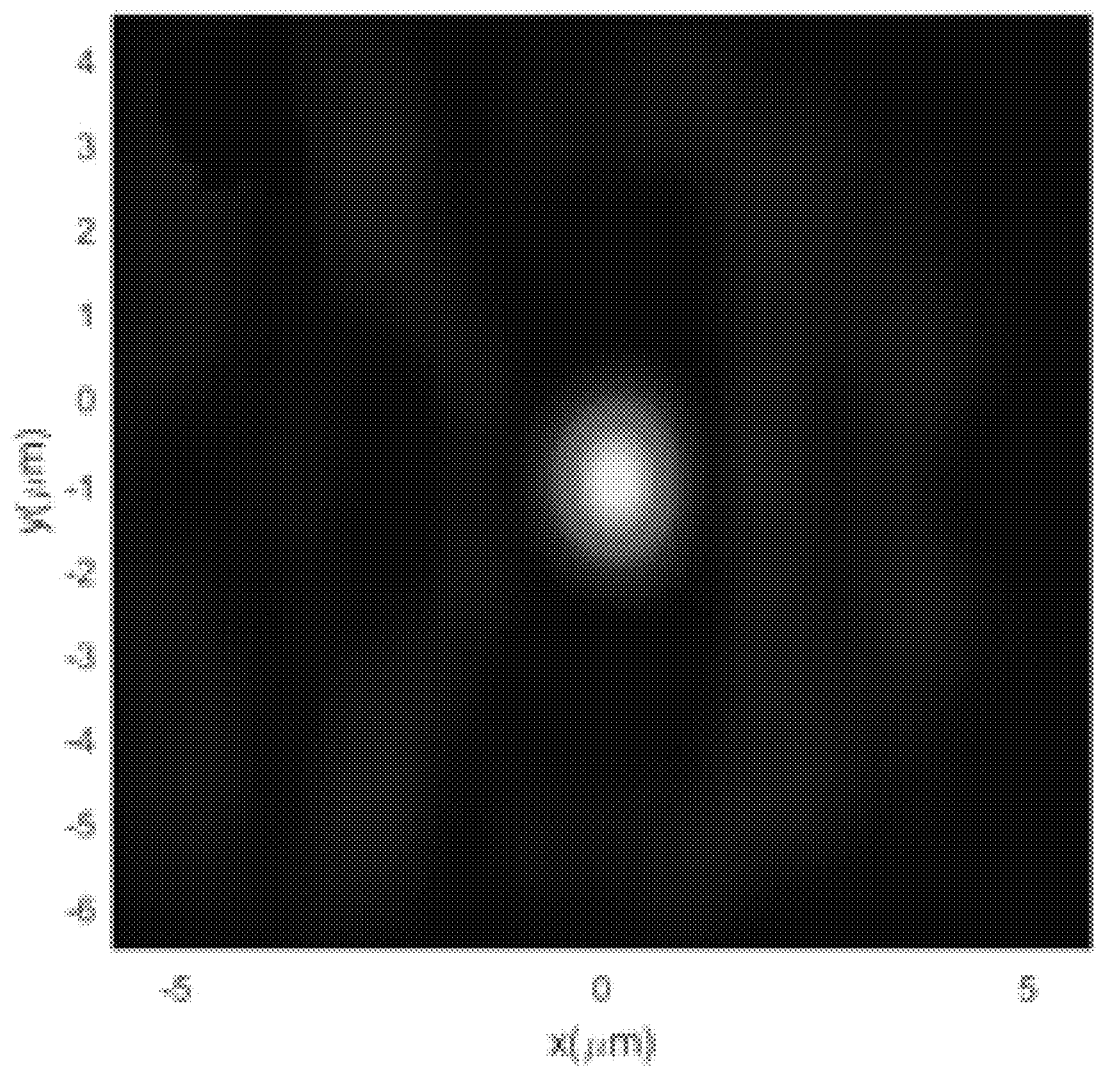
FIG. 16C shows scattered light intensity distribution at a focal plane X-Y plane.
Figure 16D:
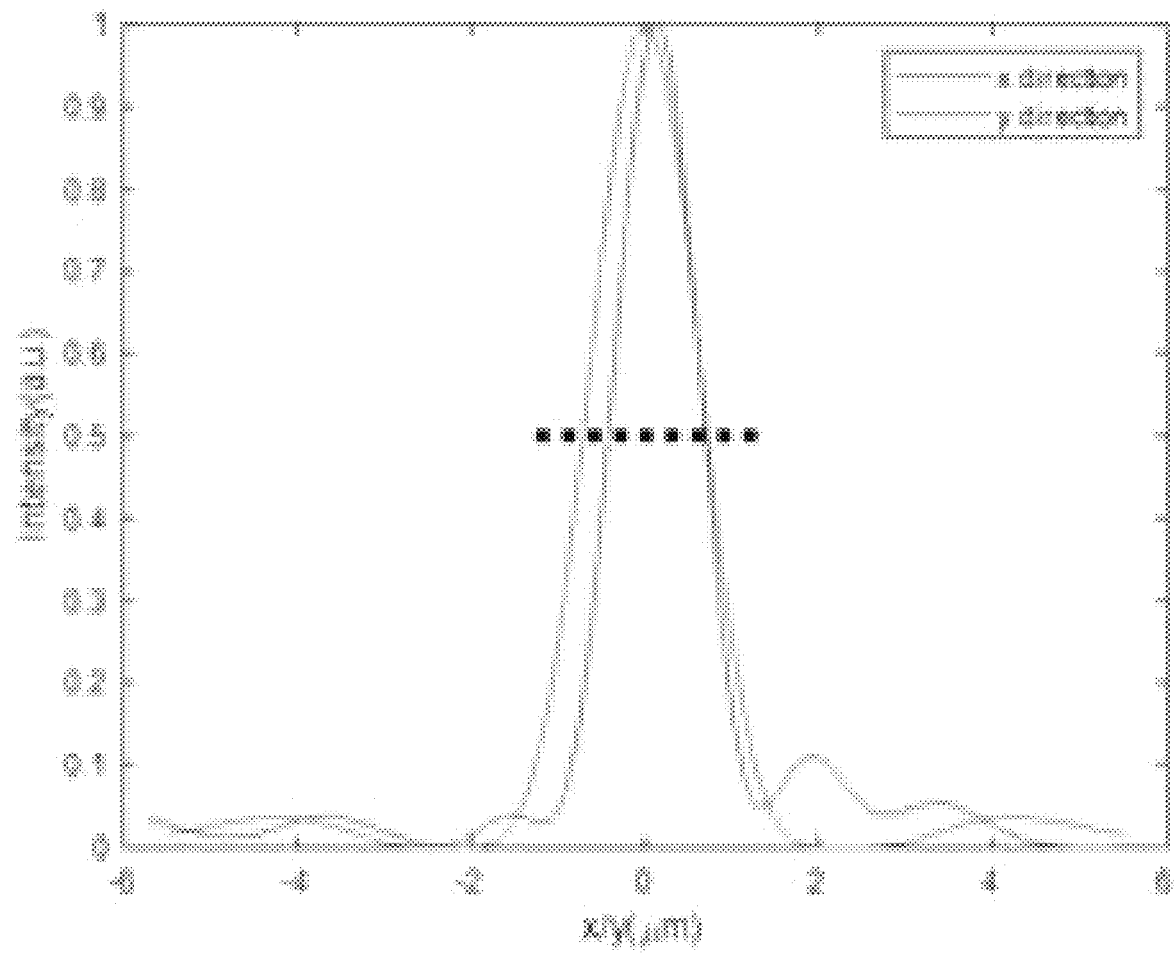
FIG. 16D shows intensity distribution along x and y direction at the focal plane with a tightly focused airy disk with radius of about 2.1 μm.
Figure 16E:
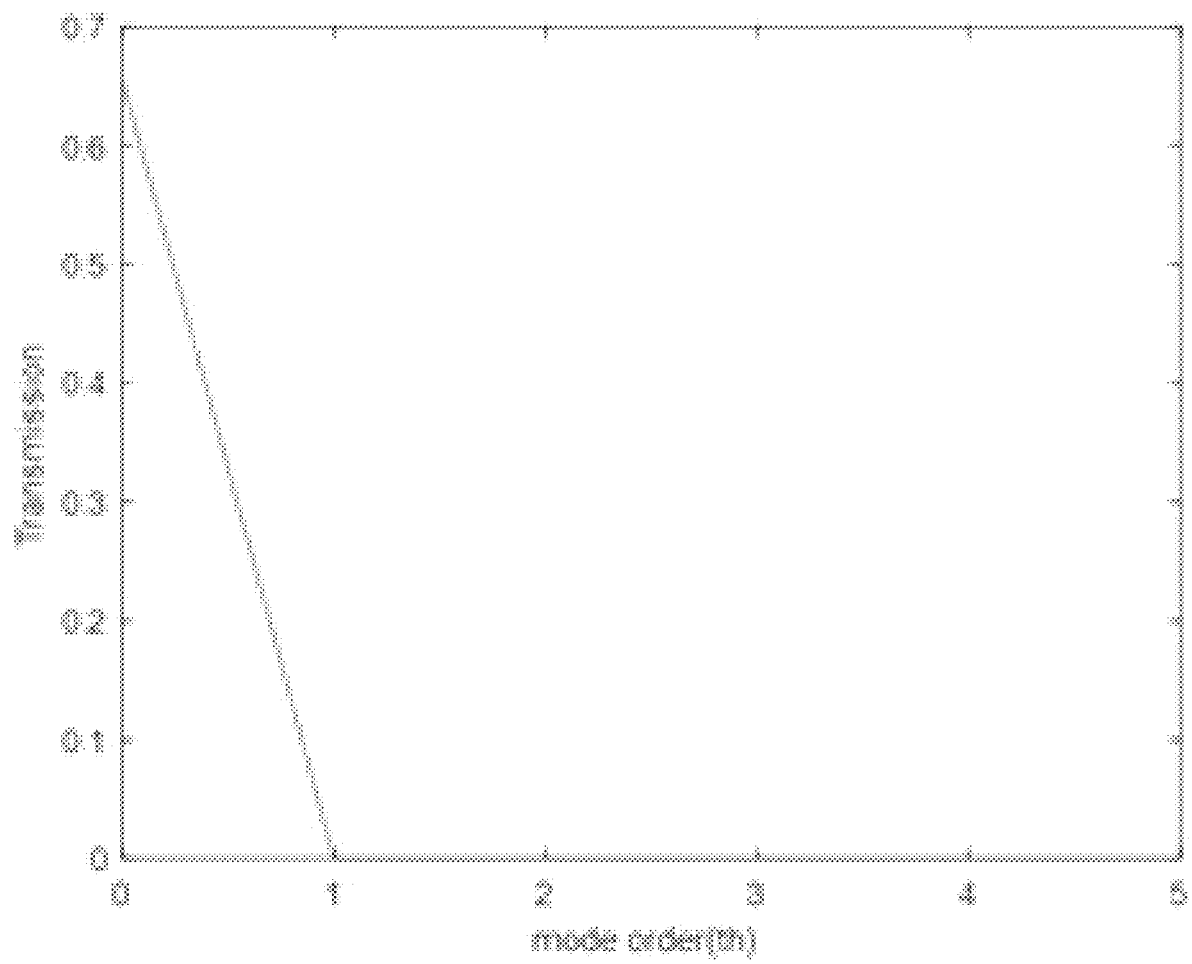
FIG. 16E shows transmission for different modes after the metasurface region.
Figure 16F:
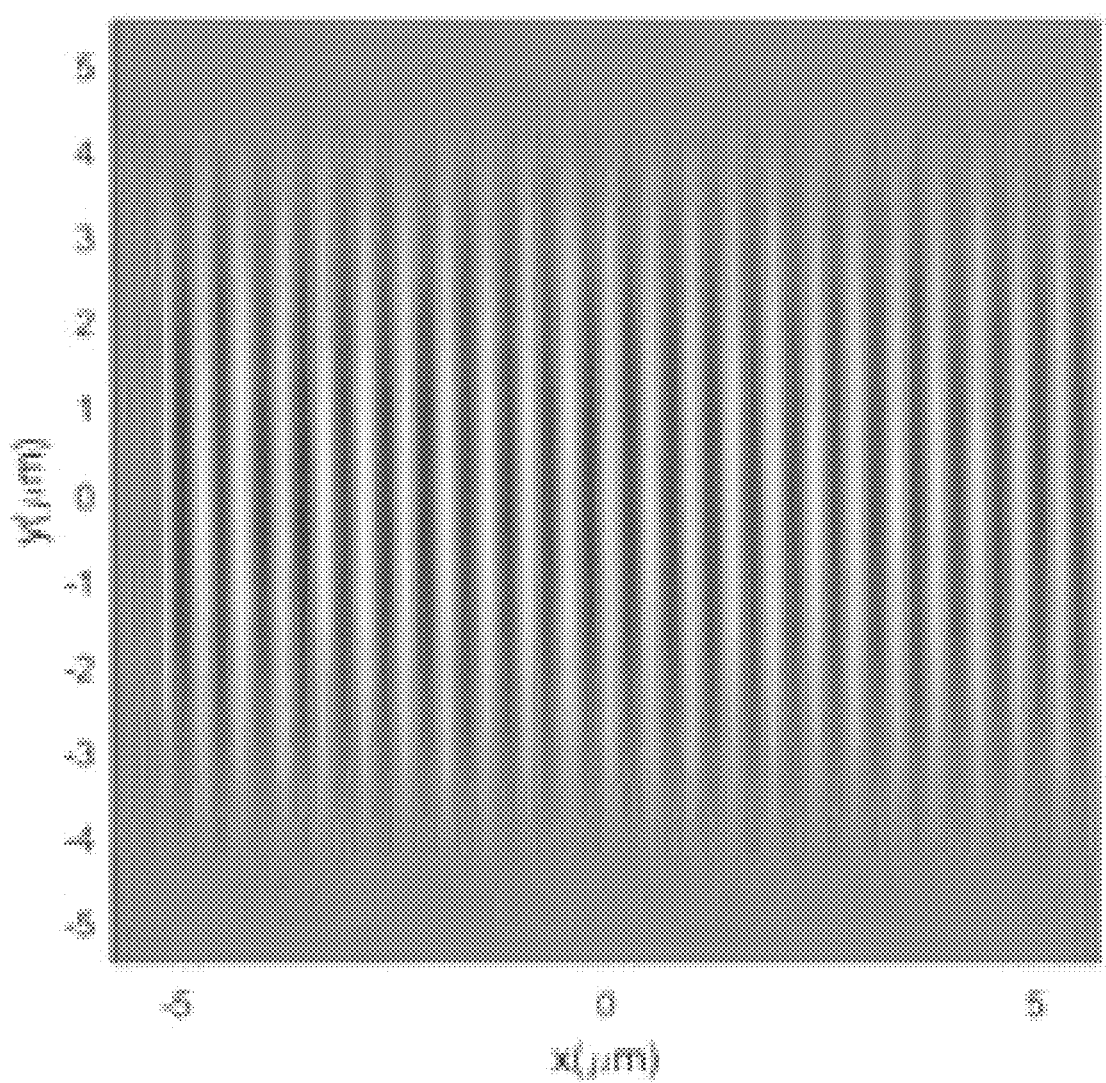
FIG. 16F shows the real part of the guided wave electric field underneath the metasurface region having no evident distortion.

To evaluate the up-extraction and focusing efficiency, full-wave simulations using COMSOL Multiphysics and Lumerical FDTD (finite-difference time-domain) were conducted. Extraction efficiency was calculated by dividing the surface integrated power flow from a surface above the waveguide to the input power. Ohmic loss was estimated by dividing the volume integration of the power dissipation in nanoantennas to the input power (see FIG. 15). FIG. 15A shows simulated electric field (Ey) distribution of the guided-wave-driven metasurface (20 sets of supercells, 60 nanoantennas) for beam deflection. FIG. 15B shows calculated up-extraction efficiency. The up-extraction plateaued around 9%. FIG. 15C shows simulated normalized electric field (|E|) distribution of the guided-wave-driven metasurface (65 nanoantennas) for focusing. In both figures, the dashed line indicates the surface that the Poynting vector was integrated, and the dashed white rectangle marks the metasurface region For beam deflection, the power loss due to back reflection R is small and most of the loss is induced by the metallic antenna absorption. From the simulation, the up-extraction efficiency per supercell $\eta_e$~0.1% and the total dissipation per supercell $\eta_t$~1.1% were extracted. According to the following equation:

$$\text{efficiency} = (1-R)\frac{\eta_e}{\eta_f}(1-e^{-\eta_t l}) \quad (5)$$

where l is the number of supercells 110. As a rough estimation, the maximum up-extraction efficiency can be approximated as $\eta_e/\eta_t$~9% (see FIG. 15B). To calculate the focusing efficiency, the model comprising a 17.4 pm long silicon waveguide 106 and 65 nanoantennas 108 was simulated (see FIG. 15C). The focusing efficiency is about 10%, and the absorption loss is 45.5%.

In order to reduce the metal induced loss, pure dielectric SiO$_2$/Si/SiO$_2$ (thickness: 100/400/100 nm) antennas 108 were designed that not only fulfil over π phase control but also exhibit no material loss in the telecommunication wavelengths range (see FIG. 6). Three SiO$_2$/Si/SiO$_2$ sandwiched antennas 108 were selected to construct one supercell 110 to achieve beam deflection function. The full device and extracted its parameters were simulated. The up-extraction efficiency per supercell 17e is around 0.0945% which is similar to that of the Au/SiO$_2$/Au nanoantennas array. But the total dissipation per supercell $\eta_t$ of 0.117% is ten times less due to the absent of metallic components. The maximum up-extraction efficiency can be approximated as $\eta_e/\eta_t$~80% (see FIG. 7C).

It should be noted that the design is based on a perturbation condition where the nanoantenna 108 does not disrupt the guided mode. This is confirmed by the simulations above where the out-coupling efficiency induced by one supercell 110 is on the order of 0.1% for both Au/SiO2/Au antenna and Si/SiO2/Si antenna design. To significantly disrupt the guided waves, such as realizing mode conversion, the array of nanoantennas 108 must exhibit specific phase gradient to compensate the momentum difference between the original guided mode and the ultimate converted one. However, the nanoantennas 108 do not fulfill this function, which makes it rather difficult or impossible to convert the fundamental mode to other modes. In addition, the nanoantennas 108 are symmetric and placed in the center of the waveguide X, so they do not have good overlap with high order waveguide modes, thus impeding effective mode conversion. This is also confirmed by the FDTD simulation on the mode purity analysis after the TE$_{00}$ mode interact with 150 nanoantennas (50 supercells). The conversion efficiencies to TM$_{00}$ and TE$_{10}$ are 6.5×10$^{-7}$% and 1.5×10$^{-5}$%, respectively, which might be due to numerical error. The conversion efficiency to TM$_{10}$ and TE$_{20}$ is on the order of 0.1%, which is negligible. Therefore, it can be safely assumed that the dominant mode that interacts with the nanoantennas 108 is TE$_{00}$ mode.

The waveguide-fed metasurfaces 102 were characterized with beam steering and focusing functions using the optical setup shown in FIG. 8. A free-space laser beam output from a Ti:Sapphire laser pumped optical parametric oscillator (OPO) was coupled into a commercially available tapered lensed single-mode fiber. The focused laser beam from the tapered fiber was coupled into the input port of our fabricated ridge waveguide sample in end-fire manner by using a three dimensional (3D) translational stage. The coupled-in light propagated through a triangle taper linking the input port and the single-mode waveguide, during which the high-order modes vanished, and only fundamental transverse electrical mode survived. The light scattered into free space by metasurfaces on top of the single-mode waveguide was collected by an objective (N.A.=0.95) and then transmitted through a tube lens. Part of the light was reflected by a beamsplitter for real-space imaging. The light transmitted through the beamsplitter was focused by a Bertrand lens to form Fourier-space image. In off-chip beam-steering measurement, the laser wavelength was tuned using the OPO to acquire wavelength-dependent beam steering angles. In addition, Fourier-space images were taken by coupling 1550 nm laser beam into samples with different supercell periods. After that, the scattering angles were extracted from the Fourier-space images calibrated by a ruled reflective grating (grooves density of 600/mm). In off-chip focusing measurement, the samples were mounted on a 3D translational stage with a high-resolution piezo-controlled actuator in z-direction. By moving the z stage, the real-space images were taken at different distance from the waveguide plane and a 3D intensity distribution was reconstructed.

As shown in FIG. 11, the focal point shifts towards the input port as the wavelength increases. According to equation (2), the required phase shift for nanoantenna at position x is $\Delta\Phi(x)=-k_0\sqrt{x^2+f^2}-\beta x$ (the designed wavelength is 1.55 μm). As wavelengths increase, both $k_0$ (2π/λ) and β will decrease, so that the designed phase shift is smaller than the required phase shift at longer wavelength. The opposite argument is true when the wavelength decreases. Taking the three wavelengths 1.5 µm, 1.55 µm and 1.6 µm as an example (simulations in FIG. S5), in order to compensate the difference between the phase distribution at designed wavelength (1.55 µm) and that of the operating wavelength, the focal position has to shift accordingly, so that $\Delta\Phi_{1.6}(x) \approx \Delta\Phi_{1.55}(x)\Delta\Delta\Phi_{1.4}(x)$.

$$\Delta\Phi_{1.5}(x) = -k_{1.5}\sqrt{(x-dx_1)^2+f^2} - \beta_{1.5}x$$

$$\Delta\Phi_{1.55}(x) = -k_{1.55}\sqrt{(x^2+f^2)} - \beta_{1.55}x$$

$$\Delta\Phi_{1.6}(x) = -k_{1.6}\sqrt{(x+dx_2)^2+f^2} - \beta_{1.6}x$$

Therefore, the focal point position of longer wavelength shifts towards the input port.

FIG. 14 shows the experimental setup to observe the lasing spectra and to confirm the OAM properties of the laser radiation. A femtosecond pulsed laser (~140 fs, repetition rate 80 MHz) at 900 nm wavelength was reflected by a dichroic mirror and then focused by a Newport 20× objective (NA=0.40) onto the micro-ring resonator. The pump power was controlled by a circular variable neutral density filter and monitored by a power meter. The lasing emission was collected by the same objective and then transmitted through the dichroic mirror and detected by a spectrometer (Horiba), a far-field imaging system and a Michelson interferometry setup. With a flip mirror to switch the paths, the laser emission was either sent into the spectrometer/imaging system or the interferometry setup. In the interferometry setup, the laser emission was split into two beams by a pellicle beam splitter, and then recombined with an off-center beam overlap to form an interference pattern recorded by an infrared camera. A delay line was used in order to balance the optical path lengths of the two arms.

Additional examples demonstrate the uses of metasurfaces 102 to control scattered light from 1D to 2D. By placing metal-dielectric-metal meta-atoms 104 on top of slab waveguide 106, the phase of scattered light can be tuned over range of $2\pi$. The mode conversion and intensity distribution inside the waveguide 106 were investigated for this 2D manipulation. Based on these, it is demonstrated that different functions like 2D metalens 112 and hologram on waveguide 106 experimentally or numerically. This demonstrates that the disclosure structure can be used to realize more functions with 2D light field manipulations.

Starting from a simple case, a guided wave propagating inside a slab waveguide 106 of fundamental mode having a plane wavefront perpendicular to the propagation direction x with propagation constant β was considered. Under this assumption, a metasurface 102 was generated that composed of nanoantennas 108 that could locally tune the phase $\varphi_{an}(x, y)$ as $$\varphi_{an}(x, y) = \phi(x, y) - \beta x = \phi(x, y) - n_{mode}\frac{2\pi}{\lambda}x$$

where $\phi(x, y)$ is desired phase profile for realizing specific function, $n_{mode}$ is the effective mode index of this fundamental mode, and λ denotes the free-space wavelength. The nannoantenna 108 are sandwiched structures based on metal-insulator-metal (MIM) nanobar, which can support both electric dipole and magnetic dipole resonance around desired wavelength (1550 nm). By changing the dimensions (length and width here) of the nanobar, the phase lag $\varphi_{an}(x, y)$ from the nanoantenna 108 is from 0 to $2\pi$. Under this circumstance, arbitrary phase profile expanding through the 2D functional area can be easily realized by judiciously arranging nanoantennas 108 with different geometrical parameters in this region. It is worthwhile to point out that in order to realize precise control of desired phase profile, the wavefront of the propagating mode needs to be flat through the whole region, requiring: (1) the input mode needs to be purely fundamental without any other modes; and (2) the metasurface 102 on top of the waveguide 106 should not affect the propagating mode remarkably. In other words, due to the lack of constraint on the guide mode along the transverse direction, the effect of the nanoantennas 108 on the guided wave must be negligible to avoid mode conversion inside the slab waveguide 106. Otherwise, the phase provided by the propagation $\varphi(x, y)=\beta x$ could be inaccurate.

FIG. 16 shows a numerical simulation of 2D guided-wave-fed metalens 112. The light is propagating along x axis from left to right as the red arrow in FIG. 16A. Scattered light intensity distribution at a cross section of X-Z plane (FIG. 16A), Y-Z plane (FIG. 16B) and focal plane X-Y plane (FIG. 16c) shows an off-chip focused light beam scattered out from bottom slab waveguide 106. FIG. 16D shows intensity distribution along x and y direction at the focal plane with a tightly focused airy disk with radius of about 2.1 µm. FIG. 16E shows transmission for different modes after the metasurface 102 region. Only fundamental $TE_{00}$ mode was detected at the end of the waveguide 106. FIG. 16F shows the real part of the guided wave electric field underneath the metasurface 102 region having no evident distortion.

To demonstrate the feasibility of the proposed schematics on 2D on-chip light field manipulation, numerical and experimental demonstration of a 2D metalens 112 on a waveguide 106 was done first. Furthermore, for a more general manifestation, It was numerically shown that a holographic projection was generated directly from a slab waveguide 106. For a focusing beam in free-space, the wavefront at a specific plane distant from the focal plane can be described by a phase function $$\phi(x, y) = -\frac{2\pi}{\lambda}\sqrt{x^2 + y^2 + f^2}$$

where f is the distance between the wavefront plane and the focal plane, i.e. focal length. As long as the focal length is fixed, the nanoantennas-induced phase lag distribution $\varphi_{an}(x, y)$ as well as corresponding nanoantennas' geometrical parameters can be determined. As a proof of concept, a 5 µm×5 µm 2D metalens 112 was simulated on a silicon waveguide 106 with a focal length of 5 µm using a commercially available full wave simulation software Lumerical FDTD Solutions. The period along and perpendicular the propagation direction is 220 nm and 440 nm, respectively. The required phase profile was discretized into four levels, and four MIM nanoantennas 108 were selected accordingly from the library. Then the full device is established by arranging this set of nanoantennas 108 on top of a 500 nm thick silicon slab waveguide 106 on a glass substrate. The established device is excited by a $TE_{00}$ mode and the scattered field distributions were monitored. The simulation results evidently shown that portion of the guided wave are extracted directly by the metasurface 102 on top of the slab waveguide 106 and formed a focusing beam with a focal point at ~5 µm above the device. The intensity distribution at the focal plane manifested an approximate airy disk with radius close to 2.1 µm, which matched with the theoretical prediction well. A mode decomposition at the transmission region of the metasurface 102 was performed. The results show that the transmitted field barely has other higher order modes other than fundamental $TE_{00}$, and the field underneath the metasurface 102 did not show obvious distorting, manifesting that the nanoantennas 108 used would not induce mode conversion inside the waveguide 106 and fulfilled the previously mentioned constraints.

FIG. 17 shows an experimental demonstration of guided-wave-fed 2D metalens 112: FIG. 17A is an SEM image of the metasurface 102 (the scale bar is 500 nm); FIG. 17B is an optical setup containing a movable objective for reconstruction 3D intensity distribution on top of the device; measured intensity distribution is shows at the cross section of X-Z plane (FIG. 17C), Y-Z plane (FIG. 17D), and focal plane X-Y plane (FIG. 17E). FIG. 17F shows intensity distribution along x and y direction at the focal plane with a focal spot with full width at half maximum of about 1.8 µm.

Figure 17A:
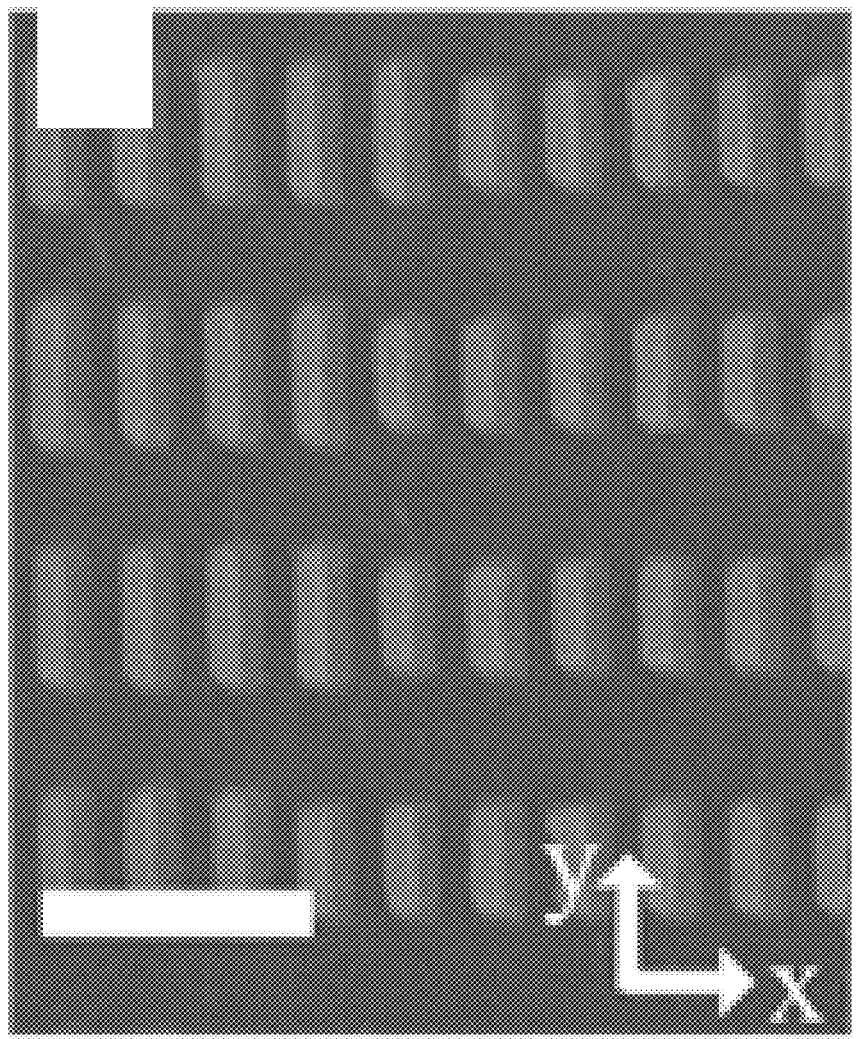
FIG. 17A is SEM image of the metasurface of a guided-wave-fed 2D metalens (the scale bar is 500 nm).
Figure 17B:
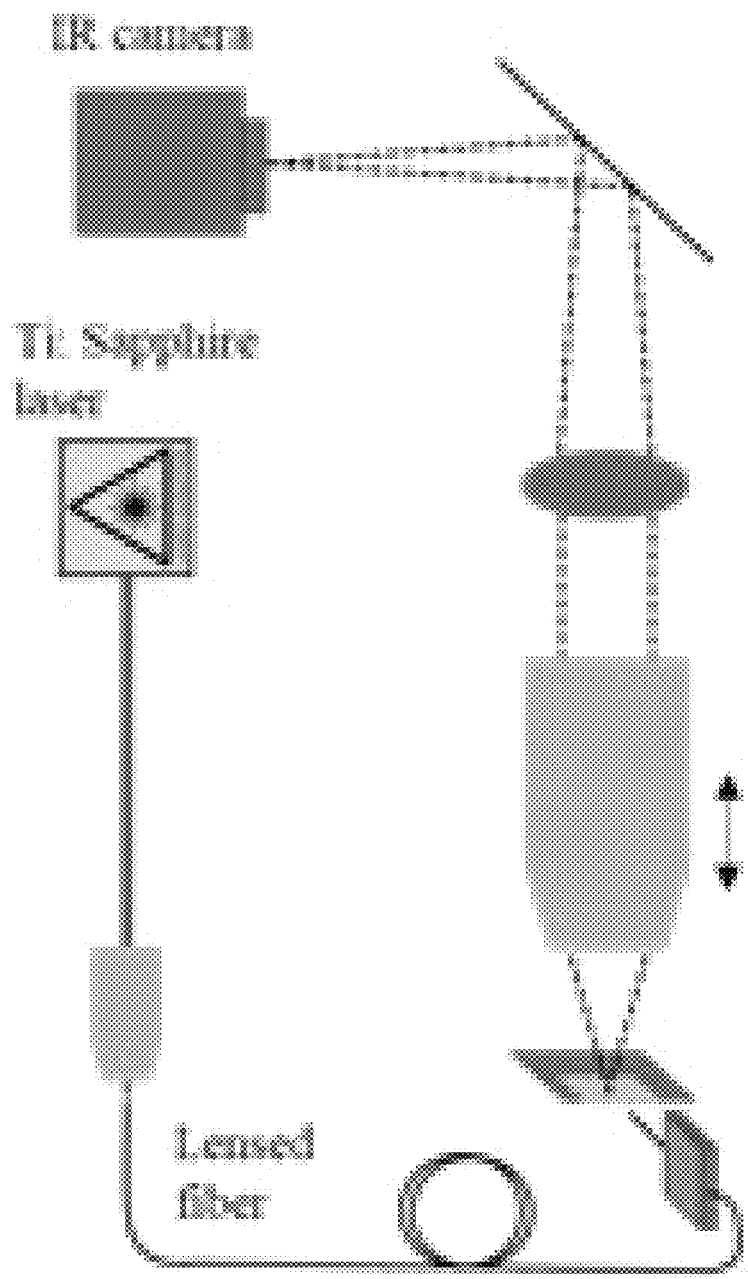
FIG. 17B is an optical setup containing a movable objective for reconstruction 3D intensity distribution on top of the guided-wave-fed 2D metalens.
Figure 17C:
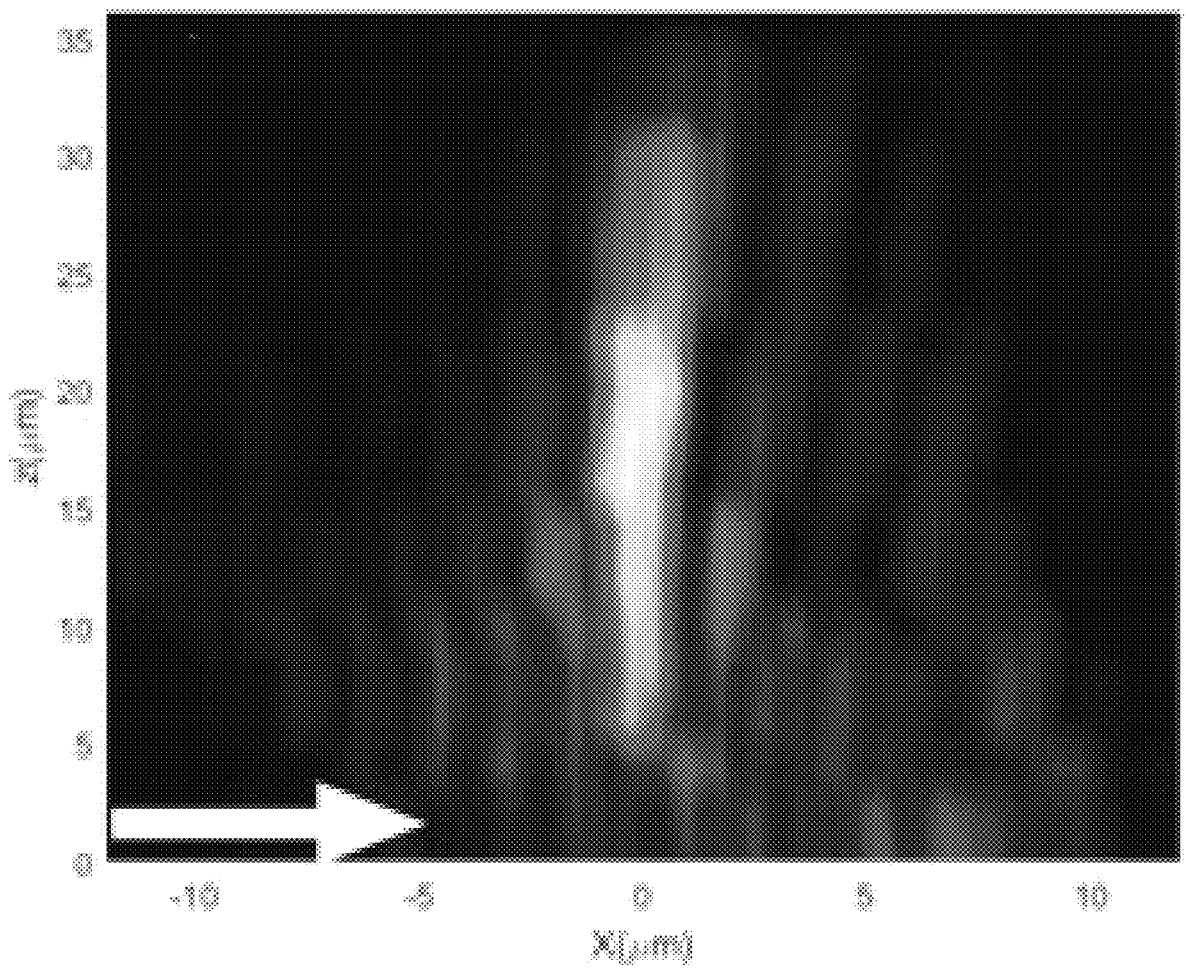
FIG. 17C shows measured intensity distribution at the cross section of the X-Z plane.
Figure 17D:
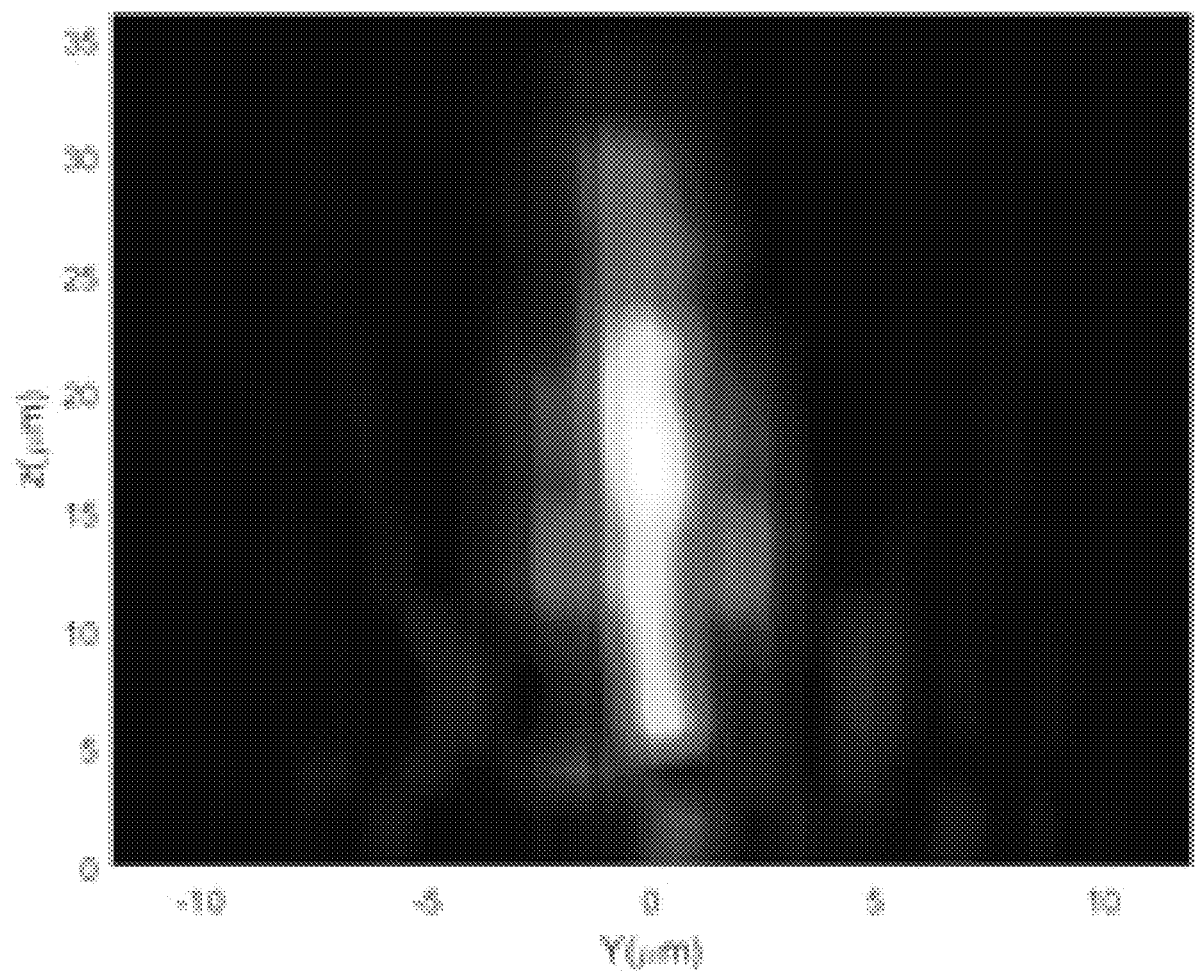
FIG. 17D shows measured intensity distribution at the cross section of the XY-Z plane.
Figure 17E:
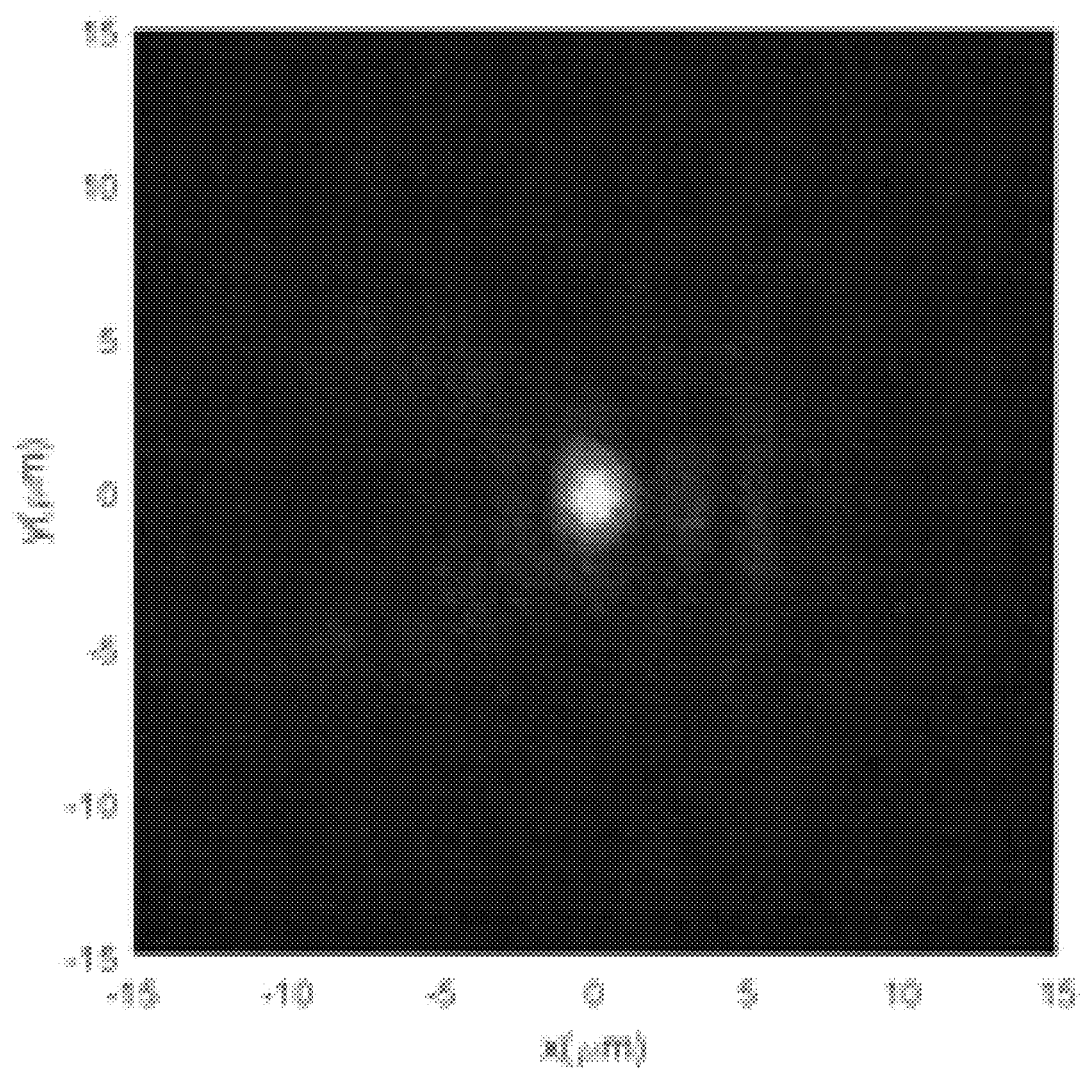
FIG. 17E shows measured intensity distribution at the focal plane X-Y plane.
Figure 17F:
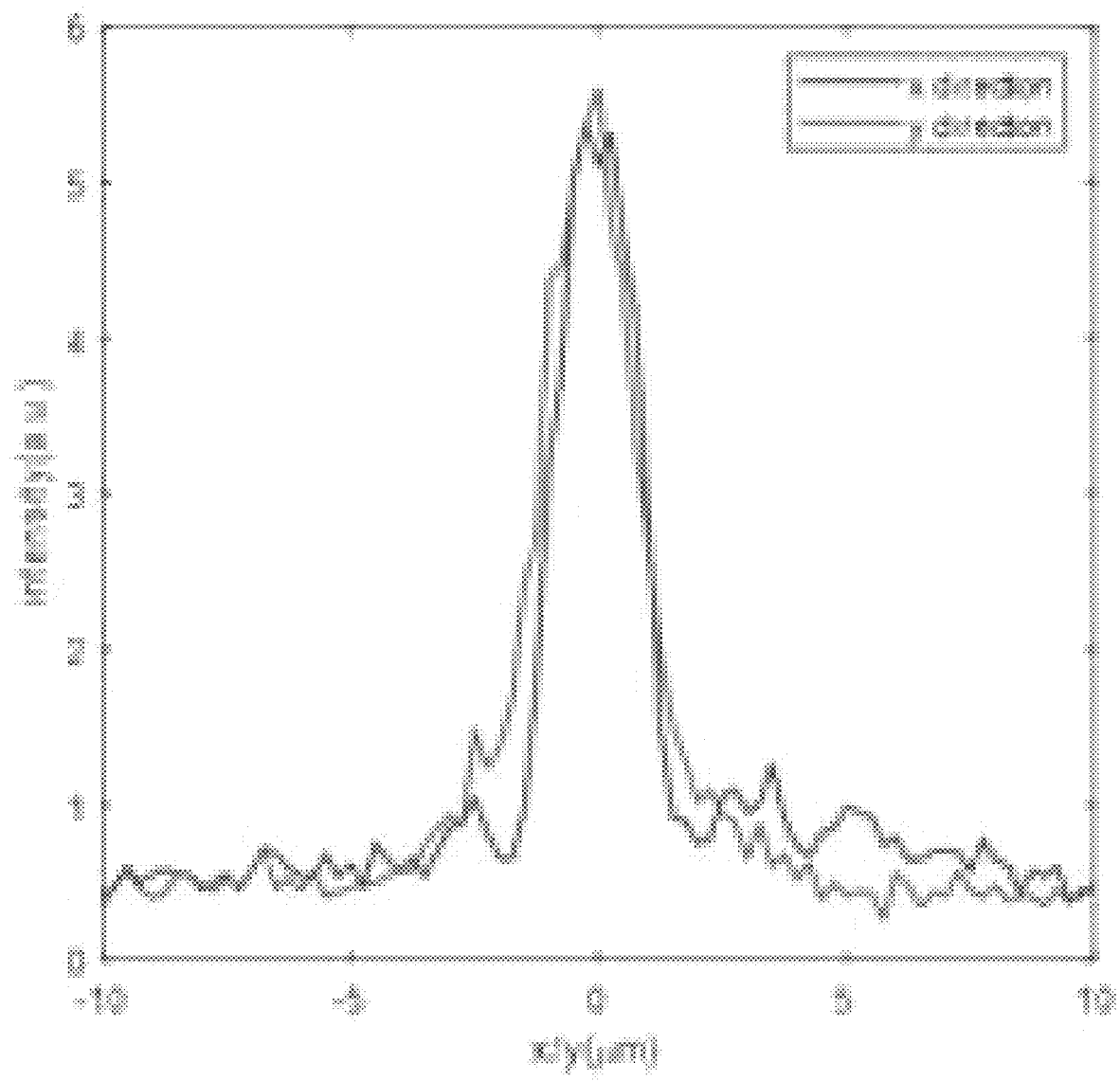
FIG. 17F shows intensity distribution along x and y direction at the focal plane with a focal spot with full width at half maximum of about 1.8 μm.

A 2D focusing sample was designed and fabricated using two electron beam lithography steps with precise alignment to define the silicon waveguide 106 and a metasurface 102. The metasurface 102 region has a size of 17.6 µm×17.6 µm, and the focal length was designed as 20 µm. For the whole device design, a single-mode neck was used following the edge-coupling port in order to eliminate higher order propagation modes. The single mode neck is immediately followed by a taper which could adiabatically convert the fundamental $TE_{00}$ mode from the single mode neck into a slab TE00 mode with extended width. Both parts together guaranteed the guided wave impinging the metasurface 102 region had a flat wavefront. The three dimensional scattered-out light field on top of the device was retrieved using a homebuilt optical setup as shown in FIG. 17B. A free-space laser beam of 1550 nm emitted from a Ti:Sapphire laser pumped optical parametric oscillator (OPO) was coupled into a commercially available tapered lensed single-mode fiber. The focused laser beam from the tapered end of the fiber was edge-coupled into the input port of the fabricated ridge waveguide 106 sample in end-fire manner by using a three-dimensional translational stage. The light scattered into free space by metasurface 102 located on the slab waveguide 106 was collected by an objective (N.A.=0.95) and then imaged by a tube lens onto an infrared camera. The objective was mounted on a translational stage with a high-resolution piezo-controlled actuator in z-direction. By moving the z stage, the real-space images were taken at different heights and a 3D intensity distribution was reconstructed. After that, the intensity distribution at different cross section was extracted. From the experimental result, it is observed that the light scattered out by the metasurface 102 gradually focused on the height around 18 µm, close to the designed focal length. The fullwidth at half maximum of the focal spot intensity distribution at the focal plane is about 1.8 µm as shown FIG. 17F, which is slightly larger than the expectation.

Figure 18A:
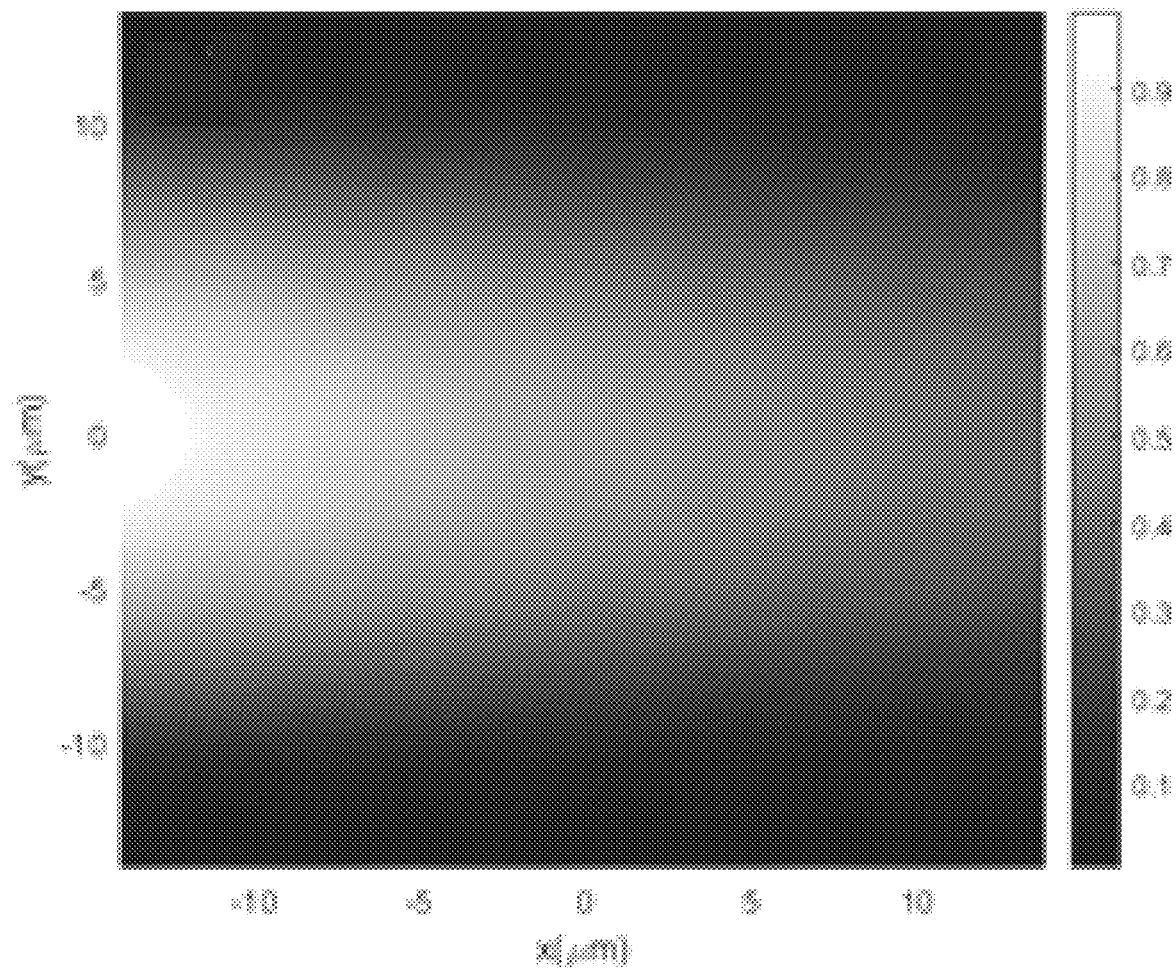
FIG. 18A shows a profile of intensity distribution inside a slab waveguide used for holographic generation by a 2D guided-wave-fed metasurface.
Figure 18B:
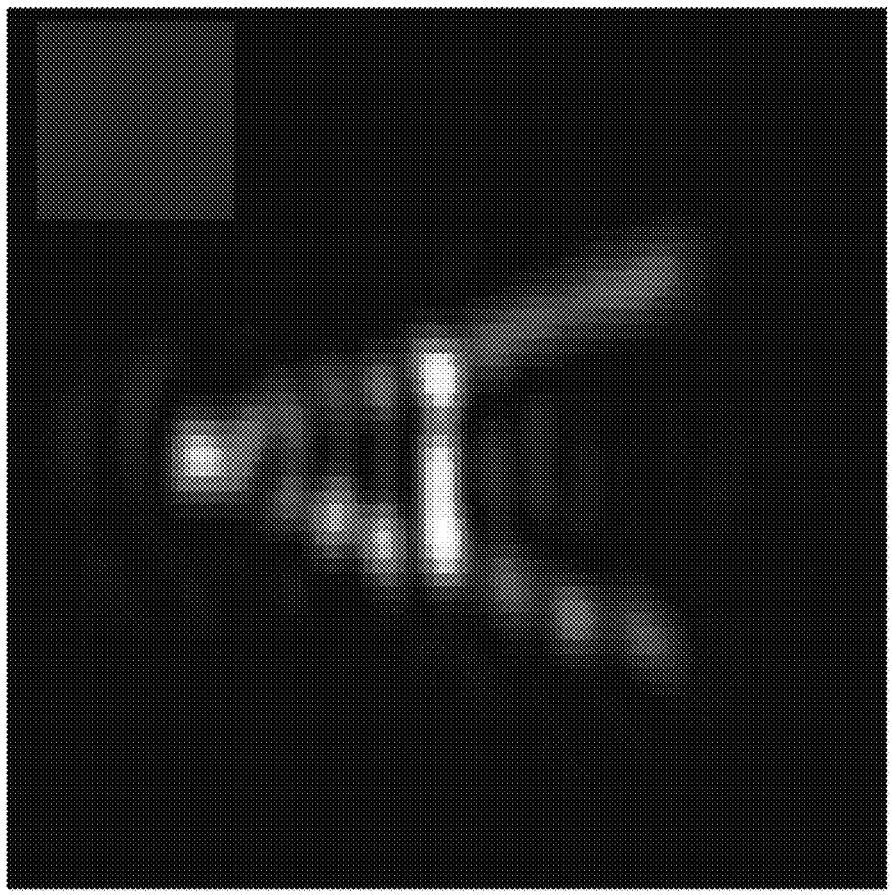
FIG. 18B is a MATLAB calculated holographic projected on top of the device.
Figure 18C:
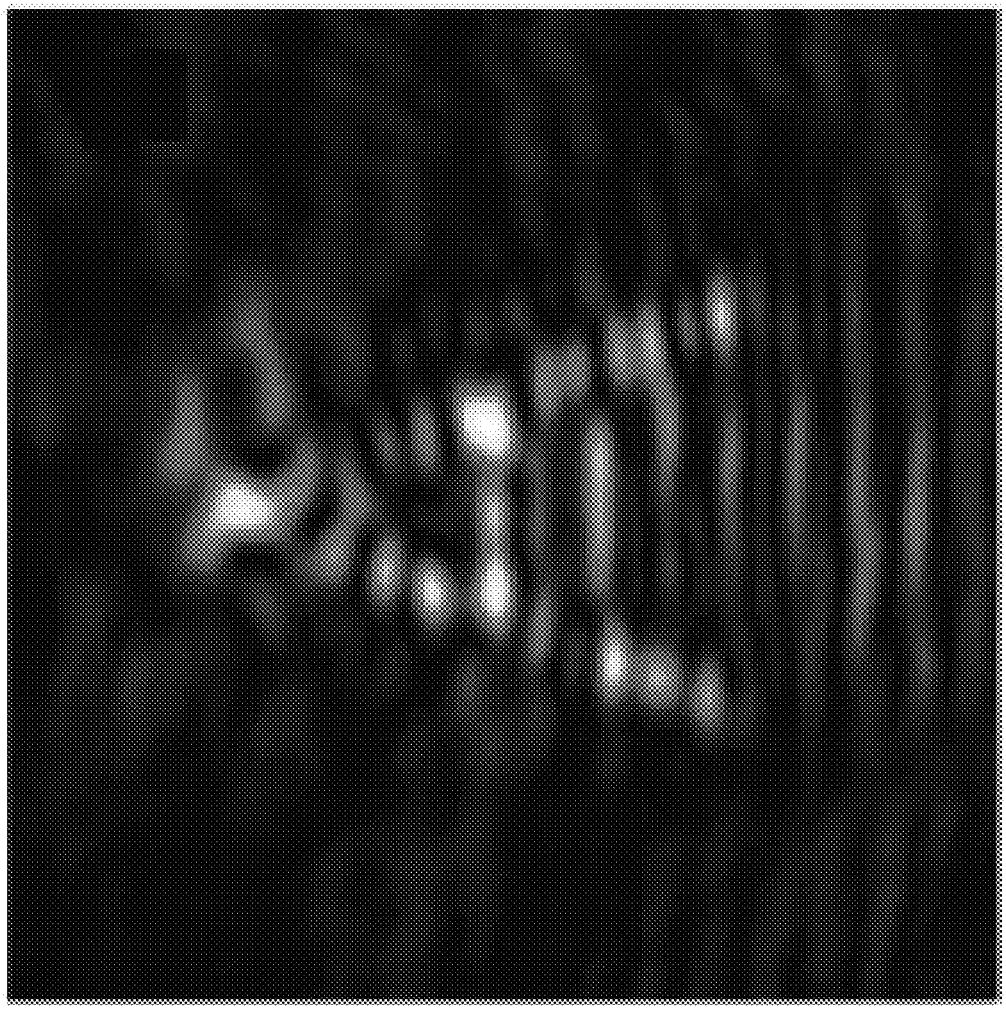
FIG. 18C is a full-wave simulated holographic projected image above the device.

FIG. 18 shows holographic generation by 2D guided-wave-fed metasurface 102. FIG. 18A shows a decaying profile of the intensity distribution inside the slab waveguide 106. FIG. 18B is a MATLAB calculated holographic projected on top of the device. FIG. 18C is a full-wave simulated holographic projected on top of the device.

More generally, by leveraging the freedom on controlling phase profile of scattered light, it is possible to demonstrate a holographic project directedly from a guided-wave-fed metasurface 102. Hologram-based near eye display generating three dimensional images carrying depth information is a promising solution for the vergence-accommodation-conflict (VAC) in augmented/virtual reality, and incorporating hologram in form of compactness and lightweight is crucial for developing next-generation head-mounted-devices (HMD). By mapping the phase profile of a holographic image onto the metasurface-decorated waveguide 106, the capability of utilizing the platform for this specific application is demonstrated. For a given image floating at a specific height, the required phase distribution at the metasurface plane is first calculated using an iterative algorithm. For accuracy, the intensity distribution inside of the waveguide 106 is taken into account for the hologram calculation. The mode profile of the fundamental $TE_{00}$ mode in a slab waveguide 106 with specific dimension is calculated, which can be represented by a gaussian function centered at zero point $$Ae^{-\frac{y^2}{\sigma}}$$

(σ is a constant), approximately. The energy decaying from the scattering and intrinsic loss is then considered by averaging response from different nanoantennas 108. Therefore, the overall intensity distribution inside of the waveguide 106 can be represented as $$I(x, y) = Ae^{-\alpha x - \frac{y^2}{\sigma}}$$

in which α is the decaying rate. After that, the geometric parameters of antenna 108 in each 220 nm×440 nm unicell were determined and the whole devices was established. A 28.16 µm×28.16 µm hologram was constructed corresponding to 128×64 pixels. The position of the image plane was set as 20 µm above the hologram plane. The intensity distribution observed at the designated height clearly show that the metasurface 102 was able to extract light from the slab waveguide 106 and generate a floating holographic image above the device.

In conclusion, functional two-dimensional metasurfaces 102 on a slab waveguide 106 driven by a guided wave is demonstrated. The off-chip focusing and a holographic projection device were realized experimentally and numerically, respectively. The results show the developed platform can be exploited for further complicated application requiring 2D light field manipulation with high level on-chip integration like compact lidar and head-mounted AR/VR when combined with tunability of metasurfaces 102.

The following references are incorporated herein by reference in their entireties.

1. C. Sun, M. T. Wade, Y. Lee, J. S. Orcutt, L. Alloatti, M. S. Georgas, A. S. Waterman, J. M. Shainline, R. R. Avizienis, S. Lin, B. R. Moss, R. Kumar, F. Pavanello, A. H. Atabaki, H. M. Cook, A. J. Ou, J. C. Leu, Y.-H. Chen, K. Asanović, R. J. Ram, M. A. Popović, V. M. Stojanović, Single-chip microprocessor that communicates directly using light. *Nature*. 528, 534-538 (2015).
2. A. H. Atabaki, S. Moazeni, F. Pavanello, H. Gevorgyan, J. Notaros, L. Alloatti, M. T. Wade, C. Sun, S. A. Kruger, H. Meng, K. Al Qubaisi, I. Wang, B. Zhang, A. Khilo, C. V. Baiocco, M. A. Popović, V. M. Stojanović, R. J. Ram, Integrating photonics with silicon nanoelectronics for the next generation of systems on a chip. *Nature* (2018), doi:10.1038/s41586-018-0028-z.
3. M. Papes, P. Cheben, D. Benedikovic, J. H. Schmid, J. Pond, R. Halir, A. Ortega-Moñux, G. Wangüemert-Perez, W. N. Ye, D.-X. Xu, S. Janz, M. Dado, V. Vašinek, Fiber-chip edge coupler with large mode size for silicon photonic wire waveguides. *Opt. Express* (2016), doi:10.1364/oe.24.005026.
4. S. A. Masturzo, J. M. Yarrison-Rice, H. E. Jackson, J. T. Boyd, Grating Couplers Fabricated by Electron-Beam Lithography for Coupling Free-Space Light Into Nanophotonic Devices. *IEEE Trans. Nanotedmol.* 6, 622-626 (2007).
5. K. Van Acoleyen, W. Bogaerts, J. Jágerská, N. Le Thomas, R. Houdré, R. Baets, Off-chip beam steering with a one-dimensional optical phased array on silicon-on-insulator. *Opt. Lett.* 34, 1477 (2009).
6. K. Van Acoleyen, K. Komorowska, W. Bogaerts, R. Baets, One-Dimensional Off-Chip Beam Steering and Shaping Using Optical Phased Arrays on Silicon-on-Insulator. *J. Light. Technol.* 29, 3500-3505 (2011).
7. J. Sun, E. Timurdogan, A. Yaacobi, E. S. Hosseini, M. R. Watts, Large-scale nanophotonic phased array. *Nature.* 493, 195-199 (2013).
8. P. Cheben, R. Halir, J. H. Schmid, H. A. Atwater, D. R. Smith, Subwavelength integrated photonics. *Nature.* 560, 565-572 (2018).
9. F. J. Rodriguez-Fortuno, A. Espinosa-Soria, A. Martinez, Exploiting metamaterials, plasmonics and nanoantennas concepts in silicon photonics. *J. Opt.* 18, 123001 (2016).
10. M. W. Knight, H. Sobhani, P. Nordlander, N. J. Halas, Photodetection with Active Optical Antennas. *Science* (80-.). 332, 702-704 (2011).
11. A. Melikyan, L. Alloatti, A. Muslija, D. Hillerkuss, P. C. Schindler, J. Li, R. Palmer, D. Korn, S. Muehlbrandt, D. Van Thourhout, B. Chen, R. Dinu, M. Sommer, C. Koos, M. Kohl, W. Freude, J. Leuthold, High-speed plasmonic phase modulators. *Nat. Photonics.* 8, 229-233 (2014).
12. R. Guo, M. Decker, F. Setzpfandt, X. Gai, D.-Y. Choi, R. Kiselev, A. Chipouline, I. Staude, T. Pertsch, D. N. Neshev, Y. S. Kivshar, High-bit rate ulta-compact light routing with mode-selective on-chip nanoantezias. *Sci. Adv.* 3, e1700007 (2017).
13. N. Yu, P. Genevet, M. A. Kats, F. Aieta, J.-P. Tetienne, F. Capasso, Z. Gaburro, Light propagation with phase discontinuities: generalized laws of reflection and refraction. *Science.* 334, 333-7 (2011).
14. X. Ni, N. K. Emani, A. V Kildishev, A. Boltasseva, V. M. Shalaev, Broadband Light Bending with Plasmonic Nanoantennas. *Science* (80-). 335, 427 (2011).
15. X. Ni, S. Isliii, A. V Kildishev, V. M. Shalaev, Ultra-thin, planar, Babinet-inverted plasmonic metalenses. *Light Sci. Appl.* 2, e72 (2013).
16. X. Ni, A. V Kildishev, V. M. Shalaev, Metasurface holograms for visible light. *Nat. Commun.* 4, 2807 (2013).
17. Y.-H. Chen, L. Huang, L. Gan, Z.-Y. Li, Wavefront shaping of infrared light through a subwavelength hole. *Light Sci. Appl.* 1, e26-e26 (2012).
18. X. M. Tang, L. Li, T. Li, Q. J. Wang, X. J. Zhang, S. N. Zhu, Y. Y. Zhu, Converting surface plasmon to spatial Airy beam by graded grating on metal surface. *Opt. Lett.* 38, 1733 (2013).
19. L. Li, T. Li, X.-M. Tang, S.-M. Wang, Q.-J. Wang, S.-N. Zhu, Plasmonic polarization generator in well-routed beaming. *Light Sci. Appl.* 4, e330-e330 (2015).
20. J. Chen, T. Li, S. Wang, S. Zhu, Multiplexed Holograms by Surface Plasmon Propagation and Polarized Scattering. *Nano Lett.* 17, 5051-5055 (2017).
21. Z. Li, M. H. Kim, C. Wang, Z. Han, S. Shrestha, A. C. Overvig, M. Lu, A. Stein, A. M. Agarwal, M. Lončar, N. Yu, Controlling propagation and coupling of waveguide modes using phase-gradient metasurfaces. *Nat. Nanotechnol.* 12, 675-683 (2017).
22. C. Wang, Z. Li, M.-H. Kim, X. Xiong, X.-F. Ren, G.-C. Guo, N. Yu, M. Lončar, Metasurface-assisted phase-matching-free second harmonic generation in lithium niobate waveguides. *Nat. Commun.* 8, 2098 (2017).
23. F. Monticone, A. Alu, Leaky-Wave Theory, Techniques, and Applications: From Microwaves to Visible Frequencies. *Proc. IEEE.* 103, 793-821 (2015).
24. D. R. Smith, O. Yurduseven, L. P. Mancera, P. Bowen, N. B. Kundtz, Analysis of a Waveguide-Fed Metasurface Antenna. *Phys. Rev. Appl.* 8, 054048 (2017).
25. C. V. Poulton, A. Yaacobi, D. B. Cole, M. J. Byrd, M. Raval, D. Vermeulen, M. R. Watts, Coherent solid-state LIDAR with silicon photonic optical phased arrays. *Opt. Lett.* 42, 4091 (2017).
26. D. A. B. Miller, Attojoule Optoelectronics for Low-Energy Information Processing and Communications. *J. Light. Technol.* (2017). doi:10.1109/JLT.2017.2647779.
27. I. Kim, G. Yoon, J. Jang, P. Genevet, K. T. Nam, J. Rho, Outfitting Next Generation Displays with Optical Metasurfaces. *ACS Photonics.* 5, 3876-3895 (2018).
28. S. Chang, X. Guo, X. Ni, Optical Metasurfaces: Progress and Applications. *Annu. Rev. Mater. Res.* 48, 279-302 (2018).
29. R. Halir, P. Cheben, J. H. Schmid, R. Ma, D. Bedard, S. Janz, D.-X. Xu, A. Densmore, J. Lapointe, Í. Molina-Fernández, Continuously apodized fiber-to-chip surface grating coupler with refractive index engineered subwavelength structure. *Opt. Lett.* 35, 3243 (2010).
30. M. Antelius, K. B. Gylfason, H. Sohlstrom, An apodized SOI waveguide-to-fiber surface grating coupler for single lithography silicon photonics. *Opt. Express.* 19, 3592 (2011).
31. C. Li, H. Zhang, M. Yu, G. Q. Lo, CMOS-compatible high efficiency double-etched apodized waveguide grating coupler. *Opt. Express.* 21, 7868 (2013).
32. A. M. Yao, M. J. Padgett, Orbital angular momentum: origins, behavior and applications. *Adv. Opt. Photonics.* 3, 161-204 (2011).
33. N. Bozinovic, Y. Yue, Y. Ren, M. Tur, P. Kristensen, H. Huang, A. E. Willner, S. Ramachandran, Terabit-scale orbital angular momentum mode division multiplexing in fibers. *Science* (80-.). 340, 1545-1548 (2013).
34. Y. Yan, G. Xie, M. P. J. Lavery, H. Huang, N. Ahmed, C. Bao, Y. Ren, Y. Cao, L. Li, Z. Zhao, A. F. Molisch, M. Tur, M. J. Padgett, A. E. Willner, High-capacity millimetre-wave communications with orbital angular momentum multiplexing. *Nat. Commun.* 5, 4876 (2014).
35. G. Molina-Terriza, J. P. Torres, L. Torner, Twisted photons. *Nat. Phys.* 3, 305-310 (2007).
36. A. Mair, A. Vaziri, G. Weihs, A. Zeilinger, Entanglement of the orbital angular momentum states of photons. *Nature.* 412, 313-6 (2001).
37. J. E. Curtis, D. G. Grier, Structure of Optical Vortices. *Phys. Rev. Lett.* 90, 133901 (2003).
38. N. R. Heckenberg, R. McDuff, C. P. Smith, A. G. White, Generation of optical phase singularities by computer-generated holograms. *Opt. Lett.* 17, 221 (1992).

39. M. W. Beijersbergen, R. P. C. Coerwinkel, M. Kristensen, J. P. Woerdman, Helical-wavefront laser beams produced with a spiral phaseplate. *Opt. Commun.* 112, 321-327 (1994).
40. E. Karimi, B. Piccirillo, E. Nagali, L. Marrucci, E. Santamato, Efficient generation and sorting of orbital angular momentum eigenmodes of light by thermally tuned q-plates. *Appl. Phys. Lett.* 94, 231124 (2009).
41. L. Huang, X. Chen, H. Mühlenbernd, G. Li, B. Bai, Q. Tan, G. Jin, T. Zentgraf, S. Zhang, Dispersionless Phase Discontinuities for Controlling Light Propagation. *Nano Lett.* 12, 5750-5755 (2012).
42. S. Knitter, S. F. Liew, W. Xiong, M. I. Guy, G. S. Solomon, H. Cao, Topological defect lasers. *J. Opt.* 18, 014005 (2016).
43. P. Miao, Z. Zhang, J. Sun, W. Walasik, S. Longhi, N. M. Litchinitser, L. Feng, J. Danckaert, et al., Orbital angular momentum microlaser. *Science.* 353, 464-7 (2016).
44. Y.-W. Huang, H. W. H. Lee, R. Sokhoyan, R. A. Pala, K. Thyagarajan, S. Han, D. P. Tsai, H. A. Atwater, Gate-Tunable Conducting Oxide Metasurfaces. *Nano Lett.* 16, 5319-5325 (2016).
45. A. M. Shaltout, V. M. Shalaev, M. L. Brongersma, Spatiotemporal light control with active metasurfaces. *Science* (80-.). 364, eaat3100 (2019).

It should be understood that the disclosure of a range of values is a disclosure of every numerical value within that range, including the end points. It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement.

It will be apparent to those skilled in the art that numerous modifications and variations of the described examples and embodiments are possible considering the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof.

It should be understood that modifications to the embodiments disclosed herein can be made to meet a particular set of design criteria. Therefore, while certain exemplary embodiments of the device and methods of using and making the same disclosed herein have been discussed and illustrated, it is to be distinctly understood that the invention is not limited thereto but may be otherwise variously embodied and practiced within the scope of the following claims.

What is claimed is:

1. A photonic component, comprising:
a metasurface comprising a substrate with a thin-layer of meta-atoms disposed thereon; and
a waveguide having a top surface, wherein the metasurface is disposed on at least a portion of the top surface, wherein the meta-atoms form an array on the top surface, wherein the meta-atoms form sandwich nano-bar antennas; and
wherein the metasurface comprises an array of meta-atoms.

2. The photonic component of claim 1, further comprising a plurality of metasurfaces disposed on the top surface of the waveguide.

3. The photonic component of claim 2, wherein a first metasurface differs from a second metasurface.

4. The photonic component of claim 1, wherein the array of meta-atoms includes a uniform distribution of meta-atoms across the metasurface.

5. The photonic component of claim 1, further comprising a plurality of different types of meta-atoms.

6. The photonic component of claim 1, wherein the sandwich nano-bar antenna is a metal-dielectric-metal neon-bar antenna.

7. The photonic component of claim 1, wherein the metasurface comprises a supercell, the supercell including a periodic arrangement of meta-atoms, each meta-atom within the periodic arrangement imposing a predetermined phase shift on a light wave being guided through the waveguide.

8. The photonic component of claim 7, further comprising a plurality of supercells.

9. The photonic component of claim 8, wherein a first supercell differs from a second supercell.

10. The photonic component of claim 1, wherein:
as light wave is guided through the waveguide, the metal-dielectric-metal nano-bar antenna induces a total phase shift via phase accumulation from the propagation of the guided light wave, and each meta-atom induces an abrupt and spatially variant phase shift.

11. The photonic component of claim 10, wherein:
an evanescent tail of the guided light wave induces a first electric dipole via bottom cuboids in the sandwich nano-bar antenna;
the evanescent tail of the guided light wave induces a second electric dipole via top cuboids in the sandwich nano-bar antenna, the second electric dipole being antiparallel to the first electric dipole;
the first and second dipoles generate a magnetic dipolar resonance;
the first and second dipoles and the magnetic dipolar resonance generate a directional radiation;
the light wave being guided through the waveguide is deflected via the directional radiation so that the guided light wave is extracted into free-space; and
the directional radiation causes an abrupt phase shift range of $2\pi$ to the extracted light wave.

12. A metalens, comprising:
a metasurface comprising a substrate with a thin-layer of meta-atoms disposed thereon;
a waveguide having a top surface, wherein the metasurface is disposed on at least a portion of the top surface, wherein the meta-atoms form a spatial arrangement on the top surface; and
a sandwich nano-bar antenna formed in or on the metasurface;
wherein the spatial arrangement of meta-atoms provide a focal length for the metalens.

13. A metasurface-dressed optical ring resonator, comprising:
an optical ring comprising a plurality of waveguides; and
a guided-wave driven metasurface structure disposed on at least one waveguide of the optical ring, the guided-wave driven metasurface structure comprising:
a metasurface comprising a substrate with a thin-layer of meta-atoms disposed thereon, wherein the metasurface is disposed on at least a portion of a top surface of the at least one waveguide, wherein the meta-atoms form an array on the top surface; and a sandwich nano-bar antenna formed in or on the metasurface.

14. The optical ring resonator of claim 13, wherein the at least one waveguide has a center and each meta-atom of the metasurface is positioned in or away from the center.

15. The optical ring resonator of claim 13, wherein the metasurface comprises a supercell, the supercell including a periodic arrangement of meta-atoms, each meta-atom within the periodic arrangement imposing a predetermined phase shift on a light wave being guided through the at least one waveguide.

16. The optical ring resonator of claim 15, further comprising a plurality of supercells.

17. The optical ring resonator of claim 16, wherein a first supercell differs from a second supercell.

18. The optical ring resonator of claim 16, wherein the plurality of supercells generate a well-defined topological charge when a light wave is guided through the at least one waveguide.

19. The optical ring resonator of claim 13, wherein the optical ring resonator is configured as a multi-quantum-well micro-ring resonator.

20. An orbital angular momentum laser, comprising the optical ring resonator of claim 13.

21. A photonic component, comprising:

a metasurface comprising a substrate with a thin-layer of meta-atoms disposed thereon; and a waveguide having a top surface, wherein the metasurface is disposed on at least a portion of the top surface, wherein the meta-atoms are formed on the top surface, wherein the meta-atoms form sandwich nano-bar antennas.

* * * * *